Oct. 3, 1939.　　　　H. H. KEEN　　　　2,174,699
RECORD-CARD-CONTROLLED STATISTICAL MACHINE
Filed June 20, 1934　　　21 Sheets-Sheet 1

INVENTOR
*H H Keen*
BY
ATTORNEY

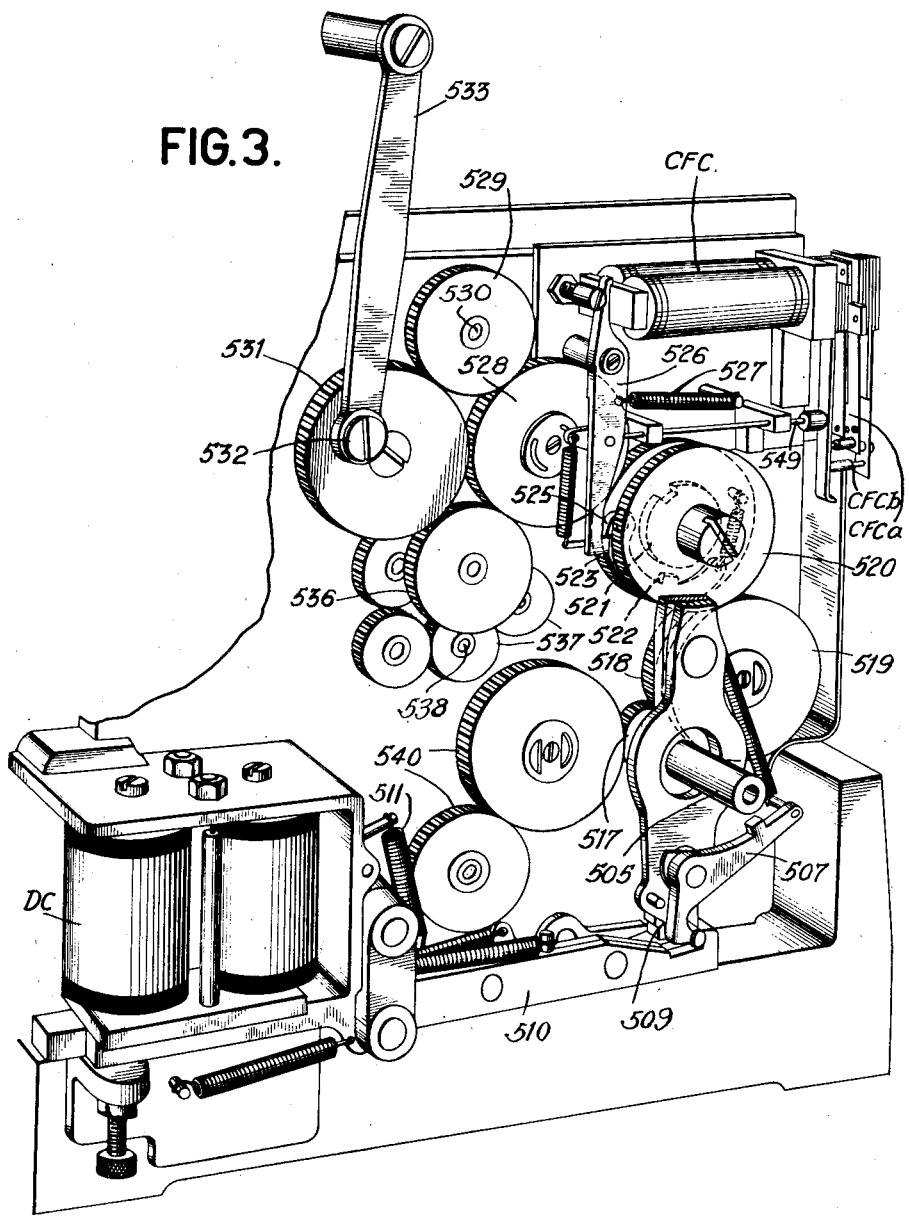

Oct. 3, 1939.  H. H. KEEN  2,174,699
RECORD-CARD-CONTROLLED STATISTICAL MACHINE
Filed June 20, 1934   21 Sheets-Sheet 3
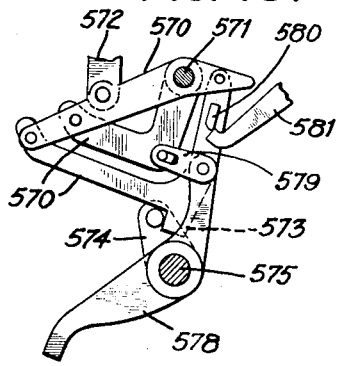
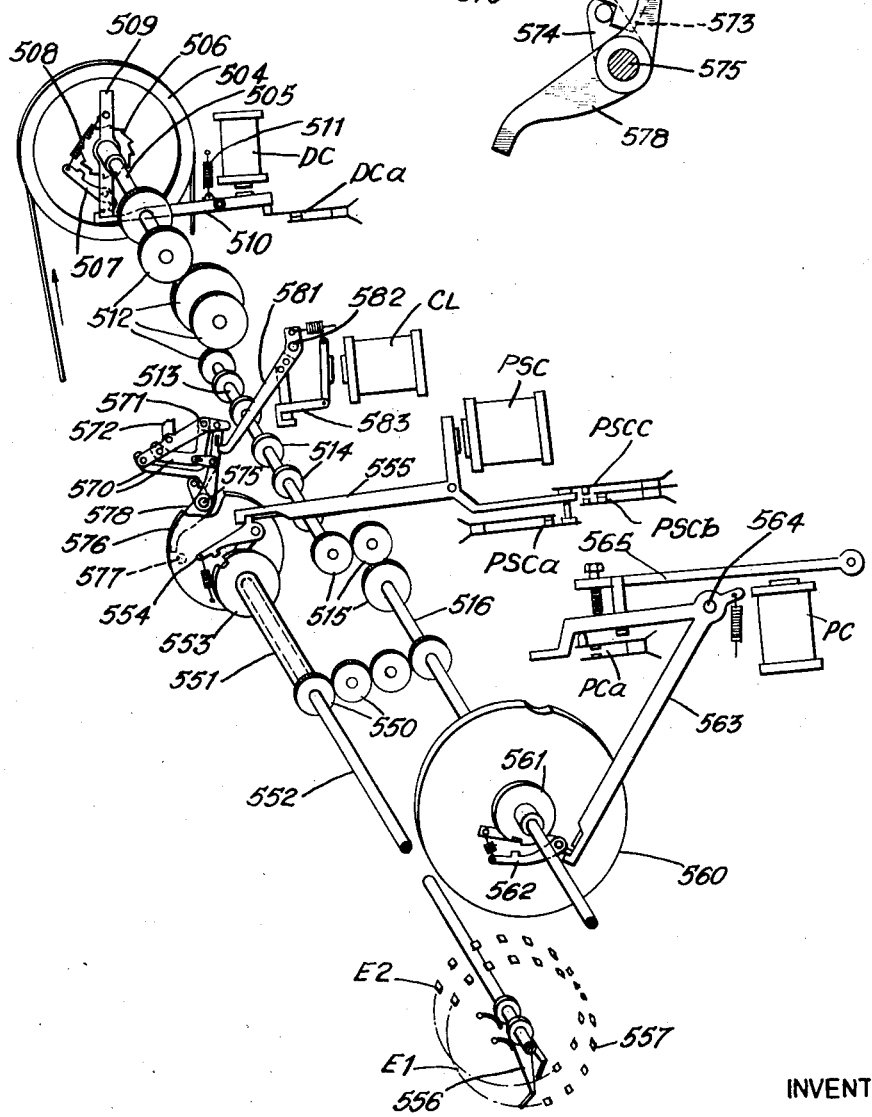
INVENTOR
BY
ATTORNEY Oct. 3, 1939.   H. H. KEEN   2,174,699
RECORD-CARD-CONTROLLED STATISTICAL MACHINE
Filed June 20, 1934   21 Sheets-Sheet 4
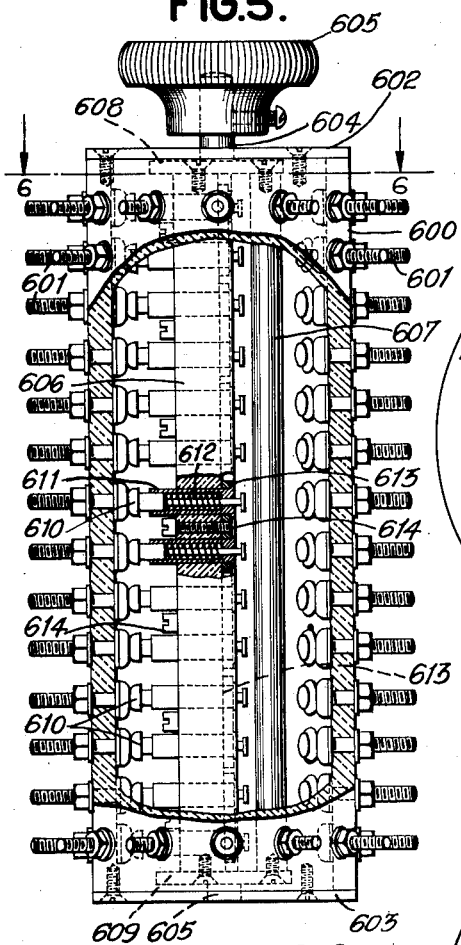
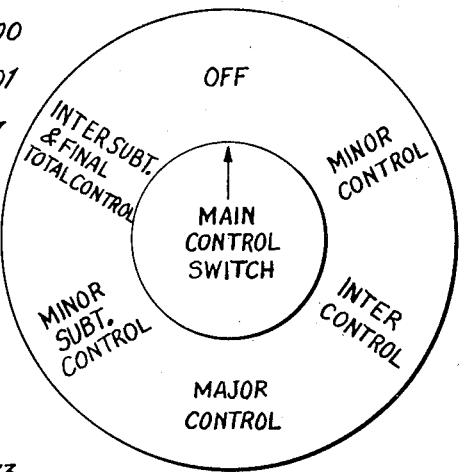
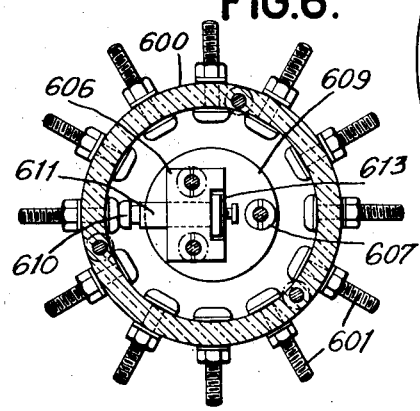
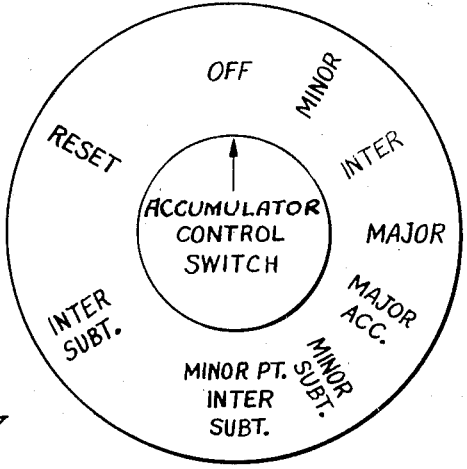
INVENTOR
BY *H. H. Keen*
ATTORNEY

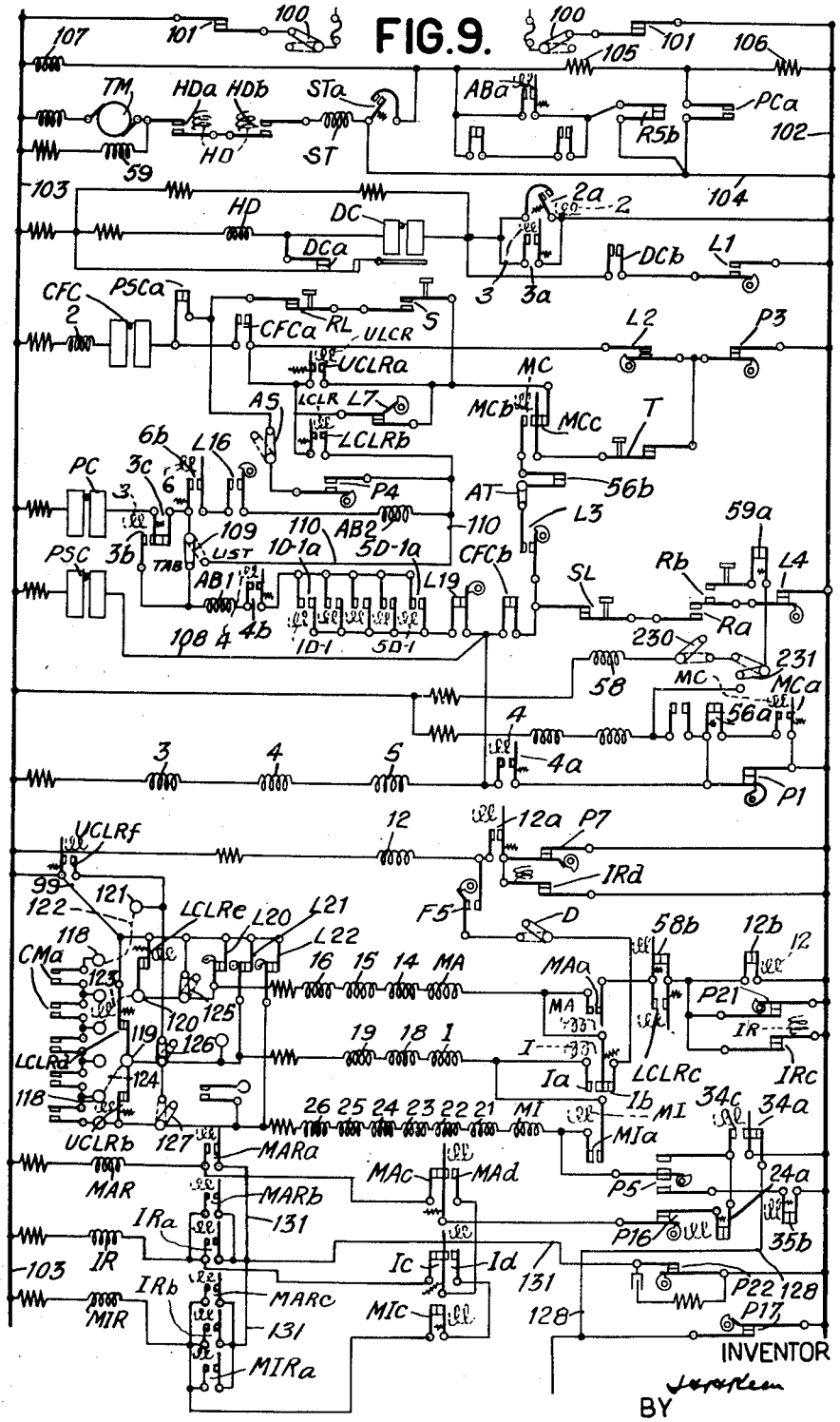

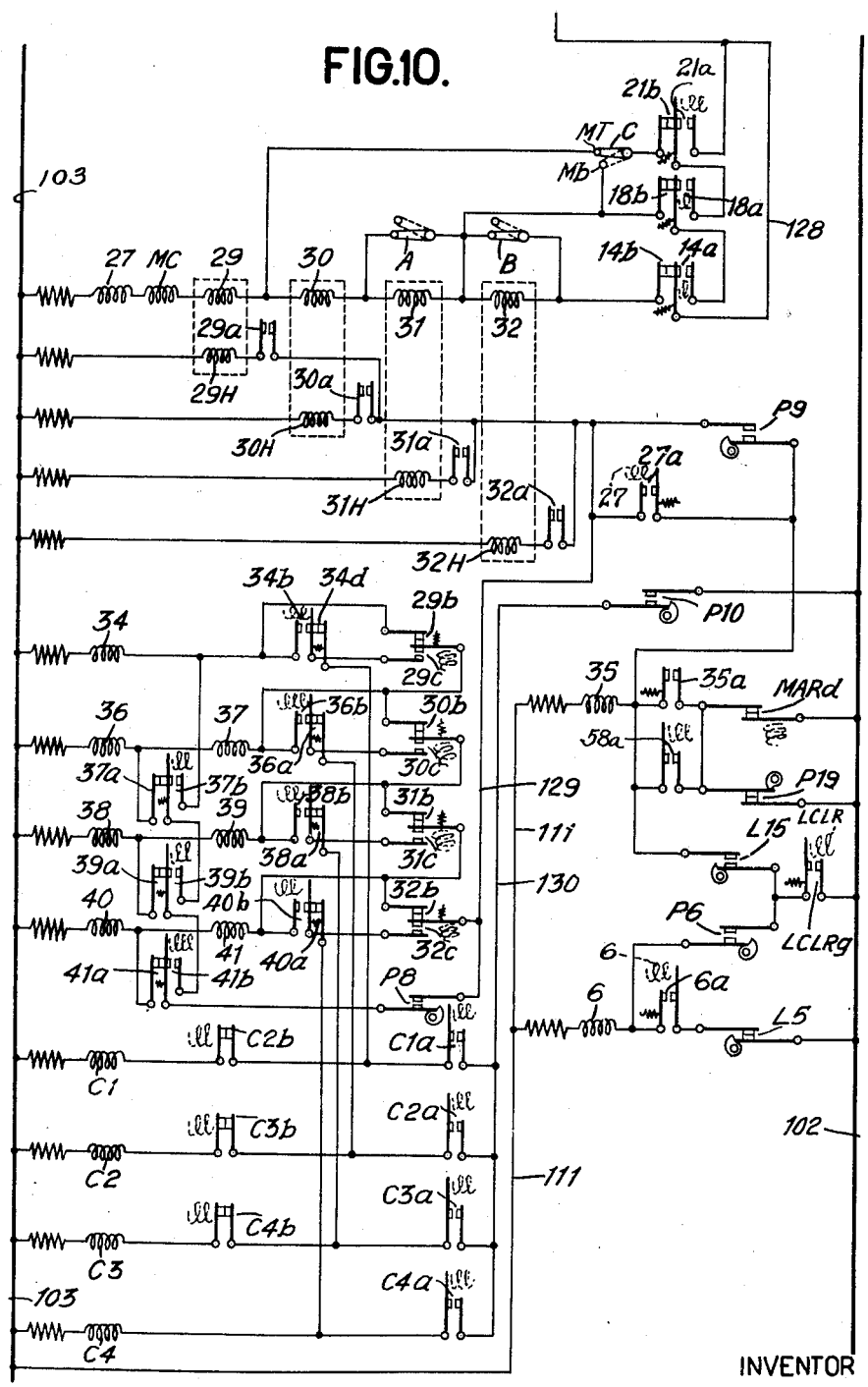

Oct. 3, 1939.  H. H. KEEN  2,174,699
RECORD-CARD-CONTROLLED STATISTICAL MACHINE
Filed June 20, 1934   21 Sheets-Sheet 7

INVENTOR
H. H. Keen
BY
ATTORNEY

Oct. 3, 1939.  H. H. KEEN  2,174,699
RECORD-CARD-CONTROLLED STATISTICAL MACHINE
Filed June 20, 1934    21 Sheets-Sheet 11

INVENTOR
BY
ATTORNEY

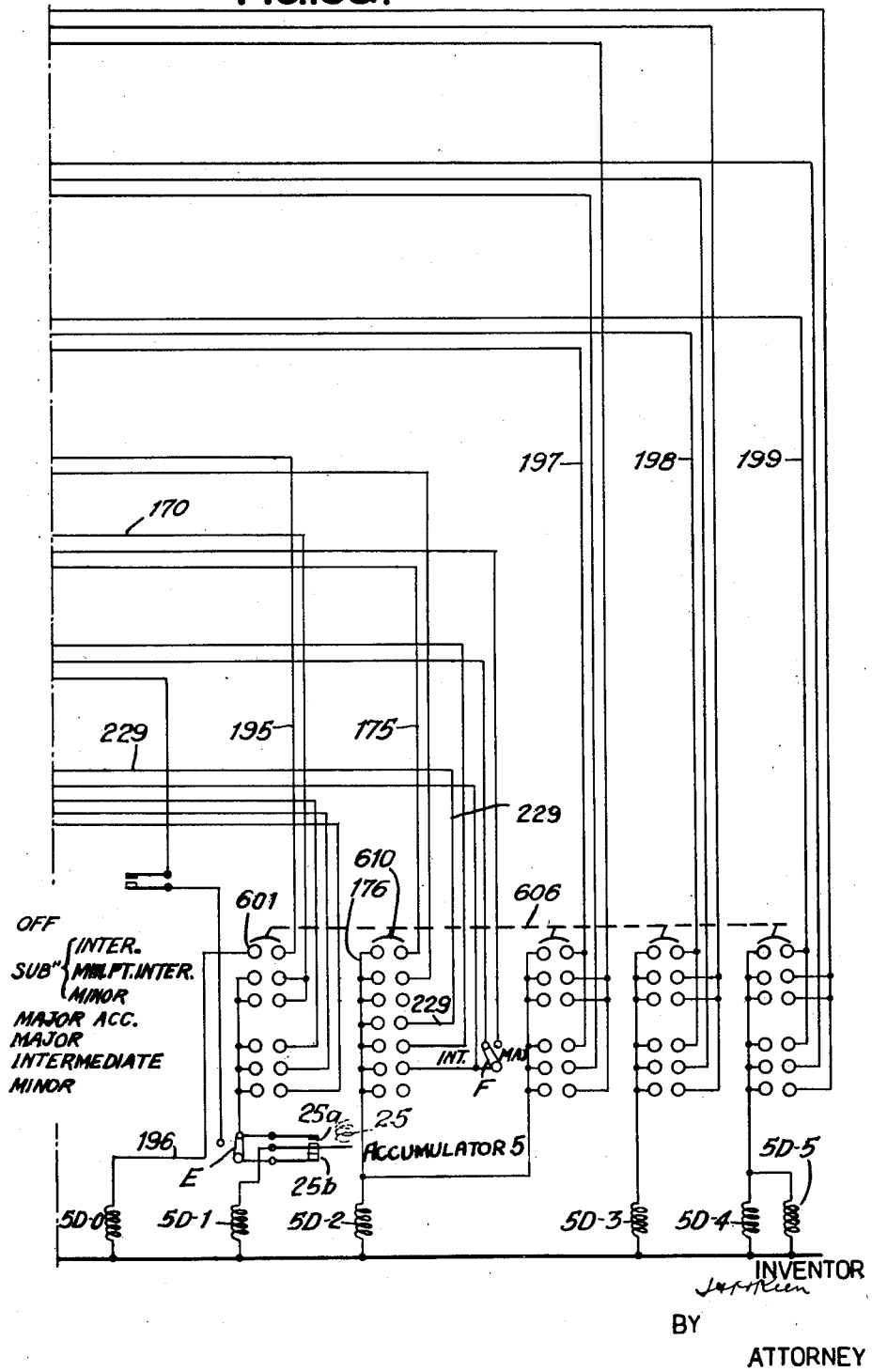

Oct. 3, 1939.   H. H. KEEN   2,174,699
RECORD-CARD-CONTROLLED STATISTICAL MACHINE
Filed June 20, 1934   21 Sheets-Sheet 13
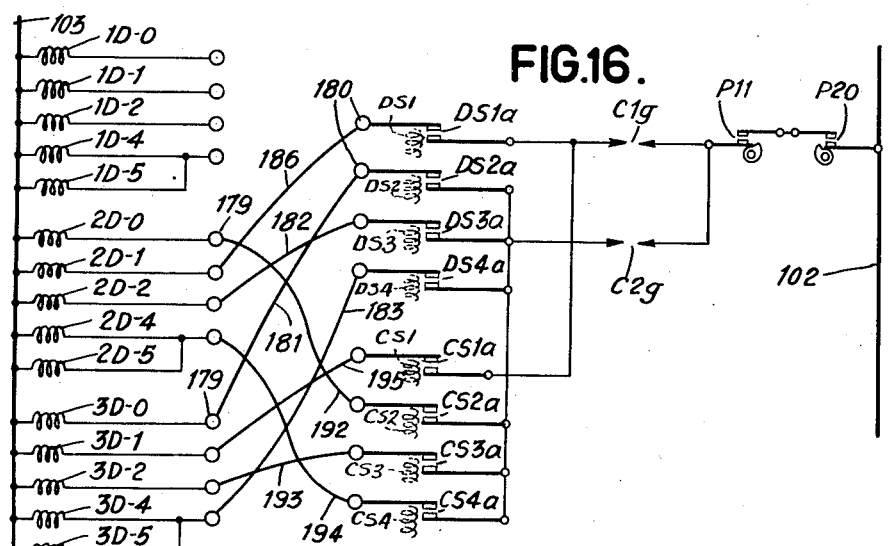
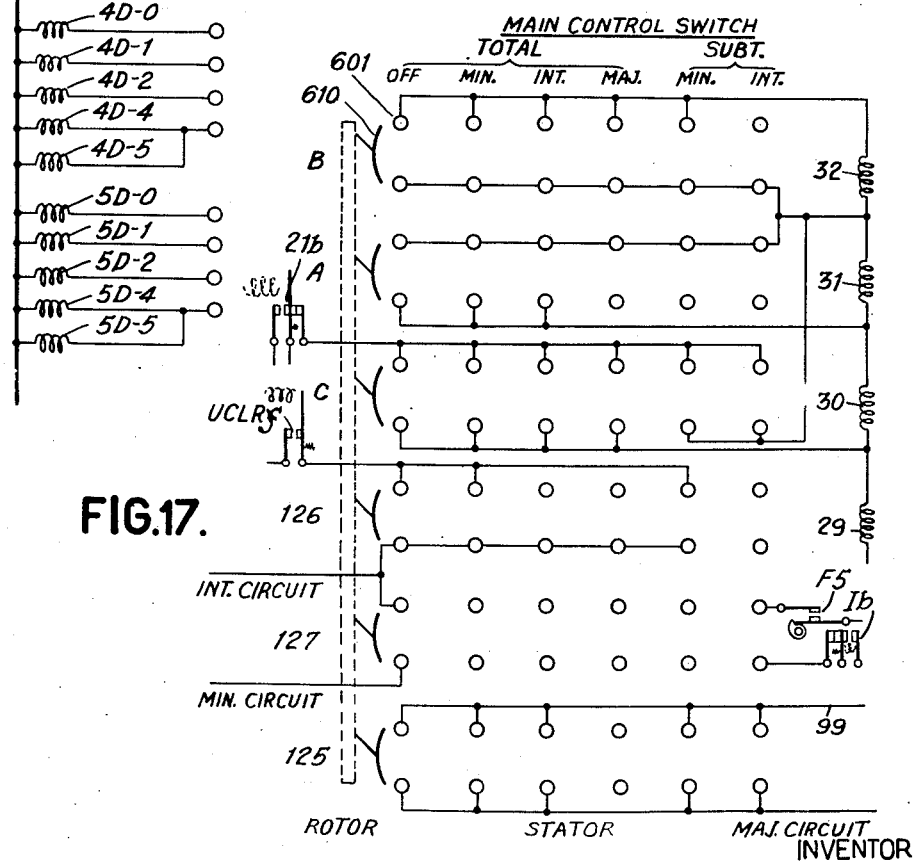
INVENTOR
BY
ATTORNEY Oct. 3, 1939.                    H. H. KEEN                    2,174,699
                  RECORD-CARD-CONTROLLED STATISTICAL MACHINE
                   Filed June 20, 1934        21 Sheets-Sheet 14

|            | Dr. ACC. 2 | Cr. ACC. 3 | Dr. ACC. 4 | Cr. ACC. 5 |
|------------|------------|------------|------------|------------|
| TAB. CYCLE | 002 10 6   |            |            |            |
| "    "     |            | 000 10 6   |            |            |
| "    "     |            | 001  0 0   |            |            |
|            | 002 10 6   | 001 10 6   |            |            |
| CYCLE 3    | PRINT AND COMPARE |     |            |            |
|            |            |            | →002 10 6  | →001 10 6  |
| CYCLE 2    | 998 09 5 ← |            |            |            |
|            |         1  |            |            |            |
|            | 001 00 0   |            |            |            |
| CYCLE 1    | PRINT      |            |            |            |
| CYCLE R    | 998 19 11  | 998 09 5   |            |            |
|            |         1  |         1  |            |            |
|            | 000 00 0   | 000 00 0   |            |            |
|            |            |            |            |            |
| TAB. CYCLE |            | 003 05 0   |            |            |
| "    "     | 002 00 0   |            |            |            |
|            | 002 00 0   | 003 05 0   |            |            |
| CYCLE 3    | PRINT AND COMPARE |     |            |            |
|            |            |            | →002 00 0  | →003 05 0  |
| CYCLE 2    |            | →997 19 11 |            |            |
|            |            |         1  |            |            |
|            |            | 001 05 0   |            |            |
| CYCLE 1    | PRINT      |            |            |            |
| CYCLE R    | 997 19 11  | 998 14 11  |            |            |
|            |         1  |         1  | 004 10 6   | 004 15 6   |
|            | 000 00 0   | 000 00 0   |            |            |
| CYCLE 4    | 004 10 6   | 004 15 6 ← |            |            |
| CYCLE 3    | PRINT AND COMPARE |     |            |            |
| CYCLE 2    |            | →995 09 5  |            |            |
|            |            |         1  |            |            |
|            |            | 000 05 0   |            |            |
| CYCLE 1    | PRINT      |            |            |            |
| CYCLE R    | 995 09 11  | 999 14 11  | 995 09 5   | 995 14 5   |
|            |         1  |         1  |         1  |         1  |
|            | 000 00 0   | 000 00 0   | 000 00 0   | 000 00 0   |

FIG.18.

| GROUP NOS. |       |        |        |
|------------|-------|--------|--------|
| INT.       | MIN.  | DEBIT  | CREDIT |
| 04         | 06    | 2 10 6* | 1 10 6* |
|            |       | 1 00 0B |        |
| 04         | 07    | 2 00 0* | 3 05 0* |
|            |       |        | 1 05 0B |
|            |       | 4 10 6* | 4 15 6* |
|            |       |        | 5 0B   |

FIG.19.

INVENTOR
BY  H H Keen

ATTORNEY

Oct. 3, 1939.                H. H. KEEN                2,174,699
            RECORD-CARD-CONTROLLED STATISTICAL MACHINE
                 Filed June 20, 1934    21 Sheets-Sheet 15

|  | ACCUMULATOR 2 | ACCUMULATOR 3 | ACCUMULATOR 4 |
|---|---|---|---|
| CARD CYCLE | 00010 00 0 | | |
| CYCLE 1 | PRINT ⟶ | 00010 00 0 | |
| CYCLE R | 99989 19 11 | | |
|  | 1 | | |
|  | 00000 00 0 | | |
| CARD CYCLE | 00045 10 0 | | |
| CYCLE 3 | ⟶ | 00045 10 0 | |
|  | | 00055 10 0 | |
| CYCLE 2 | | ⟶ | 00055 10 0 |
| CYCLE 1 | PRINT | PRINT | |
| CYCLE R | 99954 09 11 | 99944 09 11 | |
|  | 1 | 1 | |
|  | 00000 00 0 | 00000 00 0 | |
| CARD CYCLE | 00025 00 0 | | |
| CYCLE 3 | ⟶ | 00025 00 0 | |
| CYCLE 2 | | ⟶ | 00025 00 0 |
|  | | | 00080 10 0 |
| CYCLE 1 | PRINT | PRINT | PRINT |
| CYCLE R | 99974 19 11 | 99974 19 11 | 99919 09 11 |
|  | 1 | 1 | 1 |
|  | 00000 00 0 | 00000 00 0 | 00000 00 0 |

INVENTOR
H. H. Keen
BY
ATTORNEY

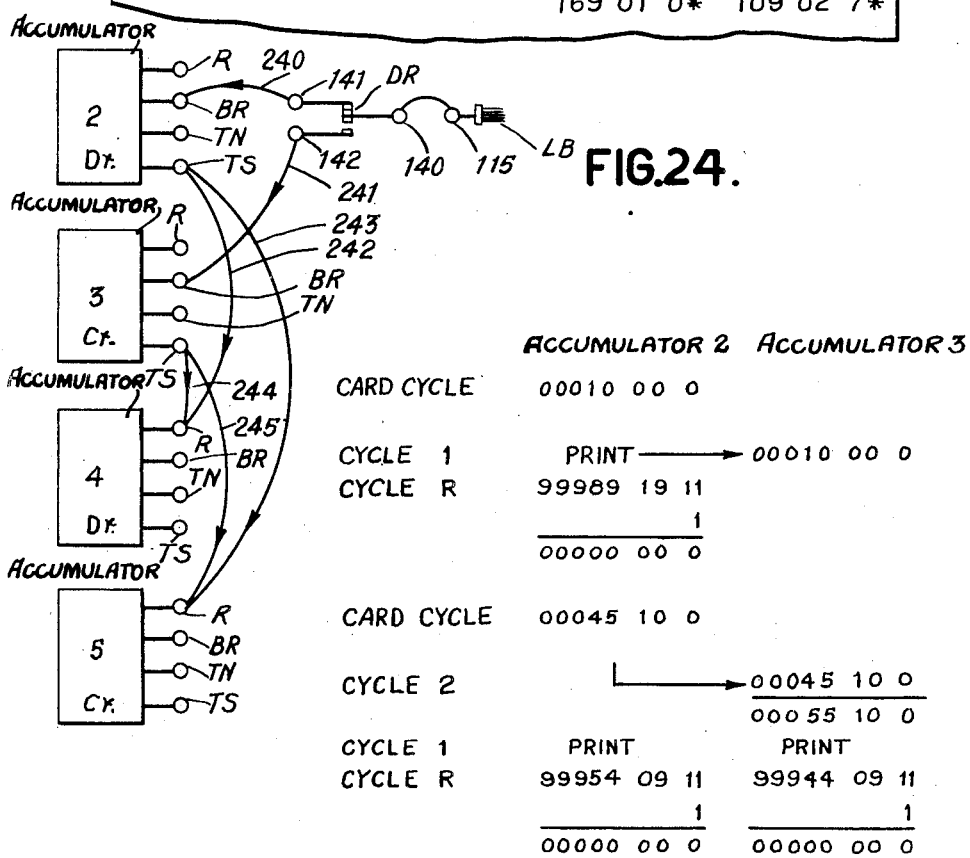

Oct. 3, 1939.  H. H. KEEN  2,174,699
RECORD-CARD-CONTROLLED STATISTICAL MACHINE
Filed June 20, 1934   21 Sheets-Sheet 17

FIG.23.

| | DAY | Dr. ACCUMULATOR 2 | Cr. ACCUMULATOR 3 | Dr. ACCUMULATOR 4 | Cr. ACCUMULATOR 5 |
|---|---|---|---|---|---|
| TAB. CYCLE | 1 | 007 10 6 | | | |
| " " | 1 | | 024 00 0 | | |
| " " | 1 | 101 00 0 | | | |
| | | 108 10 6 | 024 00 0 | | |
| CYCLE 3 | | PRINT AND COMPARE | | | |
| CYCLE 2 | | | | →108 10 6 | |
| CYCLE 1 | | | | | →975 19 11 |
| | | | | | 1 |
| | | | | | 084 10 6 |
| CYCLE R [IDLE] | | | | | |
| TAB CYCLE 2 | | | | | |
| | | 108 10 6 | 024 00 0 | | |
| CYCLE 3 | | PRINT AND COMPARE | | | |
| CYCLE 2 | | | | →108 10 6 | |
| | | | | 193 01 0 | |
| CYCLE 1 | | | | | →975 19 11 |
| | | | | | 1 |
| | | | | | 169 01 0 |
| CYCLE R [IDLE] | | | | | |
| TAB. CYCLE 3 | | | 200 00 0 | | |
| " " | 3 | 006 06 11 | | | |
| | | 114 17 5 | 224 00 0 | | |
| CYCLE 3 | | PRINT AND COMPARE | | | |
| CYCLE 2 | | | | | →885 02 6 |
| | | | | | 1 |
| CYCLE 1 | | | | | →224 00 0 |
| | | | | | 109 02 7 |
| CYCLE R | | 885 02 6 | 775 19 11 | | |
| | | 1 | 1 | | |
| | | 000 00 0 | 000 00 0 | | |
| CYCLE 4 | | | | PRINT | PRINT |
| CYCLE 3 | | PRINT AND COMPARE | | | |
| CYCLE 2 [IDLE] | | | | | |
| CYCLE 1 [IDLE] | | | | | |
| CYCLE R | | 999 19 11 | 999 19 11 | 830 18 11 | 890 17 4 |
| | | 1 | 1 | 1 | 1 |
| | | 000 00 0 | 000 00 0 | 000 00 0 | 000 00 0 |

INVENTOR
J H Keen
BY
ATTORNEY

Oct. 3, 1939.  H. H. KEEN  2,174,699
RECORD-CARD-CONTROLLED STATISTICAL MACHINE
Filed June 20, 1934   21 Sheets—Sheet 20
FIG.28.
| Gross Price | Trade Disc. | Cash Disc. | Net. Price | Total |
|---|---|---|---|---|
| 11  17  6 | 2  19  4 |   6  0 | 8  12  2* |  |
| 74  10  0 | 18  12  6 | 1  17  5 | 54  00  1* | 62  12  3* |
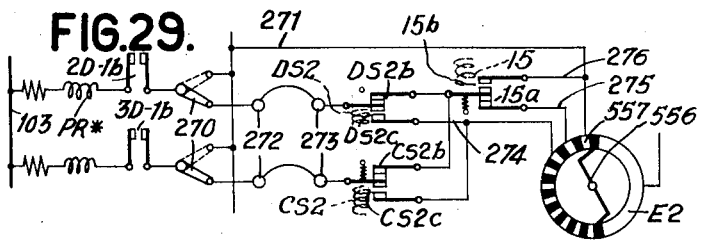
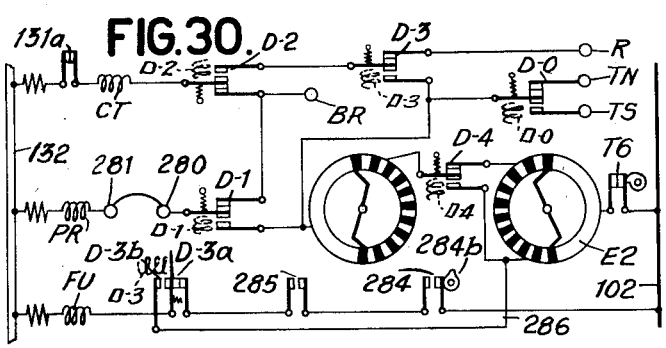
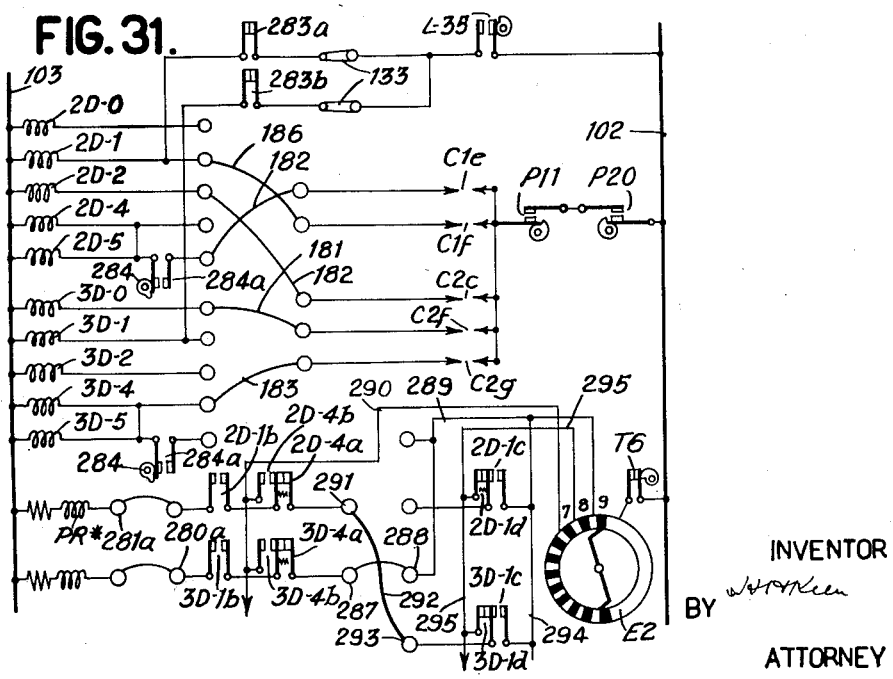
INVENTOR
BY  H. H. Keen
ATTORNEY Oct. 3, 1939.  H. H. KEEN  2,174,699
RECORD-CARD-CONTROLLED STATISTICAL MACHINE
Filed June 20, 1934   21 Sheets-Sheet 21

INVENTOR
Harold H. Keen
BY
ATTORNEY

Patented Oct. 3, 1939

2,174,699

UNITED STATES PATENT OFFICE 2,174,699

RECORD-CARD-CONTROLLED STATISTICAL MACHINE

Harold Hall Keen, Letchworth, England, assignor to International Business Machines Corporation, New York, N. Y., a corporation of New York Application June 20, 1934, Serial No. 731,459
In Great Britain July 7, 1933

31 Claims. (Cl. 235—61.7)

This invention relates to record-card-controlled statistical machines and amongst the objects of the invention are to provide such a machine which will be flexible and capable of adaption to perform various operations, to provide novel means by which the true algebraical sum of a number of positive and negative amounts can be obtained and to provide an improved controlling mechanism for such a machine.

According to the present invention there is provided a record-card-controlled statistical machine comprising the combination with a plurality of accumulators, of reading-out mechanism by which the amount registered by any one accumulator can be read out and entered in any one accumulator, and controlling means operable automatically to cause the reading-out mechanism to read out the amounts in predetermined accumulators and enter them into predetermined accumulators in a succession of cycles.

Preferably, the controlling means is adjustable at will to vary the accumulators involved in any one cycle. By suitably adjusting the controlling means the particular operation, to be performed by the machine as a whole, may be varied as desired.

In order to allow of the subtraction of an amount registered in one accumulator from that registered in another accumulator, the reading-out mechanism may be operable to enter the complement of some or all of the amounts read out. It is also a feature of the invention to arrange the reading-out mechanism to enter into an accumulator the complement of the amount which it has read out of the accumulator so that the accumulator is reset to zero by subtracting the amount it contains.

According to another aspect of the invention, there is provided a record-card-controlled statistical machine comprising the combination with an accumulator, of an adjusting device (for example one of the distributors referred to hereinafter) operable to condition the accumulator to perform a predetermined invariable operation (for example to transfer to, or to receive an amount from, another accumulator), a plurality of initiating devices operable in sequence each to initiate a separate one of a sequence of cycles, connecting means adjustable operatively to connect the adjusting device to a selected one or more of the cycle-initiating devices, selectively at will, in such manner that the adjusting device is caused, by the initiating device to which it is connected, to operate in a selected one or more of the sequence of cycles.

Preferably, there are provided a plurality of adjusting devices each operable to condition the accumulator to perform a separate operation and the connecting means is adjustable to connect a selected one or more of the adjusting devices to a selected one or more of the initiating devices selectively so that the accumulator may be conditioned to perform a number of different operations during the sequence of cycles. There may be conveniently provided a plurality of accumulators and associated adjusting devices and the connecting means may be adjustable to connect some or all of the adjusting devices to some or all of the initiating devices selectively in accordance with the sequence of operations which the accumulators collectively are to perform, or take part in, during the sequence of cycles.

The connecting means may include a plurality of switching devices each appropriated to a separate accumulator and each switching device may be adjustable to any one of a number of positions and arranged to connect the adjusting devices, associated with the accumulator to which it is appropriated, to the initiating devices in such manner that the accumulator will be conditioned to perform, or take part in, a different sequence of operations during a sequence of cycles for each position of switching device.

According to yet a further feature of the present invention, there is provided a record-card-controlled statistical machine comprising the combination with automatic group-control mechanism arranged to detect that the last card of each of a number of groups of cards has been read and to initiate an operation or a sequence of operations by the machine appropriate to the kind of group to which the said card belongs, of initiating devices (for example arranged as described above) each operable to initiate a different operation by the machine and so operatively connected to the automatic group-control mechanism as to be operated selectively, after the last card of a group has been read, in accordance with the kind of group to which said card belongs.

Preferably, the cycle-initiating devices referred to in the preceding paragraph are arranged to operate in sequence and each to initiate the operation of the next device in the sequence and the automatic group-control mechanism is arranged to cause a selected one of the initiating devices to operate first in accordance with the type of group. Manually adjustable means may be provided for varying the operation of the initiating devices under the control of the group-control mechanism in accordance with the general type of operation which the machine should perform; for example it may be desired that all the initiating devices should operate at the end of one type of group when the machine is operated in one manner and that only one of these devices should operate at the end of that type of group when the machine is operated in another manner and this may be provided for by the manually adjusting means.

According to another aspect of the present invention there is provided a record-card-controlled statistical machine comprising the combination with two accumulators, of reading-out mechanism arranged to read out the total registered in either one of the accumulators selectively and enter that total into the other accumulator in such manner as to diminish the total registered therein by the total entered, and total comparing mechanism operative automatically to determine, by a comparison of the totals recorded in the two accumulators, which accumulator contains the smaller total and to adjust the reading-out mechanism to read out the total from that accumulator and enter it into the other accumulator. With this arrangement the smaller of the two totals is always subtracted from the larger so that the true difference is obtained. Preferably, the reading-out mechanism is arranged to enter into the appropriate accumulator the complement of the total read out from the other accumulator.

The machine may be provided with a receptive device (for example another accumulator or printing or other recording mechanism) and the reading-out mechanism may be operable to read out the amounts registered in one of the two accumulators and enter in into the receptive device in its true form. The comparing mechanism may be operable to adjust the reading-out mechanism to read out, for entry into the receptive device, the amount from that one of the two accumulators into which the entry was previously made from the other accumulator, so that the true balance is read out of the accumulator which contains it and entered into the receptive device.

A preferred embodiment of the present invention will now be described, by way of example only, with reference to the accompanying drawings, in which—

Figure 3 is a partial side elevation of the card-feeding mechanism;

Figure 4 shows diagrammatically driving connections to accumulators and printing mechanism of the machine;

Figure 4a shows part of mechanism of Figure 4 to a larger scale;

Figure 5 is an elevation, partly in section, of one of a number of switches provided in the machine;

Figure 6 is a section on the line 6—6 of Figure 5;

Figure 7 shows index dial used with a main control switch which is of the kind shown in Figures 5 and 6;

Figure 8 shows an index dial used with an accumulator control switch which is also of the kind shown in Figures 5 and 6;

Figure 11:
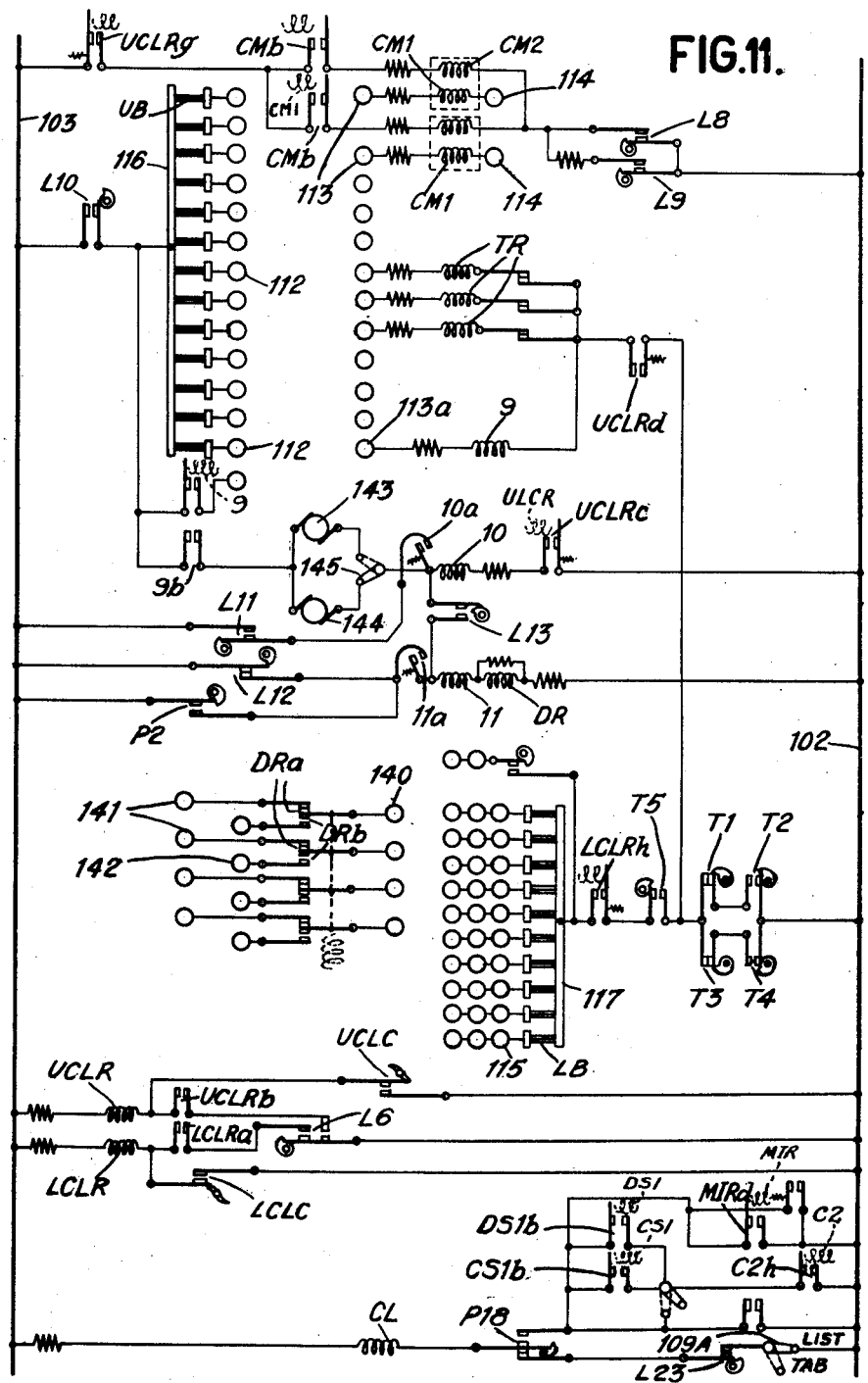

Figures 9, 10 and 11, arranged vertically with Figure 9 on top and Figure 11 at the bottom, form a circuit diagram showing the control circuits of the machine.

Figure 12:
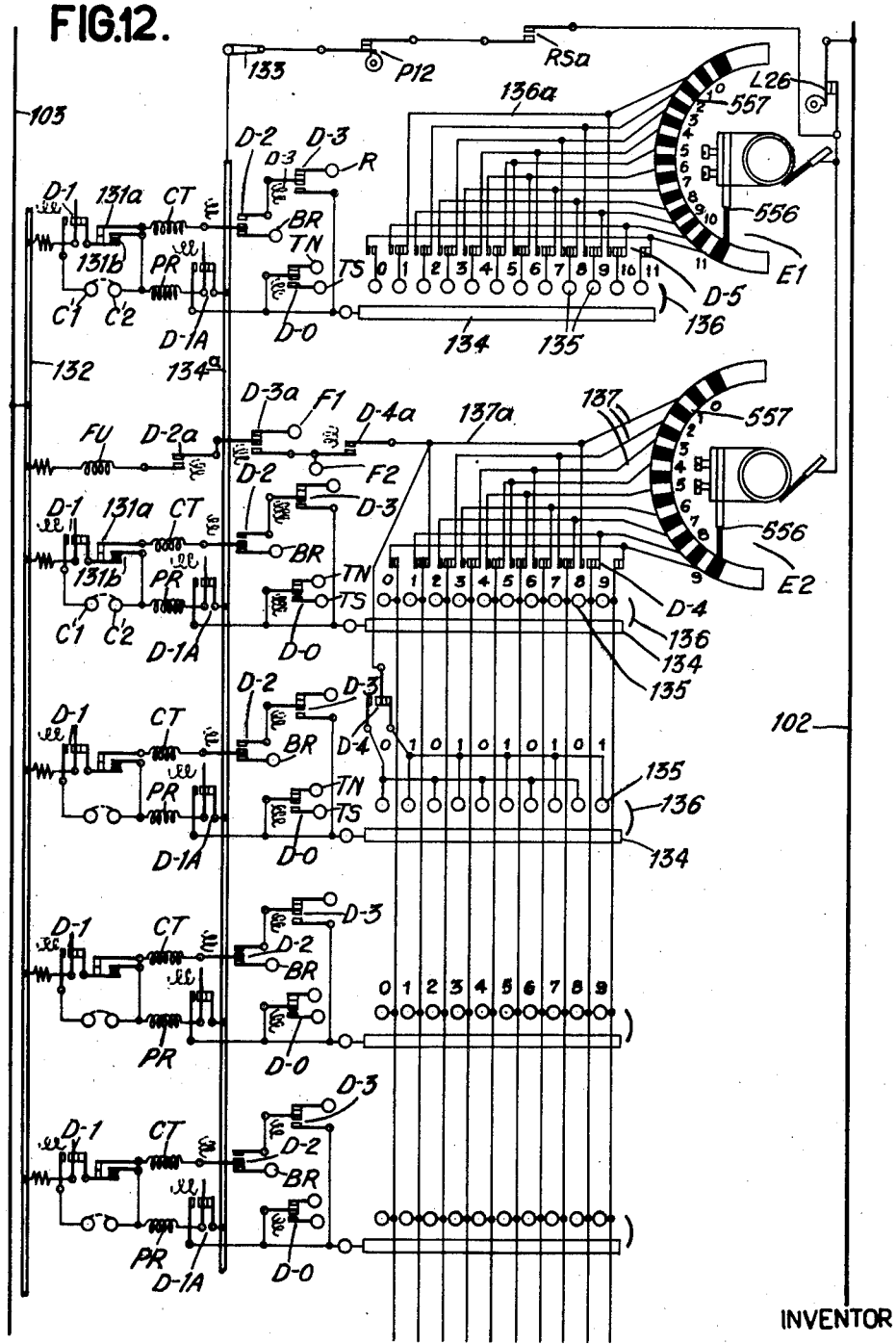
Figure 13:
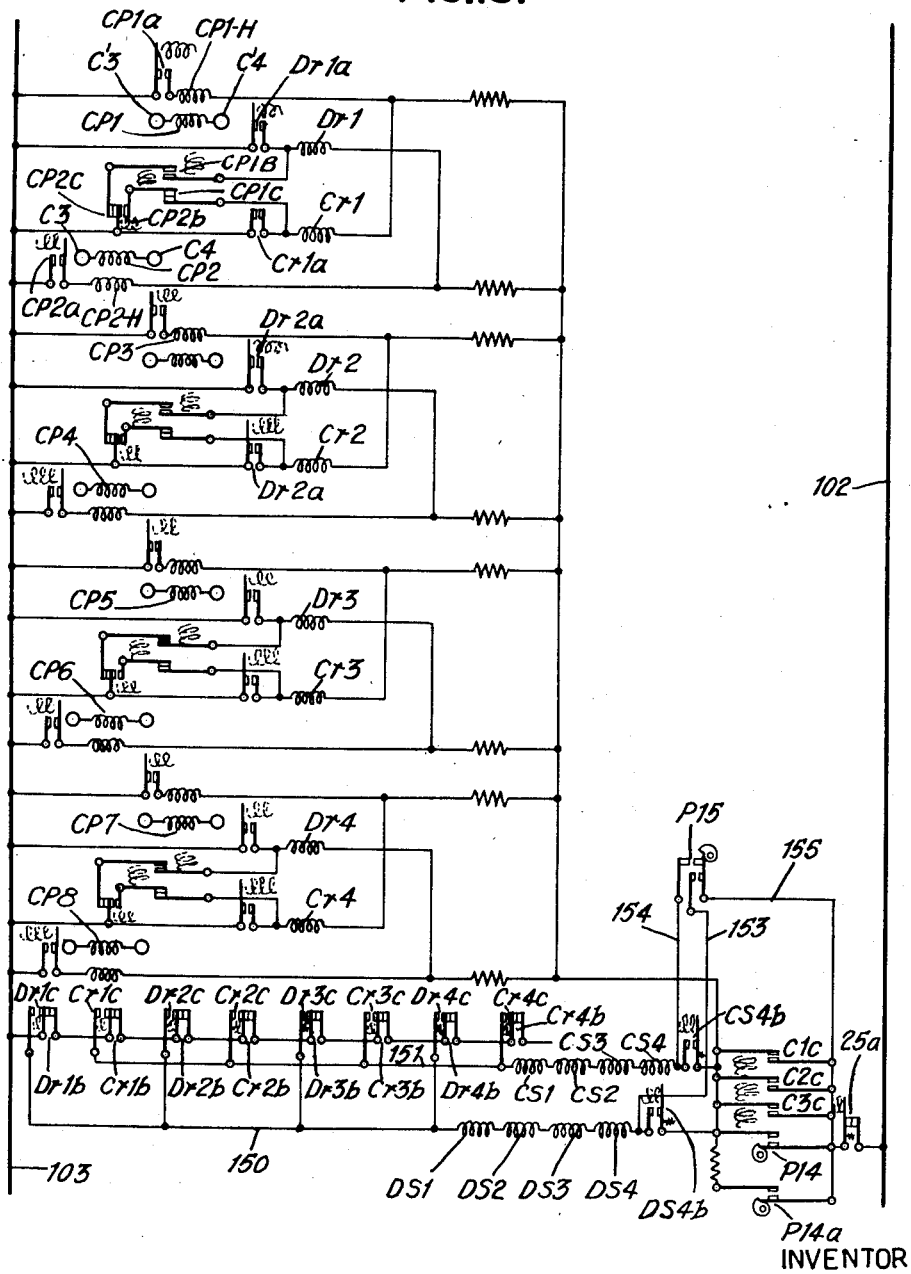
Figure 14:
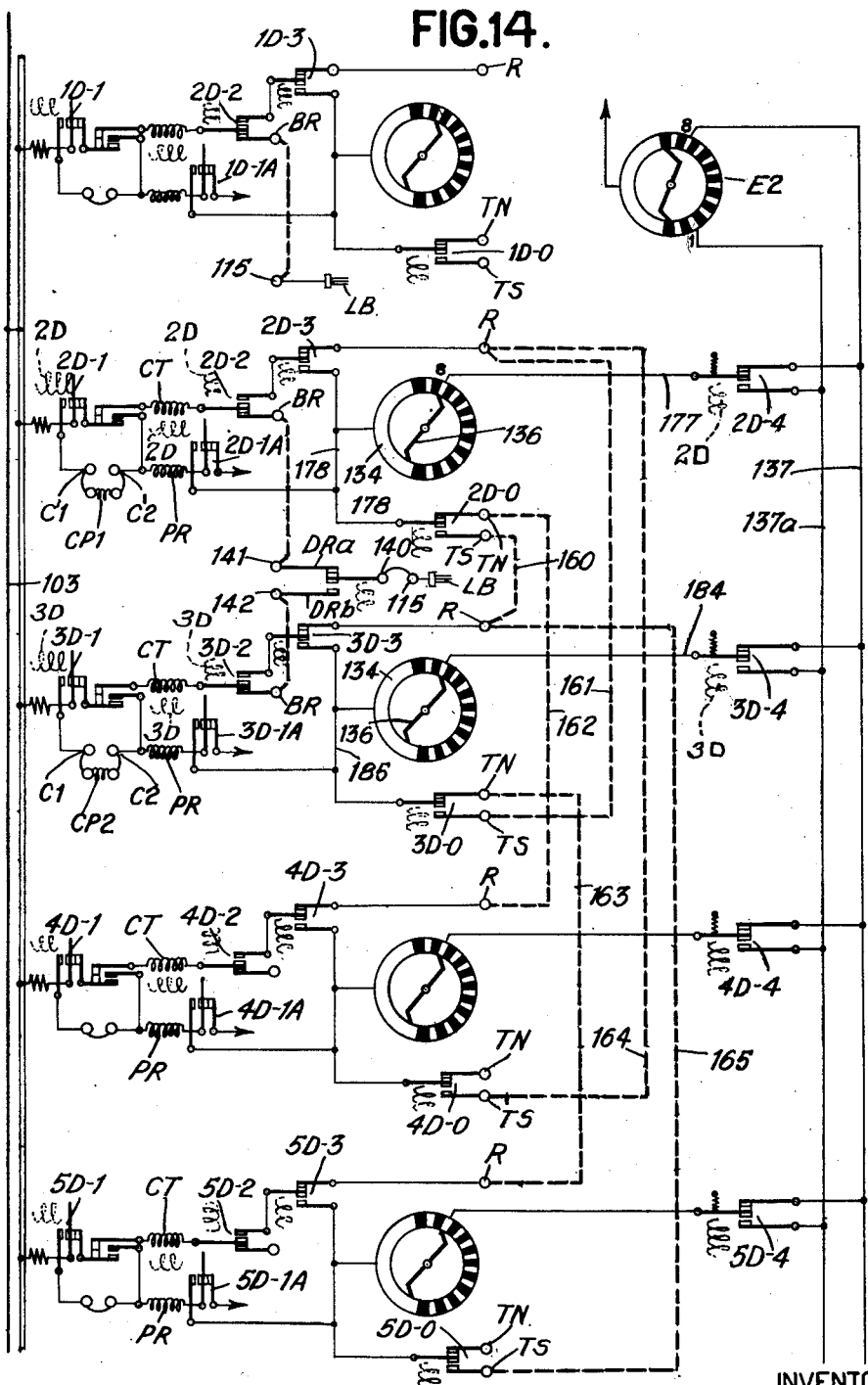
Figure 15:
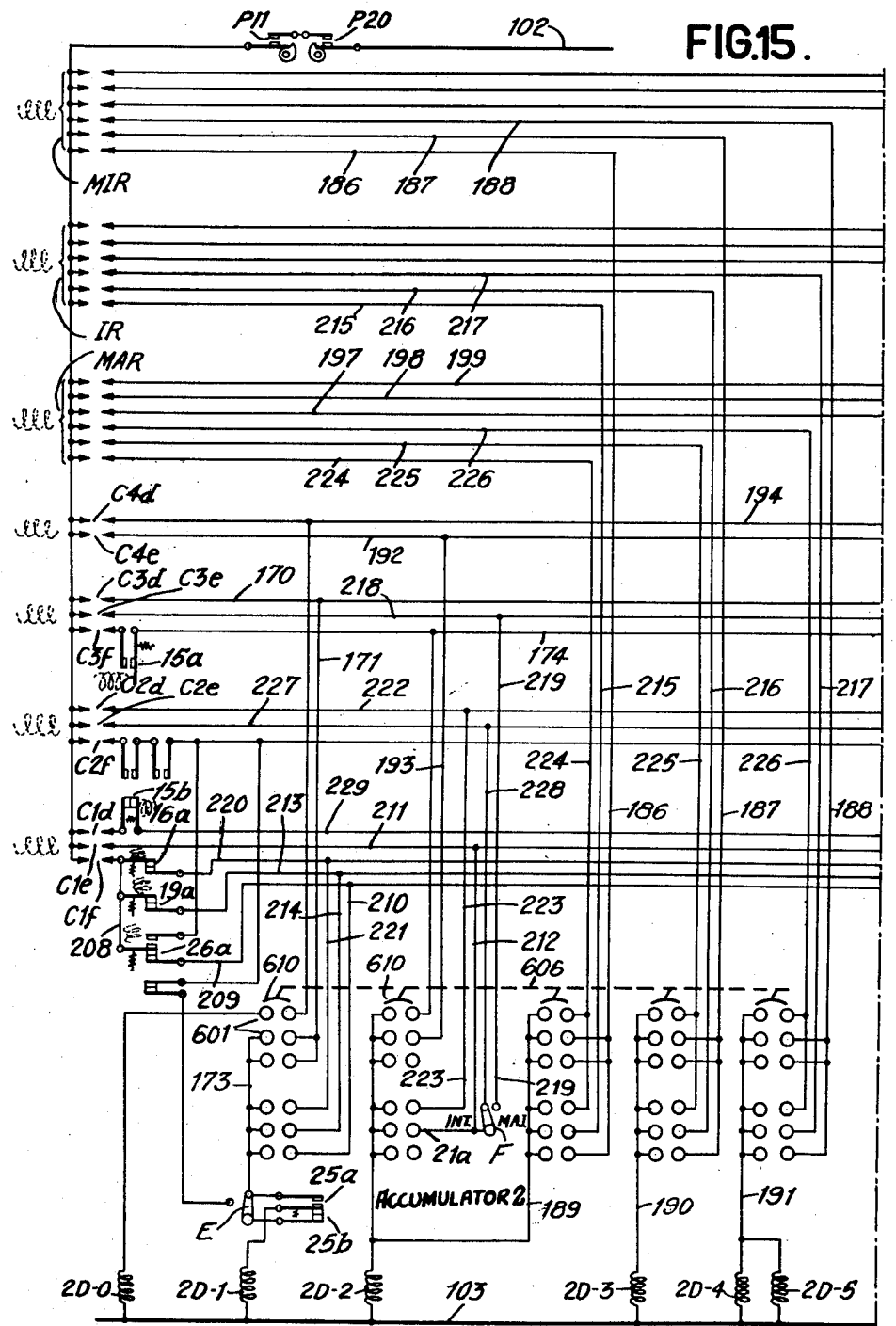

Figure 12 is a circuit diagram showing the circuits for five denominations of an accumulator in the machine;

Figure 13 is a circuit diagram for comparing mechanism in the machine;

Figure 14 is a diagram showing the circuits involved when effecting subtraction under minor and intermediate group control. This figure shows the circuits for a single denomination of each of five accumulators in the machine;

Figures 15 and 15a together form a circuit diagram showing the connections for two accumulator-control switches in the machine. The switches are of the kind shown in Figures 5, 6 and 8 and serve to connect distributing relays to the contacts of cycle-initiating relays.

Figure 16 shows plugging connections made to the distributing relays shown in Figure 15 when the machine is adjusted for subtraction;

Figure 17 is a diagram showing the connections to the main switch which is arranged as shown in Figures 5, 6 and 7.

Figures 20, 21:
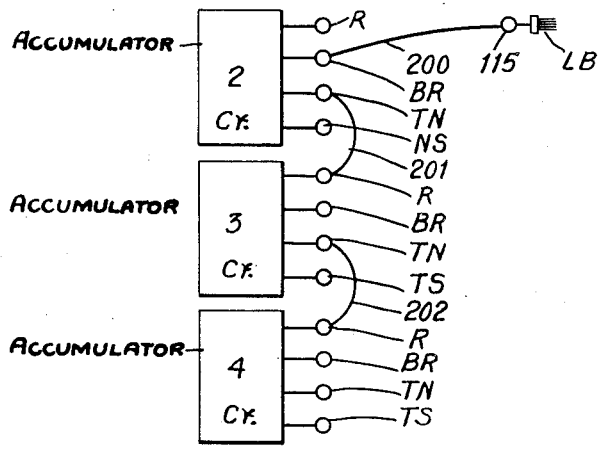

Figure 18 is a diagram illustrating the operation of the machine when subtracting under intermediate group-control;

Figure 19 shows the return prepared during the operations illustrated in Figure 18;

Figure 20 is a diagram showing plugging connections required for operations under major, intermediate and minor group control;

Figure 21 is a diagram illustrating the operation of the machine under major, intermediate and minor group control;

Figure 22 is a similar diagram illustrating the operation of the machine under intermediate minor group control.

Figure 23 is a diagram illustrating the operations of the machine in calculating debit and credit interest figures.

Figure 24 is a diagram showing plug-connections made when setting the machine to operate in the manner illustrated in Figure 23.

Figure 25 shows a return prepared by the machine during the operations shown in Figure 23.

Figure 26:
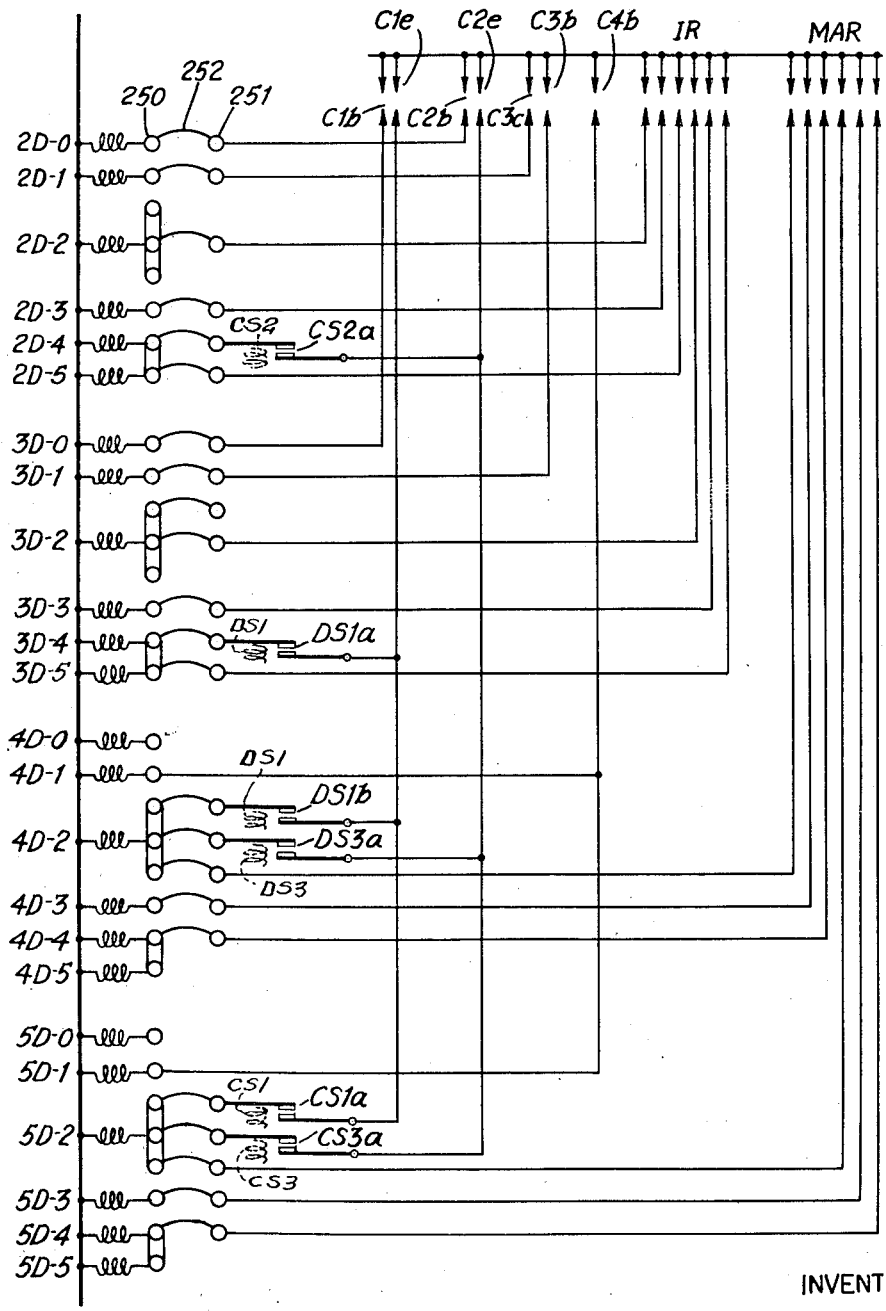

Figure 26 is a circuit diagram showing connections between the distributing relays and the cycle-initiating relays when the machine is adjusted to operate as shown in Figure 23.

Figure 27:
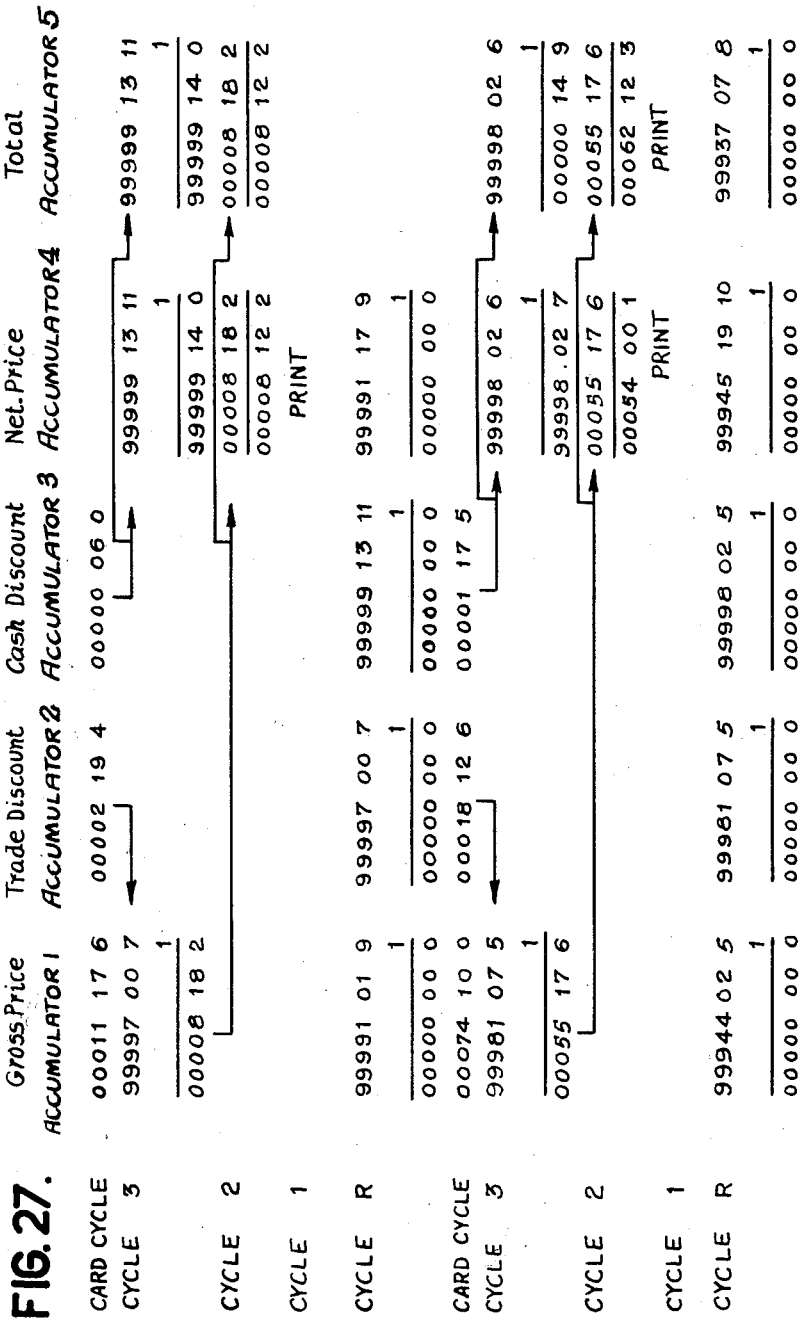

Figure 27 is a diagram illustrating the operations of the machine when performing cross-addition and -subtraction.

Figure 28 shows the return produced by the machine when operating as shown in Figure 27.

Figure 29 is a diagram showing symbol printing circuits of the machine;

Figure 30 is a diagram showing modified accumulator and printing circuits; and

Figure 31 is a diagram showing circuits involved in a modified method of obtaining a balance between two totals.

Figure 32:
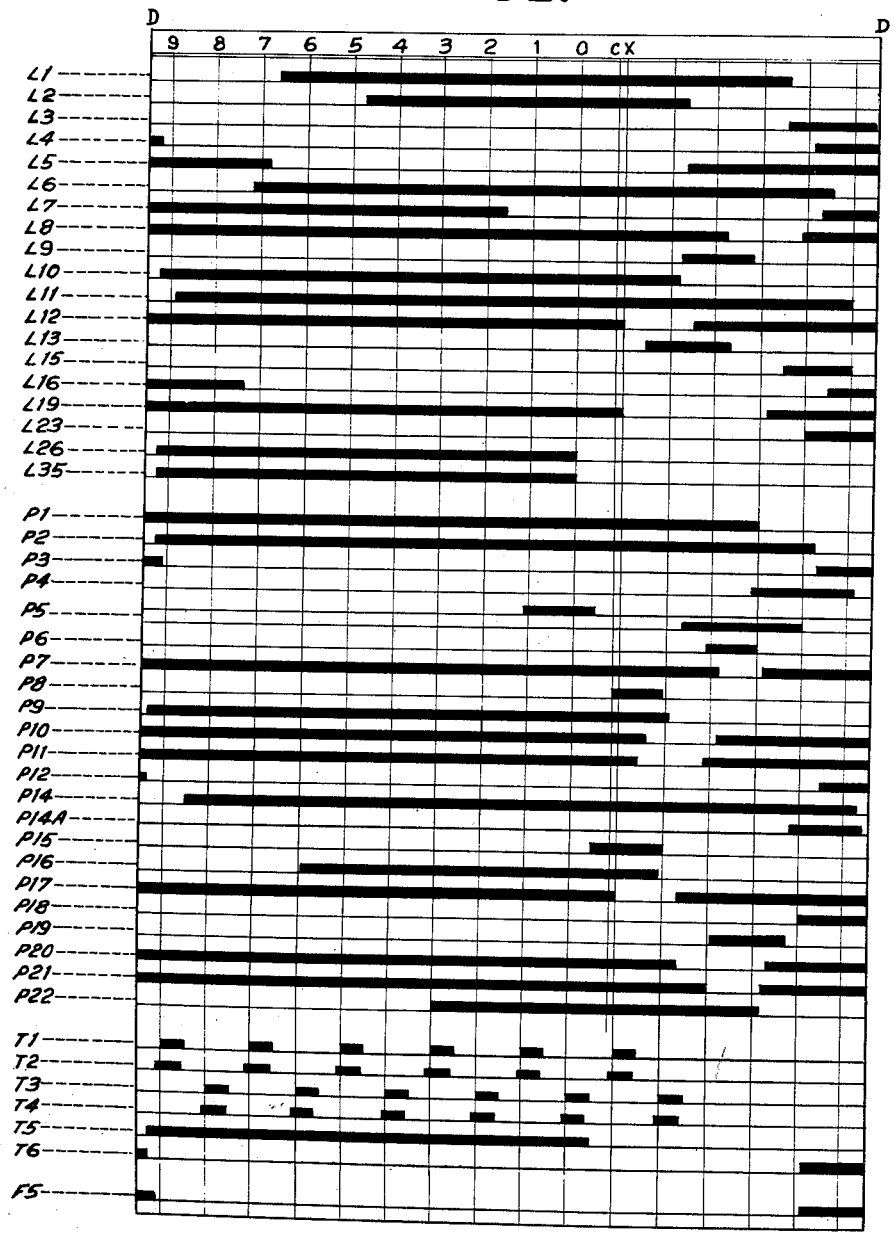

Fig. 32 is a timing chart of the electric contact devices.

The present invention will be explained as applied to a "Hollerith" tabulating machine. A machine of this kind is described in British patent specification No. 247,200 (United States Patent No. 1,762,145, Daly and Page), and except as described hereinafter the present machine is similar to that described in this prior specification.

Figure 1:
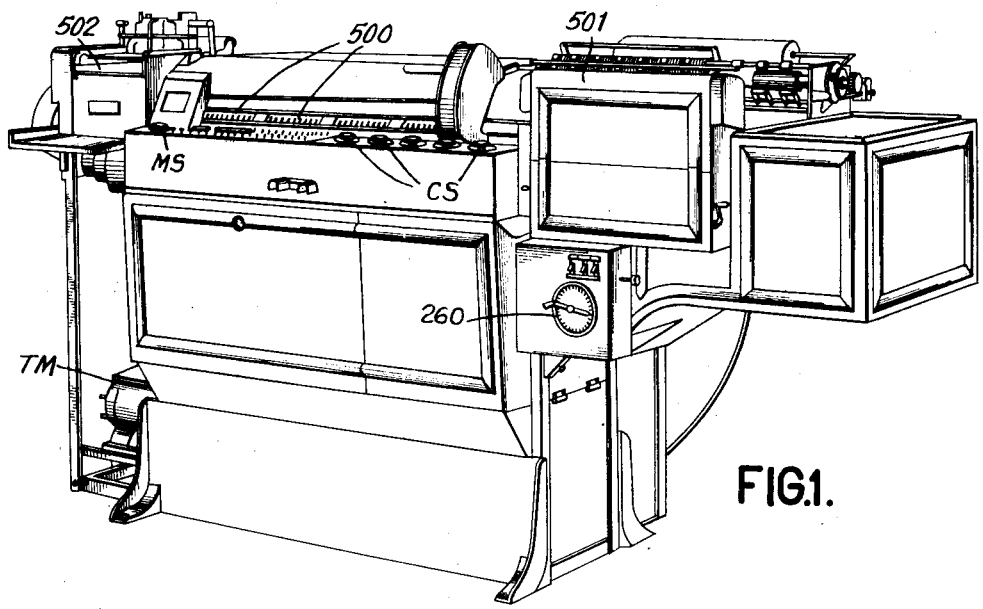
Figure 1 is a perspective view of a tabulating machine embodying the present invention.

The machine is provided with five accumulators 500 (Figure 1), controlled by accumulator-magnets CT (Figure 12) in the usual manner and printing mechanism 501 with reciprocating type bars which are differentially arrested by print magnets PR (Figure 12) to print amounts entered into the machine and/or totals obtained by the machine. The machine is also provided with card-feeding mechanism 502 which feeds perforated cards one by one, first past upper brushes UB (Figure 11), and then one cycle later past lower brushes LB. These mechanisms are of conventional construction and will not be described herein. The arrangement for driving these mechanisms differs from the usual arrangement owing to the omission from the machine of the usual reset motor, reset shaft and total-printing shaft. The driving arrangement will accordingly now be described.

Main drive

Figure 2:
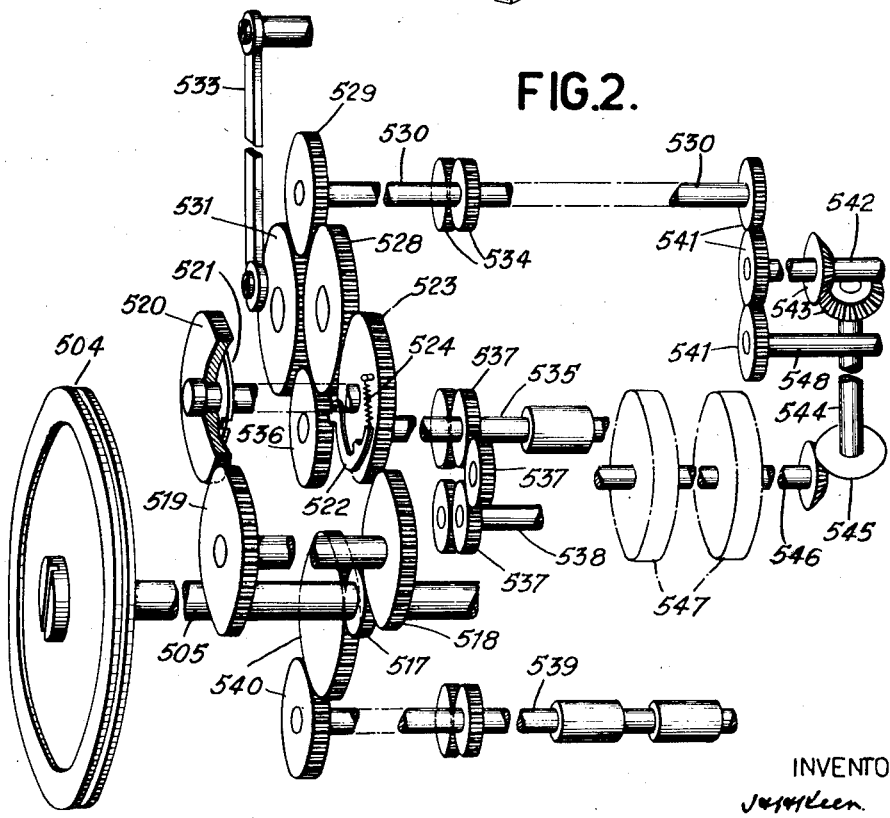
Figure 2 shows diagrammatically the arrangement of card-feeding mechanism of the machine.

The machine is driven by a motor TM (Figure 1) which through a belt drives a pulley 504 (Figures 2 and 4). The pulley 504 is freely mounted on a shaft 505 and has a ratchet wheel 506 secured to it. (See Figure 4.) The ratchet wheel 506 forms one part of a main drive clutch which is a one-revolution clutch of conventional construction. The other part of this clutch comprises a pawl 507 (Figures 3 and 4) which is pivoted on a member 509 and is pressed towards the ratchet wheel by a spring 508. The member 509 is secured to the shaft 505. A latching lever 510 is normally urged upwards by a spring 511 (Figure 4) to engage the member 509 and the pawl 507 and to hold the former stationary and the latter clear of the ratchet wheel 506. The shaft 505 thus remains stationary. On the energization of a main drive clutch magnet DC the latching lever 510 is rocked counter-clockwise (Figure 4) and releases the pawl 507 and the arm 509. The former then engages the ratchet wheel 506. The shaft 505 is then connected to the pulley 504, and will continue to rotate so long as the magnet DC remains energized. In Figure 3 the pulley wheel 504 and the ratchet wheel 506 have been removed in order to show the parts lying behind them.

The shaft 505 through gearing 512 (Figure 4) drives a shaft 513. This shaft carries gear-wheels 514 which drive the constantly rotating parts of the accumulators in a conventional manner. The shaft 513 drives a listing shaft 516 through gearing 515. The listing shaft 516 corresponds to the listing shaft of British No. 247,200, (U. S. 1,762,145). When the magnet DC is energized it opens normally closed contacts DCa (Figure 4). The shaft 516 carries cams which operate continuously contacts designated L and a suffix in the circuit diagrams.

The main drive clutch just described corresponds to the card-feed clutch usually employed in this type of machine. Normally, in prior machines, this clutch is only engaged during card-feeding cycles and is disengaged during total printing and resetting cycles. In the present machine this clutch is engaged during the whole time that the machine is in operation. A separate card-feed clutch is therefore provided for transmitting the drive to the card-feeding mechanism during card-feeding cycles and for interrupting that drive during total taking cycles.

Card feed mechanism drive

Referring to Figures 2 and 3, a gear-wheel 517 is secured on the shaft 505 and through idler wheels 518 and 519 drives a gear-wheel 520. A notched disc 521 is secured to the wheel 520 and co-operates with a pawl 522 which is pivoted on a gear-wheel 523 and is pressed towards the disc 521 by a spring 524. In Figure 2, the wheels 520 and 523 are shown separated for the sake of clearness. A latching lever 526 (Figure 3) is urged by a spring 527 to engage a projecting tail 525 of the pawl 522, and hold the pawl away from the disc 521. When a card-feed clutch-magnet CFC is energized, the lever 526 is rocked clockwise (Figure 3) so as to release the pawl which engages the notch in the disc 521 and couples the gear-wheels 520 and 523 together. The gear-wheel 523 will thus rotate so long as the magnet CFC is energized at the proper time in each cycle.

The gear-wheel 523 drives a gear-wheel 528 which in turn drives a gear-wheel 529 secured on a feed-roll shaft 530. The gear-wheel 529 drives a gear-wheel 531 having an eccentric pin 532 to which is connected a link 533 operating a conventional picker (not shown). The picker withdraws one card from a card-magazine and feeds it to pairs of feed-rolls carried by the shaft 530 and a parallel shaft which is driven from the shaft 530 by gear-wheels 534. These feed-rolls feed the card past the upper brushes and to pairs of feed-rolls carried by a shaft 535 (Figure 2) and a parallel shaft driven therefrom. The shaft 535 is driven from the gear-wheel 528 by means of a gear-wheel 536 (Figure 2). The shaft 535 through gearing 537 drives another feed-roll shaft 538 which, in conjunction with an associated parallel feed-roll shaft, feeds each card past the lower brushes. After the cards have passed the lower brushes they are ejected to a discharge box by means of a pair of feed-roll shafts 539 which are continuously driven by gearing 540 from the gear-wheel 517. From the foregoing it will be noted that the cards will be fed one by one from the card magazine, so long as the magnet CFC is maintained energized. When this magnet is de-energized, the feed-roll shafts 530, 535 and 538 and the associated parallel shafts will come to rest and will hold the card which has just passed the upper brushes in a position in which it is just about to pass the lower brushes. The card which has just passed the lower brushes will, however, be fed out to the discharge box by the feed-rolls on the pair of shafts 539.

The shaft 530 through gearing 541 drives shafts 542 and 548. The shaft 548 carries cams for operating the several contacts designated T and a suffix (in Figure 11) during card-feeding cycles only. The shaft 542 through bevel gearing 543 drives a shaft 544. This shaft through bevel gearing 545 thus drives a shaft 546 which carries pence translators 547. These translators are known in the art as Campbell's pence translators, and are provided for controlling the entry of pence digits from the card into the accumulator of the machine. These translators are fully described in the British specification No. 288,360, (corresponding to U. S. Patent No. 1,987,322) and will not be described herein.

When the magnet CFC is de-energized, the latch lever 526 moves a rod 549 to the right (Figure 3) to open contacts CFCa and close contacts CFCb. When the magnet is energized and the lever 526 rocks clockwise, the contacts CFCa close and the contacts CFCb open.

P-shaft drive

Referring now to Figure 4, the shaft 516 through gearing 550 drives a sleeve 551 which is freely mounted on a "P-shaft" 552. A notched disc 553 secured to the sleeve 551 co-operates with a pawl 554 pivoted on a part secured to the shaft 552. The pawl is normally held away from the disc by a latching member 555, but, when a magnet PSC is energized, the member 555 is rocked clockwise to release the pawl and couple the P-shaft 552 to the sleeve 551 for one revolution. When the magnet PSC is energized, it opens normally closed contacts PSCa and PSCb and closes the normally open contacts PSCc.

The shaft 552 carries cams for operating contacts designated P and a suffix in the circuit diagram. These cams control all total taking operations. This shaft also carries brushes 556 of two emitters E1 and E2. Each emitter is in the form of a commutator having conducting segments 557, there being twelve segments for the emitter E1 and ten for the emitter E2. The emitter E1 serves to complete the connections through its segments 557 and its brush 556 at times in the machine cycle corresponding to twelve pence digits, while the emitter E2 similarly serves to complete connections at times corresponding to the ten digits of the decimal notation. The shaft 552 will be referred to hereinafter as the P-shaft.

Print clutch

A box cam 560 is freely mounted on the shaft 516. This cam corresponds to the cam 311 of British 247,200 (U. S. No. 1,762,145), and serves to raise and lower the type bars of the printing mechanism in the same way as the cam 311 of that specification. The cam 560 can be coupled to the shaft 516 by means of a one-revolution clutch comprising a notched disc 561 secured to the shaft and a pawl 562 pivoted on a member which is secured to the box cam 560. Normally the pawl is held away from the disc 561 by a bellcrank lever 563 which is pivoted at 564. When a print clutch magnet PC is energized, it attracts its armature 565 and rocks the lever 563 which releases the pawl 562 and allows the print clutch to engage. The cam 560 will thus turn through a revolution and operate the printing mechanism. Contacts PCa are closed by the lever 563 when the latter rocks to permit the print clutch to engage. These contacts are thus closed during all printing cycles.

The paper is fed after each printing operation by a conventional pawl and ratchet line spacing mechanism (which is not shown), which in turn is operated by the mechanism shown in Figure 4a. This mechanism is generally similar to that described in British No. 247,200 (see Figure 8 thereof) (U. S. 1,762,145) and will only be described briefly.

A frame 570 is pivoted at 571 and is connected by a link 572 to the pawl and ratchet mechanism. A projection 573 of the frame 570 is engaged by a pin on an arm 574. This arm is secured on a shaft 575 which corresponds to the shaft 305 of the prior patent and which is rocked by the cam 560 during each printing operation. The shaft 575 is rocked clockwise during the upward movement of the type bars, so as to rock the frame 570 counter-clockwise and to operate the line-spacing mechanism before printing takes place. Provision is made for effecting a line-spacing operation after the printing of each total, in order that the total may be separated by two line spaces from the next line of printing. The magnet PSC is energized during each total taking cycle but not during card-feed cycles. The P-shaft 552 thus rotates during all total taking cycles. This shaft carries a disc 576 on which is a pin 577 (Fig. 4). During each total taking cycle and after printing has been effected, the pin engages a lever 578 which is loosely pivoted on the shaft 575. The lever is connected by a link 579 (Fig. 4a) to the frame 570 so that the rocking of the lever 578 rocks the frame 570. The link 579 is connected to the frame by a pin and slot connection, so that the frame can rock independently of the lever 578.

The frame 570 carries a block 580 which co-operates with the hooked end of a "carriage latch" lever 581. This lever (Figure 4) is pivoted at 582 and, when the frame is rocked to line space the paper, the hooked end of the lever 581 engages under the block 580 and latches the frame 570 in its displaced position. The line-spacing mechanism cannot now be operated until the frame 570 is unlatched. This is effected by energizing a magnet CL which attracts its armature 583 and rocks the lever 581 counter-clockwise to release the frame 570. It will be noted that a line-spacing operation can only take place if the magnet CL is energized during or since the last line-spacing operation. The performance of the line-spacing operations is thus under the control of the magnet CL.

Main and accumulator control switches

The machine is provided with a main control switch MS (Figure 1), and five accumulator-control switches CS, one for each accumulator. The construction of these switches is shown in Figures 5 and 6.

Each switch comprises a cylinder of insulating material 600 carrying twelve rows of fourteen contacts 601. The cylinder is closed at each end by end-plates 602 and 603. Mounted in the end-plate is a rotor having spigots 604 and 605 which pass through the end-plate. A setting knob 605a is secured to the spigot 604. The rotor comprises a rectangular bar 606 and a rod 607 secured at their ends to plates 608 and 609 which carry the spigots. The bar 606 is made of insulating material and carries six pairs of sliding contacts 610. Each contact 610 is slidably mounted in a sleeve 611 out of which it is pressed by a spring 612. The contacts 610 are electrically connected together in pairs, and for this purpose the sleeves 611 of a pair are secured in a metal strip 613 which is individual to that pair of contacts. Each unit comprising a pair of contacts is held in position on the bar by means of a screw 614.

Each switch assembly comprises six twelve-way switches ganged for simultaneous operation. Each switch assembly has one "off" position in which the contacts 610 engage a row of contacts 601 to which no connections are made and a number, up to eleven, of control positions. In each control position the switch assembly can complete connection in a number, up to six, of circuits. The connections for the contacts 601 will be explained later herein.

General operation

From the foregoing it will be understood that the main drive clutch is engaged, the main drive clutch magnet DC being energized, during the whole time the machine is in operation, so that the accumulators are continuously operative and can add amounts entered into them during any cycle of the machine. The machine will perform card-feeding cycles so long as the card-feed clutch is engaged by the energization of the magnet CFC (Figure 3), and, during a card-feeding cycle, items read from a card will be entered into the accumulators. If the print clutch is also engaged by the energization of the magnet PC (Figure 4) the items read from the card can also be printed.

When totals have been obtained from a group of cards, these totals may be added to one another or one total may be subtracted from another by causing the machine to perform a series of total taking cycles. During a total taking cycle, the amount, or the complement of the amount, in one accumulator, can be entered into another accumulator so that the amounts in the two accumulators can be added together, or that in the first accumulator can be subtracted from that in the second accumulator, to give the balance between the two amounts. As previously mentioned, the usual reset motor and reset shaft have been omitted. Any accumulator can be reset to zero in the present machine by entering into it the complement of the total it contains, which operation leaves the accumulator standing at zero.

The manner in which a sequence of total taking cycles is initiated and controlled will be explained later. It should be noted that during all total taking cycles the magnet PSC will be energized and the P-shaft clutch engaged so that the P-shaft 552 will rotate. This shaft operates all the contact devices controlling total taking operations. When a total is to be printed during a total taking cycle, the print clutch magnet PC is energized and the print clutch is engaged.

It will be seen that the printing mechanism only operates during the cycles in which printing is desired. The machine is provided with a variable motor as explained in British No. 247,200 (U. S. No. 1,762,145). It is arranged to drive the machine at a speed of 150 cards per minute, when the printing mechanism is idle and at a speed of 120 cards per minute when the printing mechanism is in operation. In prior machines of this kind it is not necessary (for reasons which need not be explained here) to change the characteristics of the motor TM from high speed to low speed. In the present machine this must be done whenever the operation of the machine is changed from non-printing to printing. The control circuits of the present machine have been modified to provide a third-speed of 75 cards per minute, at which speed the motor delivers a high torque. When a change is made from non-printing operations to printing operations, the motor circuits are first adjusted to give the motor the ultra-low-speed characteristic so that it operates rapidly to reduce the speed of the machine. This condition only lasts momentarily and the circuits are then adjusted to give the motor the printing or normal low-speed characteristic. The manner in which this is effected will be apparent from the description of the control circuit of the machine which now follows.

*Card feed clutch magnet and motor circuits*

The closure of a main switch 100 (top, Figure 9) connects main supply lines 102 and 103 to a source of supply through the usual safety contacts 101. The lines 102 and 103 supply current to all the circuits of the machine.

When the current is first switched on, a circuit is set up from the right-hand line 102 through contacts 34a (lower right, Figure 9), a line 128 (see also Figure 10) contacts 14b and relay coils 32, 31, 30, 29, MC and 27 to the line 103. The relay MC is a master control relay and opens its contacts MCc (right centre, Figure 9) which are in series with start key contacts S. The closure of the latter contacts will thus be of no effect. The operator then depresses a reset key and thus initiates a single total taking cycle, during which the relay MC is de-energized, in a manner explained later under the heading "Starting cycles". The machine then comes to rest.

The machine is re-started by de-pressing a start key to close contacts S and complete a circuit from the line 102 through cam contacts P—3 (now closed), stop key contacts T, the contacts MCc of the master control relay MC, the contacts S, reset interlock contacts RL, the normally closed contacts PSCa (which open only when the magnet PSC (Figure 4) is energized), the card-feed clutch magnet CFC, and a relay coil 2 to the line 103. The card-feed clutch is then engaged. The relay 2 closes its contacts 2a to complete a circuit from the line 102 through these contacts, the main clutch-magnet DC and the contacts DCa to the line 103. The main drive clutch will therefore engage and the contacts DCa will be opened (see also Figure 4). When these contacts open, the circuit will continue through a relay coil HD with which the contacts are in parallel.

The relay HD is thus energized and closes its contacts HDa and HDb to complete a circuit extending from the line 102 through a line 104, a starting control relay ST, the contacts HDb and HDa and the motor TM. A large current flows momentarily over this circuit and the relay ST becomes energized and closes its contacts STa to short-circuit, through the line 104, resistances 105 and 106 which are in series with the shunt-winding 107 on the motor TM. With this winding connected directly between the lines 102 and 103, the motor will operate at the ultra-low speed of 75 cards per minute and at high torque, thus facilitating the starting of the machine. As the speed builds up, the current through the motor circuit will fall off until it is insufficient to maintain the relay ST energized. When this occurs, the contacts STa will open and include the resistances 105 and 106 in the circuit of the shunt winding 107 of the motor. This will give the motor high speed characteristics and the motor will operate at high speed.

The card-feed clutch magnet CFC when energized closes its contacts CFCa to provide a holding circuit for itself through cam contacts L—2 and cam contacts P—3. Cam contacts L—2 open towards the end of each card-feed cycle, and, at this time, the card-feed clutch magnet circuit will extend through the contacts CFCa, contacts UCLRa and L—1 in parallel, and the contacts MCc, the contacts T and the cam contacts P—3. Card-feeding cycles will thus continue as long as the contacts MCc remain closed. As will be explained later under the heading "Starting cycles", the contacts MCc remain closed during the first card-feed cycle on starting the machine and open during the second card-feed cycle so that the circuit to the magnet CFC will be broken after the machine has performed two card-feed cycles. During these two cycles the first card is fed to and past the upper brushes and into position to pass the lower brushes.

*Card lever relay circuits*

When the first card approaches the upper brushes it closes conventional card-lever contacts UCLC (bottom of Figure 11) and energizes a relay UCLR. This relay closes contacts UCLRb to provide a holding circuit for itself through cam contacts L—6. When the same card approaches the lower brushes, it closes card-lever contacts LCLC to energize a relay LCLR. This relay closes its holding contacts LCLRa to provide a holding circuit for itself through the cam contacts L—6. These cam contacts open momentarily in each cycle at a time when the two pairs of card-lever contacts should be closed if a card is passing through the machine and serve to maintain the card-lever relays energized over the gap between the cards. The card-lever relays control various contacts referred to hereinafter.

*P-shaft and motor control circuits during total taking*

Towards the end of the second card-feed cycle cam-contacts L—3 (Fig. 9) close, and, contacts MCb being closed, a circuit is completed through the contacts P—3, T and MCb, contacts 56b (normally closed, an auto-reset switch AT, the contacts L—3, contacts CFCb (which are closed so long as the card-feed clutch magnet CFC is not energized) and in parallel through a line 108 and the magnet PSC and through relays 3, 4 and 5. Magnet PSC engages the P-shaft clutch so that all the cam contacts designated P and a suffix operate. The circuits just traced are held through contacts 4a closed by the relay 4, the holding circuit including contacts P—1 which are normally closed and open momentarily at the end of the cycle to break the holding circuit.

The relay 3 closes contacts 3a parallel with the contact 2a (top right Figure 9) so as to complete the circuit, through the drive clutch magnet DC, previously traced. The closure of the contacts 3a thus results in the tabulating motor circuit being maintained.

It will be noted that the times of closure of the contacts 2a and 3a do not overlap when the machine changes from card-feeding cycles to total taking cycles or vice versa, and both pairs may be open momentarily. In order to maintain the main drive clutch magnet DC energized at this time, a circuit is provided through this magnet, the contacts DCb closed by it and cam contacts L1. These latter contacts open at the end of each cycle to de-energize the magnet DC should neither of the pairs of contacts 2a and 3a be closed and stop the machine in the proper home positions.

Contacts 56a and MCa are connected in parallel with the contacts P—1. The contacts MCa are closed when the master control relay is energized. Thus so long as the master control relay is energized, the circuits for the magnet PSC and the coils 3, 4, and 5 will be held over the contacts MCa. When this relay is de-energized, contacts MCa open and the circuits are broken when the contacts P—1 open. The manner in which the relay MC is controlled will be explained later.

After two or more total taking cycles (depending on the setting of the machine) the contacts MCa and MCb open and contacts MCc close. Then the contacts P—1 open and de-energize the magnet PSC, and cam contacts P—4 close momentarily to complete a circuit extending from the line 102 through the cam contacts P—3, the stop contacts T, the contacts MCc, the cam contacts L—7, lower card-lever relay contacts LCLRb, the contacts P—4, and an autostart switch AS, the contacts PSCa (which are now closed), the magnet CFC and the relay coil 2 to the line 103. The machine then recommences card-feeding cycles, feeding the first card past the lower brushes and the second card past the upper brushes. Contacts P—4 close once in each total taking cycle, but the circuit just traced can only be completed if the magnet PSC is de-energized and the contacts PSCa closed, and this, in turn, depends on the condition of the contacts MCa. The machine then operates automatically until the cards become exhausted from the magazine. So long as the contacts MCc remain closed, (the relay MC being re-energized), the cards will be fed through the machine and amounts from the cards entered into the accumulators of the machine and, if desired, printed. At the end of each group of cards the contacts MCc will open, and the contact MCb close, as the result of the relay MC being energized in a manner which will be explained hereinafter. The machine will then perform total taking cycles until the relay MC is again de-energized and its contacts MCa open. When this occurs, card-feeding cycles will be automatically re-started in the manner just explained.

*Printing control circuits*

The print clutch magnet PC is energized during total taking cycles on the closure of any one of five pairs of contacts 1D—1a to 5D—1a (centre, Figure 9). Each pair of contacts forms a part of a different multi-contact electro-magnetic relay. The relays form part of a number of distributors, all of which are designed with the reference character D and which control the operation of the counters during total taking operations. Each distributor will be identified with a particular accumulator by a prefix numeral, thus the distributor 1D—1 controls the operation of accumulator No. 1 and so on. The suffix numeral identifies each distributor with the operation performed and all the distributors having the suffix 1 control printing. The arrangement of these distributors will be described hereinafter, but for the present it will be sufficient to explain that when the total on an accumulator is to be printed, the corresponding distributor D—1 is energized and closes its contacts D—1a, thus if the total in accumulator No. 1 is to be printed, the contacts 1D—1a will be closed and a circuit will be completed from the line 102 through the contacts P—1, the contacts 4a, cam contacts L—19, the contacts 1D—1a, contacts 4b closed by the relay 4, auto-brake relay coil AB1, and contacts 3b closed by the relay coil 3 to the print clutch magnet PC. The printing mechanism will thus operate during the cycle in which the contacts 1D—1a were closed.

The coil AB1 forms part of a double-wound coil, the other coil of which is shown at AB2. This relay is thus energized during a total-printing cycle and closes its contacts ABa (top right, Figure 9) so as to short-circuit the resistances 105 and 106 through normally closed contacts RSb. As previously explained, the motor TM will then have the ultra-low-speed characteristic, and its speed which was previously high, will rapidly be reduced to below the printing speed of 120 cards per minute. As the type-bars in the printing mechanism commence to rise, the contacts RSb are opened by a suitable part (such as the usual cross-head employed in this type of printing mechanism) so as to break the short-circuit about the resistances 105 and 106. The print clutch magnet PC has, however, closed its contacts PCa so as to short-circuit the resistance 106. Thus, only the resistance 105 will be in the shunt-winding circuit of the motor and the motor will operate at the intermediate speed of 120 cards per minute. The momentary adjustment of the motor to ultra-low-speed characteristic enables a rapid change to be made from the non-printing to the printing speed of the machine.

With a switch 109 adjusted to the LIST (dotted line) position, the printing mechanism will operate during all card-feeding cycles. With this setting, a circuit is completed on each card-feeding cycle through the contacts P—3, the contacts T, the contacts MCc, the contacts UCLRa, contacts LCLRb, a line 110, the switch 109, contacts 3c which are normally closed, and the magnet PC. It should be noted that this circuit is not completed until the lower card-lever relay is energized so that the printing mechanism will only operate so long as cards are actually passing the lower brushes. Further, this circuit is broken, first by the contacts MCc and then by the contacts 3c during total taking operations.

The circuit just explained allows of items read from the card being printed. In certain cases it is only required to print the totals. The switch 109 is then moved to the "TAB" position as shown. With this setting it is the practice to print, against the totals for each group of cards, a number identifying that group. This group-number is printed from the first card of the group of cards. It is, therefore, necessary to provide for the printing mechanism operating during the first card cycle in respect of each group of cards.

Referring now to the lower right-hand of Figure 10 cam contacts P—6 close momentarily during each total taking cycle of the machine to complete a circuit from the line 102 through contacts LCLRg (closed by the lower card-lever relay while cards are at the lower brushes), the contacts P—6, a relay coil 6 and a line 111 to the line 103. The coil 6 closes its contacts 6a to provide a holding circuit for itself through cam contacts L—5. These open momentarily in every cycle of the machine to break the holding circuit during the following cycle of the machine. If this following cycle is also a total taking cycle, the contacts P—6 will re-energize the coil 6 which will remain energized during part of the next cycle. This continues until a series of total taking cycles has been completed and card-feeding cycles have been resumed when the cam contacts L—5 will de-energize the coil 6 and the latter will remain de-energized until the next series of total taking cycles occurs. It will thus be seen that the coil 6 will be energized at the beginning of each card-feeding cycle that immediately follows a total-taking cycle.

The coil 6 closes its contacts 6b (left centre, Figure 9). The closure of these contacts does not, however, effect the operation of the machine during total-taking cycles, since they are in the circuit which includes the contacts MCc which are open during total-taking cycles. During the early part of the card-feed cycle immediately following a total-taking cycle, both the contacts MCc and the contacts 6b will be closed, and a circuit will be completed from the line 102 through the contacts P—3, the contacts T, the contacts MCc, the contacts UCLRa, the contacts LCLRb, the coil AB2, the cam contacts L—16, the contacts 6b, the contacts 3c, and the magnet PC. This magnet will then engage the print clutch and the printing mechanism will operate. After the magnet PC has been energized, the contacts 6b open and remain open until after the next total-taking cycle. The printing mechanism will thus operate during the first only of a series of card-feeding cycles. The coil AB2 controls the slowing-down of the machine from the high non-printing to the lower printing speed in the same way as explained in connection with the coil AB1.

*Automatic group control*

The machine is provided with automatic group control mechanism which compares group numbers on the card passing the lower brushes with the group numbers on the card passing the upper brushes and maintains the master-control relay MC de-energized as long as these group numbers agree. If the group numbers disagree, indicating that the card passing the upper brushes is the first card of a new group, the automatic control mechanism energizes the relay MC and initiates a series of total-taking operations. This mechanism differs from the conventional mechanism used in Hollerith machines in certain respects and will, therefore, be described.

Referring to Figure 11, if corresponding columns in the group number fields of two succeeding cards contain the same hole the circuit will be completed from the line 103 through cam contacts L—10, a contact roll 116, the upper brush reading the column in question, a plug socket 112, a plug connection, a plug socket 113, an operating coil CM—1 of a control relay, a plug socket 114, a plug connection, a plug socket 115, the lower brush reading the column in question, a contact roll 117, contacts LCLRh of the lower card lever relay, and contacts T—1 to T—5 to the line 102. The contacts T—1 to T—5 are operated during card-feeding cycles only by the shaft 542 (Figure 2).

A similar circuit is completed for each column of the group number field in which corresponding holes are present, in two succeeding cards, so that, if the group numbers agree, all the control relays CM—1 in use will be energized at some time during the cycle. If the group numbers do not agree one or more of the control relays will not be energized. When energized, the coil CM—1 closes contact CMb to provide a holding circuit extending through upper card lever relay contacts UCLRg, the contacts CMb in question, a holding coil CM—2 and cam contacts L—8 and L—9. This circuit is maintained until the end of the cycle and is then broken to de-energize the control relay.

When energized, each control relay closes an associated pair of contacts CMa (left bottom Figure 9). These contacts are connected in series and between each pair of contacts is connected a plug socket 118 by means of which the contacts can be split into a minor group of contacts, an intermediate group of contacts and a major group of contacts in a known manner.

The control circuits are arranged to allow of the cards being divided into major groups, each of which is in turn divided into intermediate groups, each intermediate group being in turn divided into minor groups. At the end of a minor group of cards one or more of the minor group contacts CMa will open. At the end of an intermediate group of cards one or more of the intermediate group of contacts CMa, while at the end of a major group one or more of the major group of contacts CMa, will open. These three groups of contacts control a minor control circuit, an intermediate control circuit and a major control circuit.

The major control circuit extends from the line 103 through a line 99, cam contacts L—20, relay coils 16, 15, 14 and MA relay contacts MA*a* which are held closed by the relay MA and tend normally to open, lower card lever relay contacts LCLR*c* and normally closed contacts 58*b* in parallel and cam contacts P—21, relay contacts 12*b* and relay contacts IR*c* in parallel to the line 102. The cam contacts L—20 open towards the end of each cycle but if there is no major group change during that cycle the major group contacts CM*a* will be closed and a shunt circuit will exist about the contacts L—20, extending through contacts UCLR*f*, a plug socket 121, a plug connection 122, the major control contacts CM*a*, a plug connection 123 and a plug socket 120. The major control circuit will thus be maintained. On the other hand, if there is a major group change, the major control circuit will fail and the relays in it will become de-energized, the contacts MA*a* opening to prevent the circuit being re-established when the cam contacts L—20 close.

The intermediate control circuit is similar and includes cam contacts L—21, relay coils 19, 18 and I, relay contacts I*a* of the coil I and the contacts MA*a* of the major control circuit. A shunt circuit about the cam contacts L—21 extends through the plug connection 122, all the major and intermediate control contacts CM*a*, a plug connection 124 and a plug socket 119. It will be noted that the intermediate control circuit will fail on an intermediate group change and also on a major group change when the major control circuit fails.

The minor control circuit includes cam contacts L—22, relay coils 26, 25, 24, 23, 22, 21 and MI, cam contacts MI*a* controlled by the relay MI, and the cam contacts I*a* and M*a*. The shunt circuit about the cam contacts L—22 includes all the control contacts so that the minor control circuit will fail on each change of group, whether it is a minor change, intermediate change or major change.

The cam contacts L—20 can be shunted by closing a switch 125 so as to maintain the major control circuit permanently energized. With this switch closed the machine will operate under intermediate and minor control only. The cam contacts L—21 can be shunted by a switch 126. With this switch closed the intermediate control circuit is maintained permanently energized. When both the switches 125 and 126 are closed the machine will operate under minor control only. Finally, the cam contacts L—22 can be shunted by closing a switch 127 to maintain the minor control circuit permanently energized. With all three switches closed the automatic group control mechanism is entirely inoperative and a total will only be printed when the last card has been fed from the magazine.

*Total taking cycles*

The present machine is capable of performing five total taking cycles in sequence but could be designed to perform more if necessary. These cycles will be referred to as cycles Nos. 4, 3, 2 and 1 and cycle R, and occur in that order. If a less number of cycles is necessary, one or more of the higher-numbered cycles are omitted; for example, printing a minor total only requires two cycles, namely cycles No. 1 and R, while obtaining and printing a balance requires cycles Nos. 3, 2 and 1 and cycle R. The operation to be performed in any one total taking cycle can be varied manually and the manner in which this is done will be explained later.

The manner in which the number of cycles is determined will now be explained.

*Cycle selection*

The machine is provided with four cycle-initiating relays C1, C2, C3 and C4 (lower Figure 10). Each of these relays initiates, when energized, the correspondingly numbered total taking cycle and they become energized in the reverse to their numerical order. A series of total taking operations may, however, be initiated by energizing any one of them. Thus, if the relay C2 is energized, the relays C3 and C4 will not be energized and the machine will only perform cycles 2 and 1 and cycle R. The manner in which these relays are selectively energized will now be explained.

The machine is provided with four double-wound cycle selecting relays 29, 30, 31 and 32 (top of Figure 10) which, when energized, select respectively the cycles 1, 2, 3 and 4, as the starting point for a series. The operating windings of these relays are connected in series with one another and a relay coil 27 and the master control relay coil MC, but the circuit can be tapped at any point, the circuit always, however, including the coils 27, MC and 29. The holding windings 29H to 32H of the selecting relays are in series each with its holding contacts 29*a* to 32*a* which are closed when the associated operating winding is energized. These holding circuits include contacts 27*a* closed by the coil 27 and parallel cam contacts P—9 which time the breaking of the holding circuit on the opening of the contacts 27*a*. The master control relay MC which is energized on all total taking operations, breaks the card-feed clutch magnet circuit by opening the contacts MC*c* (top Figure 9) energizes the relays 3, 4 and 5 by closing the contacts MC*b* and maintains these relays energized for a number of cycles by closing the contacts MC*a*.

The major, intermediate and minor control circuits include respectively the relay coils 14, 18 and 21. Normally, these coils are energized and hold pairs of contacts 14*a*, 18*a* and 21*a* closed and pair of contacts 14*b*, 18*b* and 21*b* open. The former are connected in series with one another and through the line 128 to the contacts 34*a* of the relay 34 and the latter in parallel.

The arrangement is such that, if the minor control circuit fails and the relay 21 is de-energized, a connection is completed through the contacts 34*a*, 14*a*, 18*a* and 21*b* in series to a "minor-total:minor-balance" switch C. If only minor totals are desired on a minor group change, the switch is in the position "MT" and continues the circuit through the relay coils 29, MC and 27 while, if a balance is required on a minor group change, the switch is in the position "MB" and the circuit extends through the coils 31, 30, 29, MC and 27, switches A and B being open. With the switch C in the first position, only cycles No. 1 and R occur on a minor group change, but with the switch in the other position cycles Nos. 3, 2 and 1 and cycle R occur.

When the intermediate control circuit fails, the contacts 18*b* close and the contacts 18*a* open. This establishes a circuit through the contacts 34*a*, 14*a* and 18*b* and the coils 31, 30, 29, MC and 27, the switches A and B being open. When the major control circuit fails, the contacts 14*b* close and the contacts 14*a* open. The circuit then extends through the contacts 34*a*, 14b and the coils 32, 31, 30, 29, MC and 27 and all four cycles Nos. 4 to 1 occur. The switch B in parallel with the coil 32 is closed except when balances are desired so that only three cycles occur on a major group change when this switch is closed.

The switch A is closed when the machine is operating to obtain totals but not balances under intermediate and minor control only. With this switch closed the relay 31 is short-circuited so that only two cycles occur on an intermediate group change.

To summarize the above, when the switch C is in the MB position and the switches A and B open, cycles 3, 2, 1 and R occur on a minor change, cycles 3, 2, 1 and R occur on an intermediate change and cycles 4, 3, 2, 1 and R occur on a major change. When the machine is operated under major, intermediate and minor control to obtain totals but not balances, the switch C will be in the MT position and the switch B closed. Cycles 1 and R will occur on a minor change and cycles 3, 2, 1 and R on either an intermediate or a major group change. When the machine is adjusted to operate under intermediate and minor control only, the switch A is also closed and cycles 1 and R occur on a minor group change while cycles 2, 1 and R occur on an intermediate group change.

It should be noted that the connections just explained are arranged for the particular operation of which the present machine is capable and may have to be varied when the machine is to be adapted for other operations.

The relays 29 to 32 include normally closed contacts 29b and 32b and normally open contacts 29c and 32c respectively. The contacts 32b to 29b are connected in series in that order between the contacts 27a (via a line 129) and the coil of the relay 34 whose function will be explained later. Normally, one or more of the relays 29 to 32 is energized so that one or more pairs of contacts 29b to 32b are open, breaking this circuit, and one or more of the pair of the contacts 29c to 32c closed. These latter contacts provide branch circuits from the circuit just traced.

As previously explained, the contacts LCLRg (lower right Figure 10) close as soon as the first card reaches the lower brushes. During the cycle following the closure of these contacts, cam contacts L—15 close to complete a circuit through a relay 35 and the line 111. The relay 35 closes its contacts 35a so as to provide a holding circuit for itself through contacts MARd. These contacts are opened when a relay MAR is energized during the R cycle following a major group change, as will be explained later. The holding circuit for the relay 35 is then transferred to cam contacts P—19. These open towards the end of the cycle R in question but the cam contacts L—15 are closed at this time so that if the cards are still passing the lower brushes and the contacts LCLRg are still closed, the relay 35 will be maintained energized. This relay thus remains energized until the last card has passed the lower brushes. The connections from the line 102 to the relay 35 also serve to connect the contacts 27a and cam contacts P—9 to the line 102, so long as cards are passing the lower brushes. The operation will be explained on the assumption that all four relays 29—32 are energized.

When the contacts 27a close, a circuit is established through them, the contacts 32c now closed, contacts 40a of a fourth cycle set-up relay 40 and the coil of the cycle initiating relay C4 which is energized. Towards the end of the cycle in which this occurs, cam contacts P—8 close and complete a circuit through the contacts 27a, normally closed contacts 41A of a third cycle pre-set-up relay 41 and the relay 40 which then opens the contacts 40a and closes contacts 40b. This establishes a circuit through the contacts 27a, 32c, 40b, and 31c, contacts 38a of a third cycle set-up relay 38, contacts C4b of the cycle-initiating relay C4 and the coil of the cycle-initiating relay C3. The contacts C4b were opened when the relay C4 was energized and close when it is de-energized. It should be explained that each cycle-initiating relay closes its holding contacts C4a to C1a to hold itself energized through cam contacts P10 timed to open at the proper time in the cycle. Thus the relay 40 can be energized earlier to prepare the set-up circuit for the relay C3 which is not completed until the relay C4 has been de-energized.

The closure of the contacts 40b also provides a circuit through the contacts 27a, 32c and 40b and the coils 41 and 40. Although at this time completed circuit connections are made to coil 41, no current passes as both terminals of coils 41 are at like electrical potential. Thus, the left hand terminal of coil 41 is connected to wire 129 leading to the right side of line 103, through contacts 41a, and P—8 (now closed), while the right hand terminal of coil 41 is connected to the same wire 129 through contacts 40b (now closed) and contacts 32c. Neither of these circuit connections offer any practical resistance so that coil 41 remains de-energized all the time that contacts P—8 are closed. It is not until contacts P—8 open that this state of electrical balance is interrupted when, owing to the still closed contact 40b, coil 41 immediately energizes and closes its contacts 41b to direct the next impulse from contacts P—8 to coil 38 during the latter part of the following cycle. The relay 41 is thus energized, opens its contacts 41a and closes its contacts 41b to connect the contacts P—8 to contacts 39a of a second cycle pre-set-up relay 39. When the contacts P—8 close in the next cycle, a circuit is established through the contacts 27a, P—8, 41b and 39a and the coil of the third cycle set-up relay 38. The contacts 38a of this relay open and contacts 38b close to complete a circuit through the contacts 27a, 32c, 40b, 31c, 38b and 30c, the contacts 36a of a second cycle set-up relay, contacts C3b of the cycle-initiating relay C—3 and the coil of the cycle-initiating relay C2. The closure of the contacts 38b also provides a circuit through the coils of the second cycle pre-set-up relay 39 and the second cycle set-up relay 38. The former relay opens its contacts 39a and closes its contacts 39b to prepare a circuit through the cam contacts P—8, the contacts 41b, 39b and contacts 37a to a second cycle set-up relay 36.

The cycle-initiating relay C1 is energized through the contacts 30c, 36b, 29c and 34d in the same way as the others when the second cycle set-up relay 36 is energized and, as before, a circuit is completed through the coil of a first cycle, pre-set-up relay 37 and the coil 36. The relay 37 opens contacts 37a and closes contacts 37b to prepare a circuit through the contacts P—8, 41b, 39b and 37b and the coil of the relay 34. This relay opens the contacts 34d to break the circuit to the initiating relay C1 and closes its contacts 34b to hold itself energized. This coil also opens its contacts 34a (lower right Figure 9) to throw the circuit to the operating coils for the relays 27 to 32 on to cam contacts P—17 (Figure 9). When these open the relays 27 and MC become de-energized but the holding windings of the other relays 29 to 32 are maintained energized through cam contacts P—9 (Figure 10) in parallel with the relay contacts 27a which now open. When the contacts P—9 open, the double-wound relays 29 to 32, the pre-set-up relays 37, 39 and 41 and the set-up relays 34, 36, 38 and 40 all become de-energized. The de-energization of the relay MC, when the contacts P—17 open, allows contacts Mca and Mcb to open so that the relays 3, 4 and 5 and the magnet PSC are de-energized when contacts P—1 (in parallel with the contacts MCa open. The contacts MCc also close so that the card-feed clutch magnet circuit can be reestablished through them when the cam contacts P—4 close. This completes a series of totalling cycles and card-feeding is resumed.

If, say, only the relays 29 and 30 had been energized, only cycles Nos. 2 and 1 and cycle R would have occurred. The contacts 32b, 31b, 30c and 29c would be closed and the contacts 32c, 31c, 30b and 29b open. Three circuits then exist, one through the contacts 27a and 32b and the coils 41 and 40, the second through the contacts 27a, 32b and 31b and the coils 38 and 39, and the third through the contacts 27a, 32b, 31b, 30c and 36a to the coil of the cycle-initiating relay C2. The circuits are then in a condition equivalent to that reached when the cycle 2 is initiated in a sequence of five cycles and the further operations are as previously explained.

*Accumulator reset control*

When energized, the relay 34 (Figure 10) causes the machine to perform the cycle R during which some of the accumulators will be reset in accordance with the kind of group change that has occurred. The relay 34 closes its contacts 34c (lower right Figure 9) to complete a connection through contacts 24a closed by the relay 24 in the minor control circuit, cam contacts P—16 and a group of contacts, to reset control relays MAR, IR and MIR. All three of these relays are energized on a major group change, the two latter on an intermediate group change and the third on a minor group change, and the accumulators can be selectively associated with these relays so as to be reset in a manner to be explained later, each when the associated relay is energized.

If the major control circuit has failed, the relay Ma will be de-energized and its contact MAc closed. The circuit will then continue from the cam contacts P—16 through the contacts MAc and the relay MAR. This relay closes its holding contacts MARa to hold itself energized over a circuit including a line 131 and cam contacts P—22 which open to de-energize the relay at the end of the cycle R. The relay MAR also closes contacts MARb and MARc to energize the relays IR and MIR over a circuit also including the line 131 and the cam contacts P—22.

On an intermediate group change, the relay MA remains energized and holds its contacts MAd closed, but the relay I is de-energized and its contacts Id open while its contacts Ic close. The circuit from the cam contacts P—16 then extends through the contacts MAd and the contacts Ic to the relay IR. This relay closes its contacts Ira to hold itself energized through the line 131 and the cam contacts P—22 and also closes its contacts IRb to energize the relay MIR through the line 131 and the cam contacts P—22. Thus the relays IR and MIR, but not the relay MAR, are energized on an intermediate group change.

On a minor group change, the contacts MAd and Id are held closed, but the contacts MIc close owing to the relay MI having been de-energized. The circuit then extends from the cam contacts P—16 through the contacts MAd, Id and MIc to the relay MIR. This relay closes its contacts MIRa to hold itself energized. Thus, on a minor group change only the relay MIR is energized.

*Recompletion of the automatic control circuits*

The relay 34 which is energized during the cycle R terminating a series of total taking cycles closes its contacts 34c (lower right, Fig. 9) so that when cam contacts P5 upper close during this cycle, the minor control circuit will be re-established through the contacts 34c and P5 upper, the relays MI to 26 and the contacts L22 which have already opened and reclosed in the cycle. The relay MI will thus become energized and will close its contacts MIa. The intermediate circuit will then be re-established through the contacts 34c, P—5 and MIa and the relay I will be re-energized and will close its contacts Ia. This re-establishes the major control circuit through the contacts 35c, P—5, MIa and Ia. The relay MA is then energized and closes its contacts MAa to hold the three control circuits energized after the contacts P—5 reopen.

When the machine is operating under intermediate control and performing subtraction, it is required for reasons which will be clear later to have two series of total taking operations, the first series being that appropriate to a change of intermediate control and the second appropriate to a change of major control. Under these conditions, a switch D (right centre Figure 9) is closed.

Upon an intermediate group change, the intermediate and minor control circuits, but not the major control circuit, fail. The relay I is de-energized and its contacts Ib close. A circuit is then completed from the line 103 through a relay coil 12, cam contacts F—5 operated by the P—shafts, the switch D, the relay contacts Ib, the relay contacts MAa, the contacts LCLRc, and the cam contacts P—21 and IRc in parallel. The latter contacts are normally closed but are opened by reset relay IR during the cycle R when the intermediate circuit has failed. The coil 12 closes its contacts 12a to provide a holding circuit through normally-closed contacts IRd which are opened by the intermediate reset relay IR during the next cycle R. The coil 12 also opens its contacts 12b but the major control circuit is maintained through the contacts IRc.

During the cycle R which concludes the first series of total taking cycles, the intermediate and minor control circuits are set up, as previously explained, and in consequence the contacts Ib open so that no circuit can be completed through them to the coil 12. The contacts IRd are also opened but the coil 12 is maintained energized through cam contacts P—7. After the cam contacts P—5 have re-opened, the cam contacts P—21 open. At this time both the contacts 12b and the contacts IRc are open so that the opening of the cam contacts P—21 interrupts all three control circuits and the machine operates as though a major group change had occurred. The cam contacts P—7 open after the contacts P—21 have opened and after the control circuit had failed to de-energize the relay coil 12. The contact 12b will thus close to permit of the re-establishment of the automatic control circuit, in the manner previously explained, when the second series of total taking cycles has been performed. The closure of the contacts 1b on the second failure of the intermediate control circuit does not re-energize the relay 12 since the contacts MAa are now open, the major control circuit having failed. Thus, when the control circuits are re-established in the cycle R concluding nine total taking cycles, the circuits will not fail again.

*Main control switch connections*

In Figures 9 and 10, the switches A, B, C, D, 125, 126, 127 have been shown as separate switches for clarity. Actually, these switches are constituted by the main control switch previously referred to.

As shown in Figure 7, the main control switch has six positions. The six columns of contacts 601 engaged by the pairs of contacts 610 in these six positions are shown in Figure 17 together with the connections to these contacts. In Figure 17, each pair of contacts 610 is shown by a curved line.

The upper pair of contacts constitute the switch B and it will be noted that this pair of contacts 610 will short-circuit the relay 32 when the switch is in the off, minor total, intermediate total, major total and minor subtraction positions of the main control switch. The next lower pair of contacts 610 form part of the switch A and will short-circuit the relay coil 31 in the off, minor total and intermediate total positions of the main control switch. The next lower pair of contacts form part of the switch C. It will be noted that these contacts, in the off and total positions of the switch, serve to connect the contacts 21b to the common connection between the relays 30 and 29. With this setting, the switch C cuts the relays 31, 32 out of circuit. These positions of the main control switch correspond to the MT position of the switch C. When the main control switch is either in the minor subtraction or the intermediate subtraction position, corresponding to the MB position of the switch C, the contacts 21b are connected to the common connection between the coils 32 and 31. Thus, with this setting the coils 31 and 30 will be included in the circuit through the contacts 21b.

The lowermost pair of contacts 610 form part of the switch 125. It will be seen that these contacts connect the line 99 to the major control circuit except in the major total position of the main control switch. Thus, a change of group can only de-energize the major control circuit if the main control switch is in the major position.

The next higher pair of contacts 610 perform the action of the switches 127 and D. When the main control switch is off, they connect the minor and intermediate circuits together. When the main control switch is in the intermediate subtraction position, these contacts 610 connect the cam contacts F—5 to the relay contacts Ib. In the off position of the main control switch a connection is established from the relay contacts UCLRb through the third pair of contacts 610 from the bottom to the intermediate control circuit and then through the second pair of contacts 610 from the bottom to the minor control circuit. The third pair of contacts 610 correspond to the switch 126 and also serve to connect the intermediate control circuit to the contacts UCLRb in the minor total and minor subtraction position of the main control switch.

It will be appreciated that the connections to the main control switch can be modified or additional connections provided to allow of special methods of operation by the machine. The connections shown in Figure 17 are those required for the most usual operations.

*Starting and finishing circuits*

As previously mentioned, when the current is first switched on to the machine, the relay MC is energized. This results from the fact that all three automatic control circuits will be broken and the contacts 14b (top Figure 10) closed allowing of a circuit through the contacts 35b (Figure 9) and the line 128 and the contacts 14b to the coil MC. Thus the circuit through the start key S is broken by the contacts MCc. The reset key is therefore depressed and contacts Ra closed to energize the magnet PSC and coils 3, 4 and 5 over a circuit including cam contacts L4 and start-key interlock contacts SL. This initiates a total taking cycle during which the automatic control circuits are set up and the relay MC de-energized. Normally, the maximum number of cycles which can occur would take place but special provision is made for ensuring that only one initial cycle is required.

Initially, the relay 35 (Figure 10) is de-energized and its contacts 35a open. Also the contacts LCLRg are initially open while contacts 58a are normally open. Thus the circuits to all the relays, including 34, in the lower left part of Figure 10 are broken. The relay 34 cannot, therefore, be energized, nor can the total taking cycles be initiated.

One total taking cycle occurs during which the cam contacts P—5 upper (lower right Figure 9) close but do not complete a circuit since the contacts 34c are open. Later the cam contacts P—5 lower close and complete a circuit through the contacts 35b, the relay MI, the minor control circuit and the cam contacts L—22. This circuit is completed after the cam contacts L—22 have opened and re-closed during the cycle. The re-completion of the minor control circuit results in the intermediate and the major control circuits being re-established in turn. These circuits are held through contacts 58b which are normally closed.

When the control circuits are set up, the relays 14, 18 and 21 are all energized and shift their contacts (top Figure 10) so as to de-energize the relay MC. The contacts MCb and MCa (top Figure 9) then open and the contacts MCc close.

The machine then comes to rest after one total taking cycle. On depression of the start key S (top Figure 9) the machine is started in the manner previously explained and performs two card-feeding cycles. During the first of these cycles, the relay UCLR is energized when a card reaches the upper brushes and the contacts UCLRb (lower left Figure 9) open, after the cam contacts L22 have opened and re-closed during the cycle. Concurrently, the contacts UCLRf close. This conditions the machine for operation under minor control during the following cycle, when there is no card under the lower brushes, and the first card passes the upper brushes.

During the second card cycle, the minor control circuit fails because none of the control contacts CMa will be closed. This results from the fact that the circuits for the control magnets CM—1 extend (Figure 11) through the contacts LCLRh in series with the lower brushes. These contacts are not closed until the first card reaches the lower brushes late in the second card feed cycle. The major and minor control circuits are, however, maintained through contacts LCLRe and LCLRd (lower left Figure 9) which do not open until late in the second card feed cycle.

On the failure of the minor control circuits, a circuit is completed through the contacts 34a (lower right Figure 9) and the magnets 27 and MC as though to initiate the total taking operation appropriate to minor group change. Since, however, the contacts 35a are open, the relays 34 and 36 to 41 cannot be energized. The minor control circuit is, therefore, set up at the end of a single total-taking cycle over the circuit previously traced through the contacts 35b and P—5 (lower right Figure 9). When this occurs, the relay MC is de-energized and its contacts MCc close and allow the auto-start circuit to be completed through the now closed contacts UCLRa, LCLRb and the cam contacts P—4 in the manner previously explained. The machine will then commence tabulating operations with the cards.

During the total-taking cycle following the first two card feed cycles, the contacts LCLRg (right Figure 10) are closed so that when the cam contacts L—15 close the relay coil 35 will be energized late in the cycle and will close its contacts 35a to hold itself energized through the contacts MARd. This completes the connections from the line 102 to the relays 34 and 36 and 41 so that these relays can be energized during the next series of totaling-taking operations.

When the machine stops due to exhaustion of the cards and the main switch 100 (top Figure 9) is not opened, the machine can be restarted after a new batch of cards has been inserted merely by depressing the start key. In this case, the major, intermediate and minor control circuits will be set up in the last cycle of the machine through the cam contacts P—5 upper in the usual manner. Consequently, no circuit will be completed, when the machine stops, through the contacts 34a and 14b to the relay MC. The contacts MCc (top Figure 9) will thus be closed and will allow of the usual starting circuit through the contacts S.

When the machine is started in the manner just explained, the relay 35 will, in general, be energized so that the machine will perform two card feed cycles followed by the total-taking cycles appropriate to a minor group change and will then proceed automatically into full operation. The relay 35 is provided to ensure that only one reset cycle is necessary when the machine stops with the major, intermediate and minor control circuits all interrupted. The holding circuits for the relay 35 include the contacts MARd. When the machine is operated under major control or intermediate subtraction control, the last cycle of the machine will occur at a time when the major control circuit is broken so that the relay MAR will be energized and the contacts MARd opened. The relay 35 will, therefore, be de-energized when the contacts P—19 open. Under these circumstances, only a single total-taking cycle will occur when the machine is restarted.

*Accumulator and print magnet circuits and the distributors*

Figure 12 shows the circuits associated with five denominations of one accumulator.

Six distributors in the form of multi-contact electric relays are associated with each accumulator. The six distributors associated with one accumulator will be designated D—0, D—1, D—2, D—3, D—4 and D—5 and the contacts of these distributors are shown in Figure 12 and are correspondingly identified. In the other figures of the drawings the distributors associated with the various accumulators are distinguished from one another by a prefix showing the number of the accumulator with which the distributor is associated.

As previously mentioned, an accumulator is controlled by the usual accumulator-magnets CT, each of which has associated with it a print-magnet PR. Five accumulator magnet and five print magnet circuits are shown in Figure 12. The upper pair of circuits relate to the pence denomination of the accumulator and the remaining four to the shillings and pounds denomination of the accumulator. When an amount is entered into an accumulator from the card, plug sockets BR are connected to the sockets 115 associated with the lower brushes in respect of all denominations except the pence denomination. In this denomination the socket BR is connected to the pence translator previously mentioned. This translator is controlled by a translator magnet TR (Figure 11) which is plug connected to an upper brush so as to be energized under the control of a pence column in the card when that card passes the upper brush. This magnet registers in the translator a pence value read from the card and the translator transmits an impulse through the pence sockets BR during the next cycle at the time appropriate to the pence digit in question. The function of the pence translator is to convert the reading from the card into a form suitable for controlling the pence denomination of the accumulator. This operation is conventional and need not be described herein.

The circuit for entering a digit into, say, the units of shillings denomination of the accumulator will extend from the line 102 (Figure 11), the usual cam contacts, the lower brush reading the units of shillnigs column in a particular field, the units of shillings plug socket BR (that is, the second from the top in Figure 12), normally closed distributor contacts D—2, the accumulator magnet CT for the units of shillings denomination, accumulator contacts 131a, and normally-closed distributor contacts D—1, and a bus-bar 132 to the line 103. The magnet CT, when energized, clutches, in a usual manner, the units of shillings accumulator wheel (not shown) to a constantly rotating shaft (not shown) so that the accumulator-wheel turns to add the digit read from the card. The magnet CT also opens its contacts 131a to prevent sparking at the card-reading brushes and closes its contacts 131b. This completes a circuit from the line 103 (Figure 12) through the bus-bar 132, the contacts D—1, the contacts 131b, the magnet PR, distributor contacts D—1A, a bus-bar 134a (appropriated to the accumulator), a switch 133, cam contacts P—12, contacts RSa and cam contacts L—26 to the line 102. The print magnet is thus energized at the same time as the accumulator magnet and arrests an associated type bar in the usual manner to print the digit entered into the accumulator.

The contacts RSa are operated concurrently with the contacts RSb (top, Figure 9) previously referred to and are closed as soon as the typebars commence to rise. These contacts serve to prevent the completion of printing circuits during cycles in which the printing mechanism is inoperative. Cam contact P—12 is open during all total-taking cycles in order to prevent the completion of the printing circuit just traced when an amount is transferred to the accumulator from another accumulator. If the amounts entered into an accumulator are not to be printed, the switch 133 is opened, there being a separate switch 133 for each accumulator.

Associated with each denomination of the accumulator is a separate reading-out commutator comprising a common segment 134, a plurality of digital segments 135 one for each digit, and a brush 136. There are twelve segments 135 for the pence denomination and ten segments for each other denomination. The brush 136 is adjusted by the accumulator, in accordance with the digit registered in the corresponding denomination, to connect the common segment 134 to the appropriate segment 135. This reading-out mechanism is generally of the kind described in British patent specification No. 356,304 (U. S. Patent No. 1,921,454, Daly).

The segments 135 of the pence commutator are connected through normally-closed distributor contacts D—5 and lines 136a each to a separate one of the segments 557 of the emitter E1. The brush 556 of the emitter E1 rotates constantly and connects each segment 557 to the line 102 through the cam contacts L—26 at a time representative of the particular digit allocated to the connected segment 135. Thus with the brush 136 of the pence denomination adjusted to represent the digit 5, say, the segment 134 will be connected to the line 102 at a time representative of the digit (5) registered. Similar connections extend from the digital segments 135 of the tens of shillings and pounds denominations through the normally closed distributor contacts D—4 and lines 137 to the emitter E2. The segments 135 of the tens of shillings commutator, that is to say, the third from the top, are connected together alternately. This is done since in this denomination the brush 136 has five "zero" positions and five "one" positions. With the distributor D—4 de-energized, the zero segments 135 for the tens of shillings denomination are not connected in circuit, but the "one" segments are connected in circuit so that they will transmit an impulse at the "one" time in the cycle.

As the emitters E1 and E2 rotate, impulses will be transmitted over circuits connected to the common segments 134 at times representative of the digits of the total in the accumulator. When the distributors D—4 and D—5 are energized the connections are changed so that the impulses transmitted over the circuits will represent the digits which are complementary with respect to nine to the digits of the total. It is thus possible to read out of the accumulator either the total registered in that accumulator or the complement of that total, depending upon whether the distributors D—4 and D—5 are de-energized or energized, respectively. The function of these two distributors is thus to determine whether the total or a complement of the total shall be read out of the accumulator. As is well known, the entry of a complement of an amount into an accumulator is equivalent, provided the fugitive unit is taken care of, to subtracting the amount in that accumulator.

The lines 136a and 137 also serve to connect the emitters E1 and E2, respectively, to the distributors D—5 and D—4, respectively, of the other accumulators. Thus, the energization of the distributors D—4 and D—5 for one accumulator does not influence the manner in which the total is read out of any of the other accumulators.

As previously mentioned, the distributor D—1 is energized whenever a total is to be printed. When this distributor is energized its contacts D—1 shift, breaking the accumulator-magnet circuits and thereby preventing entries being made into the accumulator during the printing operation and also connecting the bus-bar 132 to one side of the print-magnets PR through pairs of plug sockets C1 and C2 which for the present will be assumed to be connected together by plug connections. The distributor contacts D—1A also shift, breaking the normal listing circuits through the magnets PR and connecting each magnet PR to the corresponding common segment 134. Thus, with the distributor D—1 energized, circuits will be established, each extending from the line 102 through the emitter E1 or E2, the distributor contacts D—5 or D—4, the reading-out commutator in question, the normally open contacts D—1A, the print magnet in question PR, the plug sockets C'2 and C'1, the normally open contacts D—1 and the bus-bar 132 to the line 103.

In order to reset an accumulator the complement of the total in that accumulator is entered into the accumulator. For this operation the distributors D—2, D—3, D—4 and D—5 of the accumulator are all energized. The distributors D—4 and D—5 cause the complement of the total to be read out. The distributor contacts D—2 disconnect the accumulator magnets CT from the plug sockets BR and the lower brushes and connects these magnets to the distributor contacts D—3 which in turn connect them each to the corresponding common segment 134. The accumulator magnets will thus be so energized as to cause the accumulator to add the nines complement of the total it contains. This is equivalent to subtracting one more than the total and will leave the accumulator registering the complement of one.

In order to reset the accumulator correctly to zero, the fugitive unit must be added. This is effected by a magnet FU which, when energized, trips the transfer mechanism to the units counter-wheel so that this mechanism will operate in the normal manner to transfer one unit to the units, that is the pence, denomination of the accumulator. The magnet FU may be incorporated in the accumulator in the same way as the magnet 103 shown in Figure 7 of British patent specification No. 358,105 (U. S. patent appln. Ser. No. 375,914) and controls the transfer mechanism in the manner described therein. The magnet FU is, however, energized in a different way and fulfills a different function to the magnet 103 of the prior arrangement. When the distributors D—2 and D—3 and D—4 are energized, they close contacts D—2a, shift contacts D—3a and close contacts D—4a. Then when the emitter E2 rotates it will complete a circuit through a line 137a, the contacts D—4a, the normally-open contacts D—3a, the contacts D—2a and the magnet FU. This magnet then trips the transfer mechanism and one unit is entered into the pence denomination. It should be noted that no circuits will be completed through the print magnets PR at this time since the accumulators are reset during the cycle R and since the printing mechanism is invariably inoperative during this cycle and its contacts RSa are open, breaking the circuits to the magnets PR.

The distributor D—2 determines whether an accumulator shall add amounts entered from the lower brushes through the sockets BR or shall add amounts transmitted to the accumulator from another source. With the distributor D—2 energized, the accumulator is conditioned to add an amount transmitted from itself or another accumulator. With the distributor D—3 energized, as well as the distributor D—2, the accumulator will add the total or the complement of the total it contains. With the distributor D—2 energized and the distributor D—3 de-energized, the accumulator magnet circuit will extend to plug sockets R which can be plug-connected to either normal transmitting plug sockets TN or special transmitting plug sockets TS of another accumulator. Assume that the plug sockets R of accumulator No. 1 are plug-connected to plug-sockets TN of accumulator No. 2 and that the distributor 1D—2 of accumulator No. 1 is energized. Circuits will then extend through magnets CT of accumulator No. 1, the normally-open contacts 1D—2 of accumulator No. 1, the normally-closed contacts 1D—3 of accumulator No. 1, the plug-sockets R of accumulator No. 1, the plug-sockets TN of accumulator No. 2, the contacts 2D—0 of accumulator No. 2, the commutator of that accumulator, so that the accumulator No. 1 will add the total contained in accumulator No. 2. It should be noted that this operation can be performed concurrently with the printing of the total thus transferred if the distributor 2D—1 of accumulator No. 2 is energized as well.

If the distributors 2D—4 and 2D—5 of accumulator No. 2 are also energized, the complement of the total in accumulator No. 2 will be transmitted to accumulator No. 1 so that this counter will subtract the total in counter No. 2. Under these conditions it is necessary to enter the fugitive unit. A plug socket F—1 in accumulator No. 1 is therefore plug-connected to a plug socket F—2 in accumulator No. 2. A circuit will then extend through the emitter E2, the distributor contacts 2D—4a of accumulator No. 2, the plug-socket F—2 of accumulator No. 2, the plug-socket F—1 of accumulator No. 1, the normally-closed distributor contacts 1D—3a, the contacts 1D—2a and the magnet FU of accumulator No. 1. This provides for entering the fugitive unit into accumulator No. 1. It should be noted that sockets F—1 and F—2 are provided for each accumulator, the suffix indicating the function of the sockets and not identifying them with a particular accumulator.

It should be noted that the plug-sockets TN of accumulator No. 2 could also be plug-connected to the plug-sockets R of, say, accumulator No. 3. Then by energizing either the distributor 1D—2 or 3D—2, the total in accumulator No. 2 can be transmitted selectively to accumulator No. 1 or accumulator No. 3, respectively. When both these distributors are energized, the total will be transmitted to both accumulators simultaneously, while if they are energized in succession the total will be transmitted to the two accumulators in succession. This selection of the manner of operation can be used in conjunction with a selective energization of the distributors 2D—4 and 2D—5, so that either or both accumulators 1 and 3 can receive the total or the complement of the total, and also so that one can receive the total in one cycle and the other the complement of the total in another cycle.

The sockets R for one accumulator can also be plugged up to the sockets TS for two other accumulators so that the first accumulator can add the total or the complement of the total in one of the other accumulators selectively. For example, if the sockets R for accumulator No. 2 are plug-connected to the sockets TS for accumulators Nos. 1 and 3 and the distributor 2D—2 is energized to render accumulator No. 2 receptive, the total in accumulator No. 1 will be transmitted if the distributor 1D—0 is energized, or the total in accumulator No. 3 will be entered if the distributor 3D—0 is energized. The distributors D—0 thus serve to determine which of two (or more) accumulators shall transmit amounts to another accumulator which is arranged to receive a total from either of them. Thus the sockets TN would be used where the total can be transferred from one accumulator 1A only to another accumulator and the sockets TS would be used where the total can be transmitted from either of two (or more) accumulators to another accumulator and where there would therefore be ambiguity as to which accumulator is to transmit the total without the further control effected by the distributors D—0.

Summing up the operation of the various distributors:

The distributor D—1, when de-energized, conditions its accumulator to add and also prepares the listing circuits for that accumulator. When energized, the distributor prevents adding by the accumulator and prepares the circuits for total printing.

The distributor D—2 when de-energized, conditions its accumulator to add under the control of the lower brushes, and, when energized, conditions the accumulator to add under the control of itself or another accumulator.

The distributor D—3, when de-energized, conditions its accumulator to add an amount transmitted from another accumulator, and, when energized, conditions the accumulator to add its own total or the complement thereof.

The distributors D—4 and D—5 are always energized together and, when de-energized, allow of the total in their accumulator being read out. When these distributors are energized, they allow of the complement of the total being read out.

Finally, the distributor D—0, when de-energized, allows of an unselective transmission of a total or complement from one accumulator to another accumulator. This distributor is, however, selectively energized in order to provide for a selective transmission of the total or complement from the accumulator. The distributor D—0 serves also to determine the particular cycle in which the total is transmitted from an accumulator.

The distributors are selectively energized under the control of the cycle relays C—1 to C—4 and the reset control relays MAR, IR and MIR so as to cause the machine to do a predetermined sequence of operations. The manner in which this is effected will be described later in connection with some typical computations.

Credit and debit distribution

The cards are provided with a designating column, a hole in this column indicating the type of transaction to which the card relates and inter alia whether the card contains a debit amount or a credit amount. If the card is a debit card, a hole will appear in one of the positions 0 to 4 of the designating column, but, if it is a credit card, a hole will appear in one of the positions 5 to 9 (or vice versa).

When it is desired in the present machine to obtain a balance between the credit and the debit amounts read from a group of cards, all the debit amounts are entered into one accumulator, say accumulator No. 2, while all the credit amounts are entered into another accumulator, say accumulator No. 3. The lower brushes which read the field on the card containing the credit or debit amount are plug-connected from their associated sockets 115 to sockets 140 (Figure 11). The plug-sockets 140 are connected to the centre blade of triple-contacts of a credit and debit distributing relay DR. Contacts DRa of this relay are normally closed and continue the circuit from the lower brushes to plug-sockets 141 which are plug-connected to the plug sockets BR of the debit accumulator, say accumulator No. 2. Thus, with the relay DR de-energized, all debit amounts will be entered into accumulator No. 2.

When a credit card passes the upper brushes, the relay DR becomes energized and remains energized during the next card cycle while that card is passing the lower brushes. With the relay DR energized, its contacts DRa open, and its contacts DRb close, so as to continue the circuits through the lower brushes, to plug sockets 142 which are plug-connected to the plug-sockets BR of the credit accumulator, say accumulator No. 3. Thus, all credit amounts will be entered into accumulator No. 3.

The plug-socket 112 associated with the upper brush reading the designation column is plug-connected to a plug-socket 113a. Thus, when this brush encounters a hole in the designating column, a circuit will be completed through the cam-contacts L—10, the brush UB in question, the plug-socket 113a, the coil of a relay 9 and upper card-lever-contact UCLRd. The relay 9 is energized momentarily and closes its contacts 9b momentarily. Two circuit-makers 143 and 144 are arranged in parallel with one another, and in series with the contacts 9b and the coil of a relay 10. The circuit-maker 143 closes while the 0 to 4 hole positions in the card are passing the upper brushes, while the circuit-maker 144 closes while the 5 to 9 hole positions are passing the upper brushes. A switch 145 determines which of these two circuit-makers shall be in circuit. With the switch in the position shown, the circuit can only be completed through the contacts 9b and the relay 10 during the period while the hole-positions 5 to 9 are passing the upper brushes. Thus, if the relay 9 is energized momentarily, through a hole in one of the positions 0 to 4, no circuit will be completed through its contacts 9b. On the other hand, if the relay 9 is energized through one of the holes 5 to 9, then the relay 10 will also be energized.

When energized, the relay 10 closes contacts 10a to hold itself energized through cam contacts L—11.

Thus, the relay 10 becomes energized if the card is a credit card but not if it is a debit card. If the switch 145 is moved to its other position, the circuit-maker 143 will be included in circuit, and the relay 10 will be energized for debit cards but not for credit cards. The machine can thus be adjusted to treat all credits as debits, and vice versa.

The circuit for the relay 10 includes contacts UCLRc which are closed so long as cards are passing the upper brushes and which serve to prevent the relay 10 being energized during the first and last card-cycles of the machine, when there are no cards passing the upper brushes.

After a card has passed the upper brushes, cam-contacts L—13 close to complete a circuit through the cam-contacts L—11, the relay contacts 10a, cam-contacts L—13, a relay coil 11 and the coil DR of the credit and debit distributor. The relay 11 then closes its contacts 11a to provide a holding circuit for itself and the coil DR through cam-contacts L—12. After this holding circuit has been established, the cam-contacts L—11 open and de-energize the coil 10 so that it can be controlled by the next card to pass the upper brushes. The cam-contacts L—12 maintain the coil DR energized during the following card-cycle and until the first-mentioned card has passed the lower brushes, when the amount it contains has been read and entered into the accumulators. These cam-contacts then open so as to de-energize the relay DR, if the relay 10 has not been energized in the meantime under the control of the following card.

When the relay DR is energized under the control of the last card of a group, the cycle in which it is energized will be followed by a series of total taking operations to obtain the totals and balances for the preceding group of cards. It is necessary to maintain the relay DR energized during these total taking operations, and this is effected by cam-contacts P—2 which close during the total taking cycles at the time when the cam-contacts L—12 open, and prevent the circuits being broken by the opening of the latter contacts. The cam-contacts P—2 are normally open, so that during card-feeding cycles the circuit is controlled by the cam-contacts L—12. Thus, it will be seen that the relay DR will be energized for credit cards but not for debit cards, or vice versa, depending on the position of the switch 145.

Comparing mechanism

With the machine adjusted as just explained, the debit accumulator No. 2 will obtain a debit total of all debit amounts read from a group of cards while the credit accumulator No. 3 will obtain a credit total of the credit amounts read from the same groups of cards. In order to obtain the balance between these two totals, the smaller total is subtracted from the larger. Accordingly, mechanism is provided for comparing the two totals to determine whether the credit total or the debit total is the larger. This mechanism will now be described with reference to Figure 13.

For each denomination of the two totals to be compared, there is provided a group of circuits, each including two double-wound relays designated CP and a numerical suffix, and two single-wound relays designated Dr and Cr with a suffix. Four such groups of circuits are shown in the upper part of Figure 13, but a group will be provided for each denomination.

The uppermost group of circuits comprises relays CP1 and CP2, Dr1 and Cr1. The second group of circuits comprises relays CP3, CP4, Dr2 and Cr2 and so on. The groups of circuits are identical, and it will be sufficient to explain the arrangement and operation of one group. The operating coils of the relays CP are connected between plug-sockets C'3 an C'4, and these coils for all the odd-numbered relays are plug-connected each in series with one of the print-magnets PR associated with the debit-accumulator by means of plug-connections between the sockets C'3 and C'4 and the sockets C'1 and C'2 (Figure 12) of the debit accumulator. In the same way, the even-numbered relays CP are plug-connected in series with the print magnets associated with the credit-accumulator. From Figure 12 it will be seen that, when a total is printed, the distributor ID1 being energized, any relay coil which is plugged between the sockets C'1 and C'2 will be energized at the same time as the associate print-magnet. Thus, the odd-numbered relays CP will be energized at times corresponding to the digits of the debit total, and the even-numbered relays CP at times corresponding to the digits of the credit total. The plugging is so effected that the relays CP1 and CP2 are in series with the print-magnet which prints the highest digits of the two totals, and so on, in order.

In the present machine, the digits are represented by timed electrical impulses, and the earlier the impulse occurs in the cycle of the machine the greater is the digit represented. Thus, an impulse representing 9 will occur earlier in the cycle than an impulse representing 8 and so on. Therefore, if, in the highest denomination of the two totals, the debit digit is larger than the credit digit, the relay CP1 will be energized before the relay CP2. When the relay CP1 is energized, it closes its holding contacts CP1a to energize a holding winding CP1H to maintain the relay energized. It also closes contact CP1b so as to complete a crcuit from the line 103 through relay contacts CP2c, the contacts CP1b and the relay coil Dr1. This coil closes its holding contacts Dr1a to hold itself energized. The relay CP1 also opens contacts CP1c. Later, the relay CP2 is energized and closes its contacts CP2a to energize its holding winding CP2H. The relay CP2 opens its contact CP2c and closes its contact CP2b. The closure of these latter contacts has, however, no effect, since the contacts CP1c in series with them are now open. Thus, at the end of the cycle, the relay Dr1 is energized, but not the relay Cr1.

If the credit digit had been larger than the debit digit, the relay CP2 would have been energized first, and, by closing its contacts CP2b, would have energized the relay Cr1 which would hold itself energized through its holding contacts Cr1a. Under these conditions the opening of the contacts CP2c would prevent the subsequent closure of the contact CP1b energizing the relay Dr1. Thus, the relay Cr1 but not the relay Dr1 will be energized at the end of the cycle.

Where the two digits are equal, the relays CP1 and CP2 are energized simultaneously, and the contacts CP1c and CP2c open simultaneously. These contacts are fully open before the contacts CP1b and CP2b close, so that neither of the circuits to the coils Dr1 and Cr1 can be completed.

The numerical suffixes to the relays Dr and Cr identify these relays with the denominations of the totals to be compared, these denominations being numbered from the highest downwards. Each of these relays has normally closed "b" contacts, and normally-open "c" contacts. All the "b" contacts are in series and are connected together in the numerical order of the relay. Thus, a connection exists from the line 103 through the contacts Dr1b (bottom Figure 13) the contacts Cr1b, the contacts Dr2b, the contacts Cr2b and so on. It will be seen that this connection will be broken by the energization of the relay Dr or Cr associated with the highest denomination of the totals in which the two digits are not the same.

Assume that a debit total, whose first four digits are 0061, is to be compared with a credit total whose first four digits are 0016, so that the debit total is the larger. The relays Cr1, Dr1, Cr2, and Dr2 will be de-energized. The relay Dr3 and the relay Cr4 will be energized, and the relays Cr3 and Dr4 de-energized. A circuit will then be established from the line 103, through the contacts Dr1b, Cr1b, Dr2b and Cr2b, the now closed contacts Dr3c, a line 150, debit-selecting relays DS1 to DS4, a line 153, cam-contacts P—15 which close momentarily at the end of the cycle, a line 155 and normally-closed relay contacts 25a, which are closed as the result of the de-energization of their operating coil 25 (bottom Figure 9) which is in a minor control circuit. The contacts Dr3b have opened and have broken the connection between the line 103 and the contact Cr4c so that, although the latter are closed, no circuit is completed through them.

If the totals had been reversed, the contacts Dr3b and Cr4b would have been closed, the contacts Dr3c and Cr4c open, the contacts Cr3b and Dr4b opened, and the contacts Cr3c and Dr4c closed, all the other contacts remaining in the position shown. Under these conditions the circuit would have been established from the line 103 through the contacts Dr1b, Cr1b, Dr2b, Cr2b, Dr3b, and Cr3c, a line 151, credit-selecting relays, CS1 to CS4, a line 154, and the cam-contacts P—15 to the line 155. Thus, the debit-selecting relays DS1 to DS4 will be energized when the debit-total is the larger, and the credit-selecting relays CS1 and CS4 when the credit total is the larger. If the totals are exactly equal, all the contacts of the relays Dr and Cr will remain in their normal position and neither group of selecting relays will be energized.

When the debit-selecting relays are energized the coil DS4 closes its contacts DS4b to provide a holding circuit for the debit-selecting relays. In the same way, when the credit-selecting relays are energized, the coil CS4 closes its holding contacts CS4b. These holding circuits, together with the holding circuits for the relays CP, Dr and Cr extend through cycle relay contacts C1c, C2c, C3c and cam contacts P—14 and P—14a which are arranged in parallel. The first-mentioned three pairs of contacts serve to ensure that the circuits will be held during cycles 3, 2 and 1. The cam-contacts P—14 and P—14a serve to time the breaking of the circuits, after the cycle relays have been de-energized, and also to maintain the circuits at the moment when one cycle relay is de-energized and the next is energized.

Subtraction with intermediate and minor group control

The operation of the machine will now be explained in the case when the cards are divided into intermediate and minor groups, and when it is desired to obtain for each minor group and also for each intermediate group, a credit total, a debit total and the balance between these two totals. The main control switch (Figure 17) is adjusted to the intermediate subtraction position. In this position the switches A and B (Figure 10) are open, so that a major group change results in five cycles, and an intermediate group change in four cycles, including the R cycle. Further, the switch C is in the MB position so that a minor group change results in four cycles. The switches 126 and 127 (Figure 9) are open, allowing of intermediate and minor group control, while the switch 125 is closed, so that the major control circuit is not controlled by the card. The switch D is closed, so that, on an intermediate group change, cycles 3, 2, 1 and R will occur, and the major control circuits will then fail and all five cycles will then occur, making a total of nine cycles on an intermediate group change.

Further, the machine is adjusted so that all debit amounts are entered into accumulator No. 2, and all credit amounts into accumulator No. 3, as explained under the heading "Debit and credit distribution". The connections for doing this are shown in Figure 14, wherein there are shown the circuits for one accumulator-magnet in each of the five accumulators, together with the circuits for the associated print-magnets.

From this figure it will be seen that the plug-sockets BR for accumulator No. 2 are plug-connected to the plug-sockets 141 associated with the distributing relay DR, while the plug-sockets BR for the accumulator No. 3 are plug-connected to the plug-sockets 142. The control switches for these two accumulators are adjusted to the "Minor as part intermediate" subtraction positions. With this setting these two accumulators are reset on each minor group change, so that they will accumulate respectively a debit total and a credit total from each minor group of cards.

The totals in accumulators Nos. 2 and 3 are to be compared together, and accordingly the relays CP of the comparing mechanism are plugged between the sockets C'1 and C'2 as indicated in Figure 14. The smaller total is subtracted from the larger to give the balance by transferring the complement of the smaller total to the accumulator containing the larger. This transfer may be in either direction, and consequently the plug-sockets TS for accumulator No. 2 are connected by connections 160 to the plug-sockets R for accumulator No. 3, and the plug-sockets TS for accumulator No. 3 by connections 161 to the plug-sockets R for accumulator No. 2. These plug connections are emphasized by heavy broken lines in Fig. 14.

Accumulators Nos. 4 and 5 are employed to obtain the debit and credit totals respectively of intermediate groups. This is effected by transferring the minor totals, when they are obtained, to accumulators Nos. 4 and 5. For this purpose, the sockets TN of accumulator No. 2 are connected by plug connections 162 to the sockets R of the accumulator No. 4 and the sockets TN of accumulator No. 3 by connections 163 to the sockets R of accumulator No. 5. In order to obtain a balance between these two intermediate totals, they are transferred, after the last minor balance has been obtained, and after the accumulators Nos. 2 and 3 have been reset, to the accumulators Nos. 2 nd 3. This allows of the intermediate totals being compared tgether in accumulators Nos. 2 and 3, and a balance struck between them. The necessity for this transfer could be avoided by providing additional comparing mechanism associated with accumulators Nos. 4 and 5, but the arrangement described is preferred. To allow of these transfers, the plug-sockets TS for accumulators Nos. 4 and 5 are plug-connected respectively to the plug-sockets R of accumulators 2 and 3 by connections 164 and 165.

The control switches for accumulators Nos. 4 and 5 are adjusted to the "intermediate subtraction" position and the effect of this adjustment will be described later.

It will be noted from Figure 14 that, when making the connections to accumulators Nos. 2 and 3, the plug-sockets TS were used. This is because these two accumulators can each receive from two accumulators. By making use of the plug-sockets TS the relays D—0 can be employed to determine from which of the two accumulators the accumulator in question shall receive an entry. The plug-connections to the accumulators Nos. 4 and 5 are, however, made from the contact TN of accumulators Nos. 2 and 3, since the accumulators Nos. 4 and 5 only receive each from one other accumulator. Owing to this fact it is possible to use the distributors D—2 of accumulators Nos. 4 and 5 to determine whether or not they shall receive an entry.

Accumulator No. 1 does not enter directly into the total-taking operation, but is plug connected by connections from its socket BR to the socket 115 of the lower brushes which read the group number fields of the cards. The group numbers will thus be read from the card and entered into this accumulator. The switch 133 (Figure 12) for accumulator No. 1 is closed, so that the group numbers entered into it from the cards can be printed. The corresponding switches for the other accumulators are open so that amounts read from the cards are not printed. The machine is adjusted to tabulate by setting the switch 109 (left upper centre, Figure 9) to the "TAB" position. This, as previously explained, ensures that the printing mechanism will operate during the first of each group of card-feed cycles, but not during the remaining cycles of such a group. The machine will therefore print the group numbers entered into accumulator No. 1 during the first cycle, after which the printing mechanism will remain inoperative until total-taking cycles occur. Thus, the group numbers will be printed on the report sheet. This is the usual "group indicating" operation and need not be explained in detail.

Figure 18 illustrates diagrammatically the operation of the machine when set to obtain the totals and balances in respect of an intermediate group which comprises two minor groups. The first minor groups comprises three cards containing respectively a debit of £2. 10. 6. and credits of 10s. 6d. and £1. These amounts are entered into accumulators Nos. 2 and 3 to give a debit total of £2. 10. 6. and a credit total of £1.

10, 6. After the third card of the group has passed the lower brushes, a minor group change occurs and the minor control circuit fails and causes the machine to perform four total-taking cycles.

*Cycle No. 3.*—The first of the total-taking cycles is the cycle 3, in which the cycle-initiating relay C—3 is energized. During this cycle the totals are printed, compared together and transferred to accumulators Nos. 4 and 5.

In Figures 15 and 15a, the control switches for accumulators Nos. 2 and 5 are shown, together with the distributors for these two accumulators. The rotor 606 for accumulator 2 is adjusted to the minor part intermediate subtraction "position", so that its contact pairs 610 engage the second highest (as seen in Figure 15) row of contacts 601. The rotor 606 for accumulator No. 5 is adjusted to the "intermediate subtraction" position so that its contact pairs 610 engage the highest row of contacts 601. Further switches E associated with these two accumulators are closed.

During the cycle 3, the relay C3 is energized and its contacts C3d, C3e and C3f (Figure 15) are closed. When cam-contacts P—11 and P—20 close, a circuit will be completed from the main line 102 through these contacts, the contacts C3d, a line 170, a line 171, the left-hand contact pair 610 for accumulator No. 2, a line 175, the switch E, contacts 25b, which are closed, and the distributor 2D—1. The contacts 25b are closed as the result of the de-energization of their coil in the minor control circuit which has now failed. A similar circuit extends through the contacts C3d, and the distributor coil 3D1, since the switch for accumulator No. 3 is also in the minor part intermediate subtraction position. The energization of the distributors 2D—1 and 3D—1 results in their contacts 2D—1, 2D—1A, 3D—1 and 3D—1A (Figure 14) closing to prepare the printing circuits for accumulators Nos. 2 and 3. Since the comparing relays CP are included in these circuits, the debit and credit totals will be both printed and compared together. The printing circuits have been described under the heading "Accumulator circuits and distributors" and need not be repeated.

The closure of the contacts C3f (Fig. 15) completes a circuit through contacts 15a, a line 174, a line 175 (Figure 15a), the second from the left contact pair 610 for the control switch of accumulator No. 5, a line 176, and the distributor 5D—2. A similar circuit is completed through the control-switch for accumulator No. 5 which is in the "intermediate subtraction" position, and the control-switch for accumulator No. 4, and the distributor 4D—2. The distributors 4D—2 and 5D—2 are thus energized to prepare the transfer circuits. Contacts 15a are held closed by their coil (Figure 9) which is in the major control circuit and which is now energized since the major control circuit has not failed.

The circuit for transferring one digit from accumulator No. 2 to accumulator No. 4 extends through the emitter E2 (Figure 14) one of the lines 137, the normally closed contacts 2D—4, a line 177, reading-out commutator for accumulator No. 2 registering the digit in question, a line 178, the normally closed contacts 2D—0, the plug-connection 162, the plug-socket R, in accumulator No. 4, the contacts 4D—3, the normally open but now closed contacts 4D—2, the appropriate accumulator-magnet CT in accumulator No. 4, and the normally closed contacts 4D—1. Similar circuit exists for transferring the total from accumulator No. 3 to accumulator No. 5.

As the result of the comparison, the debit-selecting relays DS1 to DS4 (Figure 13) will be energized since the debit total is the larger. These relays prepare circuits for transferring the complement of the credit total to the debit accumulator No. 2, as will now be explained.

*Cycle No. 2.*—From Figure 18 it will be seen that the complement of £1. 10. 6., namely, 99998 09 5, and the fugitive unit of 1, will be transferred from accumulator No. 3 to accumulator No. 2, to give a balance of £1 in the latter accumulator.

During the cycle 2, the cycle-initiating relay C2 is energized and has closed its contacts C2g (Figure 16). Thus, when the cam-contacts P—11 and P—20 close, a circuit will be completed through the contacts C2g, contacts Ds2a, closed by the debit-selecting relay DS2, a plug-socket 180, a plug-connection 181, a plug-socket 179 and the distributor 3D—0. This distributor will close its contacts 3D—0 (Figure 14) so as to prepare a transferring circuit from accumulator No. 3 to accumulator No. 2, through the normally open, but now closed, contacts 3D—0, the plug-sockets TS of accumulator No. 3, and the plug-line 161.

A second circuit will extend through the contacts C2g (Figure 16) the contacts DS3a of the debit-selecting relay DS3, a plug-connection 182, and the distributor coil 2D—2. This distributor will close its contacts 2D—2 (Figure 14) to condition accumulator No. 2 to receive the amount transferred from accumulator No. 3.

A third circuit will extend through the contacts C2g (Figure 16), the contacts DS4a, a plug connection 183 and the distributor coils 3D—4 and 3D—5. As previously explained, these distributors will connect the emitters E1 and E2 (Figure 12) to the reading-out commutators of accumulator No. 3, in such a manner that the complement of the credit total will be read out of accumulator No. 3 and entered into accumulator No. 2.

The reading-out circuit for one denomination extends from the emitter E2 (Figure 14), the line 137a (which is connected in circuit by the emitter E2 at a time corresponding to the complement of the digit to be read out), to normally open contacts 3D—4, a line 184, the reading-out commutator in question for accumulator No. 3, a line 185, the normally-open contacts 3D—0, one plug-socket TS, the plug-connection 161, one plug-socket R in accumulator No. 2, the distributor contacts 2D—3, the normally open distributor but now closed contacts 2D—2, the accumulator-magnet CT in question of accumulator No. 2, and the normally closed distributor contacts 2D—1. Similar circuits extend for the remaining denominations of the two accumulators. A circuit is also established for energizing the fugitive unit magnet FU, in accumulator No. 2. This need not be traced since it has been explained under the heading "Accumulator circuits and distributors."

*Cycle No. 1.*—During this cycle, the debit balance in accumulator No. 2 is printed. During cycle 1, the relay C1 is energized and has closed its contacts C1g (Figure 16). When the cam-contacts P—11 and P—20 close, a circuit is completed through the contacts C1g, contacts Ds1a of the debit-selecting relay DS—1, a plug-connection 186, and the distributor 2D—1. This distributor, when energized, conditions accumulator No. 2 to print the amount contained in it. The debit-balance will therefore be printed, the circuits being the same as those previously explained under the heading "Accumulator circuits and distributors."

It should be explained at this point that the plug-sockets 179 and 180 are provided in order that the debit- and credit-selecting relays may be plugged up to control the distributors for any desired pair of accumulators.

*Cycle R.*—It will be recalled that cycle R is characterized by the energization of one or more of the reset control relays, depending on the condition of the control circuits in the automatic control mechanism. Since the present series of total-taking cycles have resulted from a minor group change, only the relay MIR (Figure 9) will be energized, and will have closed its contacts shown in the top left corner of Figure 15. Thus, when the cam-contacts P—11 and P—20 close, circuits will be completed through the contacts of the relay MIR, lines 186, 187 and 188, the control switch for accumulator No. 2, lines 189, 190 and 191, and the distributors 2D—2, 2D—3, 2D—4 and 2D—5. As explained under the heading "Accumulator circuits and distributors", the energization of these four distributors conditions accumulator No. 2 to add the complement of the total it contains and thus to be reset to zero. Similar circuits, not shown, extend through the contacts of the relay MIR, and the distributors 3D—2, 3D—3, 3D—4 and 3D—5. Thus, accumulator No. 3 will also be reset to zero.

*Second minor group of cards.*—Referring again to Figure 18, it will be noted that the second minor group comprises two cards, one a debit card and the other a credit card. After these two cards have been read, an intermediate group change occurs, and accumulators Nos. 2 and 3 are left with a debit total of £2 and a credit total of £3. 05. 0. respectively. The machine proceeds through cycles 3, 2, 1 and R in the manner just explained, with the exception that, in the present instance, the credit total is the larger, so that the complement of the debit total will be transferred to the credit accumulator No. 3.

Referring to Figure 16, the comparing operation will result in the credit-selecting relays being energized and closing their contacts CS1a, CS2a, CS3a and CS4a. Thus, when the contacts C2g close in cycle 2, the relay 2D—0 will be energized over the circuit including a plug-connection 192, and the contacts CS2a, the relay 3D—2 will be energized over the circuits including a plug-connection 193, and the contacts CS3a, and the relays 2D—4, 2D—5 will be energized over a circuit including a plug connection 194 and the contacts CS4d. The distributor 3D—2 conditions the credit accumulator No. 3 to receive a total and the distributors 2D—0 and 2D—4 and 2D—5 condition the debit accumulator No. 2 to transmit the complement of its total to accumulator No. 3.

During cycle 1, when the contacts C—1g close, a circuit will be completed through the contacts CS1a, a plug-connection 195 and the distributor 3D—1. The balance now standing in accumulator No. 3 will be printed.

Thus, at the end of the first series of four cycles resulting from an intermediate group change, the credit and debit minor totals, and the minor balance between them will have been printed, and accumulators Nos. 2 and 3 reset.

The control circuits will then break down, as explained with reference to Figure 9, forcing a second series of five cycles as though under major group control. This second series of cycles will commence with cycle 4.

*Cycle 4.*—During this cycle, the cycle relay C4 (Figure 15) is energized, and will have closed its contacts C4d and C4e (Figure 15). Thus, when the contacts P—11 and P—20 close, a circuit will be completed through the contacts C4e, a line 192, line 193, the control switch for accumulator No. 2 and the distributor 2D—2. A similar circuit will extend through the contacts C4e, and the distributor 3D—2. These two distributors will condition accumulators Nos. 2 and 3 to add totals transmitted to them from accumulators Nos. 4 and 5 over the plug-connections 164 and 165 (Figure 14). The completion of these transmitting circuits requires that the distributors 4D—0 and 5D—0 should be energized. The latter distributor is energized over a circuit extending through the contact C4d, a line 194, a line 195 (Figure 15a) the control switch for accumulator No. 5, a line 196, and the distributor 5D—0. A similar circuit extends through the contact C4d, and the distributor 4D—0. Thus, the intermediate totals in accumulators Nos. 4 and 5 will be entered into accumulators Nos. 2 and 3 respectively, as shown in Figure 18.

The machine then proceeds to perform cycles 3, 2 and 1, in the same way as occurs on a minor group change, except that, since the major control circuit has now failed, the relay coil 15 in it will be de-energized and the contact 15a (Figure 15) will be opened, and will interrupt the circuit through the contacts C3f, the line 174 and the distributor coils 4D—2 and 5D—2. This ensures that the totals in accumulators Nos. 2 and 3 are not unnecessarily transferred back to accumulators Nos. 4 and 5. The intermediate totals in accumulators Nos. 2 and 3 will thus be compared together, and the balance obtained and printed, all as previously explained.

*Second cycle R.*—This series of nine cycles concludes with a cycle R during which accumulators Nos. 2 and 3 are re-set as previously explained. Since, however, the major control circuits have failed, the re-set control relay MAR will have been energized and will have closed its contacts to complete circuits over lines 197, 198 and 199 (Figures 15 and 15a), the control switches for accumulators Nos. 4 and 5, and the distributors 4D—2, 4D—3, 4D—4 and 4D—5 and 5D—2, 5D—3, 5D—4 and 5D—5. The intermediate accumulators Nos. 4 and 5 will thus be reset concurrently with accumulators Nos. 2 and 3. The machine will then resume the card-feeding operation with the next group of cards.

Figure 19 shows the return prepared in the example as shown in Figure 18. The manner in which the amounts are printed has been explained above, and the manner in which these amounts are spaced on the report sheet will now be described.

It will be recalled from Figure 4a that the frame 570 through which the paper spacing mechanism is operated, is latched up in its operated position after each spacing operation, unless the magnet CL is energized to unlatch it. Thus, a spacing operation will only take place before printing operation if the magnet CL has been energized since the last printing operation.

The magnet CL is energized at the end of each card-feed cycle when the machine is adjusted to list, that is, to print each item read from the card, in order that the items may be printed on separate lines. When the machine is thus adjusted, a switch 109A (lower right Figure 11) is closed to its "List" position, and the magnet CL is energized at the end of each card cycle, over a circuit including normally closed cam-contacts P—18 lower and cam-contacts L—23 which close momentarily at the end of each cycle. When it is not desired to list the items read from the cards the switch 109A is opened. The machine is then operated under the so-called tabulating condition, and as explained above, a printing operation will only occur during the first of a series of card-feeding cycles to allow of the group-number of a group of cards being printed on the report sheet.

In the example shown in Figure 18, the switch 109A is opened. The magnet C1 can then only be energized during the total taking cycles over circuits including the cam-contacts P—18 upper which close momentarily at the end of each cycle. Nor can circuits be completed through the cam-contacts L—23 even when the switch 109A is closed, during the total taking cycles since the cam contacts P—18 lower open at the same time as the cam-contacts L—23 close.

During cycle 2, of the series of total taking operations, the contacts C2h close and complete a circuit through either contacts DS—1b or the contacts CS—1b of the debit and credit comparing relays and the contacts P—18 upper to the magnet CL. This allows for a paper spacing operation to occur previous to the printing of the balance in cycle 1, so that the balance will be spaced from the debit and credit totals. After this spacing operation, the frame 570 is relatched and remains relatched until the cycle R, when the contacts MIRd of the minor reset control relay MIR close and complete a circuit through the cam-contacts P—18 upper and the magnet CL. The paper spacing mechanism can then be operated during the next printing cycle which will either be the first card-feed cycle in respect of the next group of cards, or, if an intermediate group-change has occurred, the following cycle 3 during which intermediate debit and credit totals are printed. In the latter case, the magnet CL will be also energized during the following cycle 2, so that the paper can be spaced prior to the printing of the intermediate balance. In this case the magnet CL will again be energized through the contacts MIRb during the second cycle R, and the paper will be spaced during the next cycle which is a card-feed cycle, prior to the printing of the group number. After the group numbers have been printed, the magnet CL will remain energized until the cycle 2 of the next series of total taking operations. Thus, the paper will not be spaced during the cycle 3 of this new series of total taking operations, that is between the printing of the group number and the printing of the minor credit and debit. These totals will, therefore, be printed on the same line as the group numbers identifying the group of cards to which they relate.

Symbol printing circuit

It may be seen from Figure 19 that minor totals are identified by an asterisk, balances by symbol B and intermediate totals by half-asterisks. Intermediate totals are only designated in this way when the machine is set for subtraction. When the machine is set to obtain totals intermediate and major totals are indicated by a full asterisk and the three kinds of totals being distinguished from one another by being printed in different columns on the card.

Each group of type-bars associated with an accumulator includes a special symbol printing type-bar which is controlled by a print magnet PR* (Figure 29). Only two of these magnets are shown in that figure, but there is actually one for each accumulator. The symbol printing type-bars have in place of the usual type for printing the digits 9, 8 and 7, type for printing an asterisk, a half-asterisk and the symbol B. The type for printing the remaining digits are also removed. When the counter is to obtain totals, switches 270 (Figure 29) are set in the dotted-line position so that, during each total printing cycle, a circuit will be established through the symbol printing magnet PR*, distributing contacts 2D—1b, normally closed switch 276, a line 271 and the "nine" segment 557 of the emitter E2. This circuit is completed at the nine time in the cycle so that the magnet PR* will arrest its type-bar in the position to print an asterisk.

When an accumulator is to take part in a balancing operation its switch 270 is moved to the position shown in full in Figure 29 so as to connect the corresponding magnet PR* to a plug-socket 272. This socket is connected to a plug-socket 273. These adjustments are made in respect of both accumulators which are to take place in a balancing operation. The connections are so made that the print magnet associated with the debit accumulator is connected to debit selecting relay contacts DS2b and DS2c and that associated with the credit accumulator to credit selecting relay contacts CS2b and CS2c.

When the totals are printed from the two accumulators, the contacts DS2b and CS2b are closed, and both print magnets are energized at the nine time in the cycle and cause their associated type-bar to print an asterisk. Each circuit extends through the print magnet, the switch 270, the plug 272 and 273, the contacts DS2b or CS2b, and contacts 15b which are held closed by the relay 15 (Figure 9) in the major control circuit, a line 276 and the nine segment 557 of the emitter E2.

When the balance is printed, the contacts DS2c will be closed and the contacts DS2b open if the debit total is larger or, alternatively, the contacts CS2c will be closed and the contacts CS2b open, if the credit total is the larger. In the former case, the magnet PR* for the debit accumulator will be energized through a circuit including the switch 270, the sockets 272 and 273, the contacts DS2c, and a line 274 to the seventh digital segment of the emitter E—2. This magnet will be energized at such a time as to arrest its type-bar in position to print the symbol B. If the credit total were larger, giving a credit balance, the symbol B would be printed by the type-bar associated with the credit accumulator, the corresponding print magnet PR* being energized over a similar circuit.

The above circuits are those which occur when printing a minor total and balance on either a minor or intermediate group change. When printing the intermediate total and balance, however, the relay 15 will be de-energized and its contacts 15a closed. Thus, while the totals are being printed circuits will be completed through the contacts DS2b and CS2b, the contacts 15a, and a line 275 to the eight digital spot 557 of the emitter E2. The magnets PR* will, therefore, be energized at such a time to cause their associated type-bars to print a half asterisk.

Subtraction under minor control

When the machine is to be operated to subtract under minor control only, the main control switch is turned to the "minor subtraction" position (Figure 17). In this position the switch B is closed to short-circuit the relay 32 so that a maximum of four total taking cycles can occur. The switches A and B are in the same position as for subtraction under intermediate control. The switches 125 and 126 are closed, and the switches 127 and D are open. The machine will thus operate under minor control to perform four cycles on a minor group change, but will not perform a second series of five cycles after such a series of four cycles since the switch D is opened.

The machine is plugged up as shown in Figure 14, except that since intermediate totals are not required and it is not necessary to transfer to or from accumulators Nos. 4 and 5, the plug connections 162, 163, 164 and 165 will be omitted. The accumulator control switches for accumulators Nos. 4 and 5 will be turned to the "off" position, while those for accumulators Nos. 2 and 3 will be turned to the "minor subtraction" position.

When in the "minor subtraction" position, the accumulator switches make the same connections between the distributors and the cycle relays as are made in the "minor as part-intermediate subtraction" position, except that no connection is made between the contacts of the cycle relay C4 and the distributor 2D—2. In the example previously considered, this connection was made in order to allow of the intermediate totals being transferred back to accumulators 2 and 3. Since this operation is not required in the present example, the connections in question can be omitted.

The operations performed during total taking cycles when obtaining minor totals and minor balances only, are similar to the operations performed on a minor group change in the example shown in Figure 18, except that the minor totals are not transferred to accumulators 4 and 5. It will be unnecessary, therefore, to explain these operations in detail.

Zero balance

When the machine is adjusted to subtract, and the debit and credit accumulators Nos. 2 and 3 contain identical totals, the balance will be zero. In these circumstances, neither the debit-selecting relays DS1, etc., nor the credit-selecting relays CS1, etc., will be energized. Thus, no circuits can be completed through the contacts C2g or C1g (Figure 16) and no transfer will be made from accumulator No. 2 to accumulator No. 3 or vice versa. Moreover, neither accumulator No. 2 nor accumulator No. 3 will be conditioned for total printing during cycle 1 so that nothing will be printed, that is, when the debit and credit totals from a group of cards are equal, no balance will be printed.

Table A below shows which of the distributors for the various counters are energized in each cycle under the control of the appropriate cycle relays. Table B is a similar table for when the machine is adjusted under minor control only. In these two tables the distributors are identified by their suffix numbers only and are arranged in columns according to the accumulators to which they relate. The tables need no special comment.

Table A
Intermediate subtraction

| Intermediate change | | Distributors | | | |
|---|---|---|---|---|---|
| | | Debit accumulator 2 | Credit accumulator 3 | Debit accumulator 4 | Credit accumulator 5 |
| C.3, cycle 3 | | 1 | 1 | 2 | 2. |
| C.2, cycle 2 | If dr | 2 | 0, 4, and 5 | | |
| | Or cr | 0, 4, and 5 | 2 | | |
| C.1, cycle 1 | If dr | 1 | | | |
| | Or cr | | 1 | | |
| Cycle R | | 2, 3, 4, and 5 | 2, 3, 4, and 5 | | |
| C.4, cycle 4 | | 2 | 2 | 0 | 0. |
| C.3, cycle 3 | | 1 | 1 | | |
| C.2, cycle 2 | If dr | 2 | 0, 4, and 5 | | |
| | Or cr | 0, 4, and 5 | 2 | | |
| C.1, cycle 1 | If dr | 1 | | | |
| | Or cr | | 1 | | |
| Cycle R | | 2, 3, 4, and 5 | 2, 3, 4, and 5 | 2, 3, 4, and 5 | 2, 3, 4, and 5. |

Table B
Minor subtraction

| Relay | | Distributors | |
|---|---|---|---|
| | | Debit accumulator 2 | Credit accumulator 3 |
| C.3, cycle 3 | | 1 | 1. |
| C.2, cycle 2 | If dr | 2 only | 0, 4, and 5. |
| | Or cr | 0, 4, and 5 | 2 only. |
| C.1, cycle 1 | If dr | 1 only | |
| | Or cr | | 1 only. |
| Cycle R | | 2, 3, 4, and 5 | 2, 3, 4, and 5. |

Major intermediate and minor control

The machine can also be operated under major intermediate and minor control to obtain totals but not balances. Figure 20 shows three accumulators of the machine diagrammatically together with one lower brush and the plug sockets associated with one denomination in each accumulator. Accumulator No. 2 is used to obtain minor totals and its sockets BR are plug connected by connections 200 to the sockets 115 of the lower brushes. Thus the amounts read from the card are entered into accumulator No. 2. When a minor total is obtained it is transferred to Accumulator No. 3 which accumulates intermediate totals minor total by minor total. For this purpose, the sockets TN of accumulator No. 2 are connected by plug sockets 201 to the sockets R of accumulator No. 3. When an intermediate total is obtained, it is transferred to accumulator No. 4 which accumulates major totals intermediate total by intermediate total. For this purpose, the plug sockets TN of accumulator No. 3 are connected by plug connections 202 to the sockets R of accumulator No. 4.

The control switch for accumulator No. 2 is adjusted to the minor position, that for accumulator No. 3 to the intermediate position, and that for accumulator No. 4 to the major position. The main control switch is adjusted to the major position. In this position, the main control switch short circuits the relay 32 (Figure 17) so that three cycles will occur on either a major or an intermediate group change. Further the part C of the main control switch is in the MT position so that only one cycle will occur on a minor group change. Cycle R will occur in addition in both cases. Further, the switches 125, 126 and 127 and D are all open. This allows of major, intermediate and minor group control but prevents the initiation of a second series of cycles if the intermediate control circuit fails. In addition the switches E are left in position shown while the switches F¹ for all the accumulators are shifted from the position shown to the "MAJ" position.

The manner in which the various distributors are energized under the control of the cycle relays is indicated in Table C below.

TABLE C

*Major, intermediate and minor*

| | Distributors | | |
|---|---|---|---|
| | Minor accumulator 2 | Intermediate accumulator 3 | Major accumulator 4 |
| *Minor change* | | | |
| Cycle 1, C1 | 1 | 2 | |
| Cycle R | 2, 3, 4, 5 | | |
| *Intermediate change* | | | |
| Cycle 3, C3 | | 2 | |
| Cycle 2, C2 | | | 2 |
| Cycle 1, C1 | 1 | 1, 2 | |
| Cycle R | 2, 3, 4, 5 | 2, 3, 4, 5 | |
| *Major change* | | | |
| Cycle 3, C3 | | 2 | |
| Cycle 2, C2 | | | 2 |
| Cycle 1, C1 | 1 | 1, 2 | 1 |
| Cycle R | 2, 3, 4, 5 | 2, 3, 4, 5 | 2, 3, 4, 5 |

With the control switch for accumulator No. 2 in the minor position, the contacts 610 (Figure 15) will engage the lowest row of contacts 601. From Table C it will be seen that distributor 2D—1 must be energized in cycle 1. This is effected by a circuit extending through the contacts C1f closed during cycle 1, a line 208, contacts 26a, a line 209, a line 210, the switch for accumulator No. 2, the switch E, the contacts 25b, and the distributor coil 2D—1. The contacts 25b and 26a are closed at this time since their coils 25 and 26 are in the minor control circuit (Figure 9) which has now failed.

It will also be seen from Table C that the distributors 2D—2, 2D—3, 2D—4, and 2D—5 must be energized in each cycle R. This is effected through circuits including contacts of the relay MIR and inlets 186, 187, 188, the accumulator switch and the lines 189, 190 and 191.

In order to avoid unnecessary duplication in the circuits in Figure 15 the accumulator switches for accumulators Nos. 3 and 4 have not been shown. Accordingly, the circuits by which the distributors associated with these accumulators are energized will be explained on the assumption that the switch for accumulator No. 2 is adjusted first to the intermediate position and then to the major position. It should be borne in mind that the distributors energized will not be the 2D distributors but the 3D or 4D distributors as the case may be.

It will be seen from Table C that the distributor 3D—2 is energized on each cycle 1 while the distributor 3D—1 is energized on cycle 1 only on an intermediate or major group change. The circuit for energizing the distributor D—2 of accumulator No. 3 extends through the contacts C—1e, a line 211, a line 212, the accumulator control switch and the distributor D—2.

On a minor group change, the intermedate group circuit is maintained and the coil 19 (Figure 9) in it is energized and holds its contacts 19a (Figure 15, lower left) open. On an intermediate or major group change, however, this coil becomes de-energized and the contacts 19a close to allow of a circuit being completed through the contacts C1f, the line 208, the contacts 19a, a line 213, a line 214, the accumulator control switch, the switch E, the contacts 25b and the distributor D—1. Thus this distributor will be energized in cycle 1 if an intermediate or major group change has occurred, but not if a minor group change has occurred.

When an intermediate or major group change has occurred, but not when a minor group change has occurred, the reset control relay IR will be energized during the cycle R and will complete circuits through the lines 215, 216 and 217 to energize the distributors D—2, D—3, D—4 and D—5 of accumulator No. 3. This conditions this accumulator for reset on an intermediate or major group change but not on a minor group change.

The distributor 3D—2 should be energized in cycle 3 whenever it occurs. This is provided for by a circuit including the contacts C3e, a line 218, a line 219, the switch F, and the distributor D—2.

From Table C it will be seen that the distributor 4D—1 of the major accumulator No. 4 should be energized during cycle 1 on a major group change only. On either an intermediate or a minor group change, the relay coil 16 (Figure 9) in the major control circuit is energized and holds its contacts 16a (lower left, Figure 15) open. On a major group change, however, the relay 16 becomes de-energized owing to the major control circuit failing and the contacts 16a close so that a circuit can be completed through the contacts C1f, the contacts 16a, a line 220, a line 221, the accumulator control switch, which is in the "major" position (i. e., on the third row of contacts 601 from the bottom), the switch E, the contacts 25b and the distributor D—1. Thus, the distributor 4D—1 is energized in cycle 1 on a major group change only.

The distributor 4D—2 must be energized during each cycle 2. This is effected through a circuit extending through contacts C2d of cycle relay C2, a line 222, a line 223, the accumulator control switch and the distributor D—2. Finally, the distributors 4D—2, 4D—3, 4D—4 and 4D—5 must be energized during the cycle R on a major group change. In such a case the contacts MAR shown in Figure 15 are closed and circuits are completed through lines 224, 225 and 226, the accumulator control switch in the major position and the distributors D—2, D—3, D—4 and D—5.

Figure 21 shows an example comprising a major group of cards which is divided into two intermediate groups, the first intermediate group comprising two minor groups and the second intermediate group one minor group. There is one card in each minor group. The first minor group gives a minor total of £10. 0. 0. in accumulator No. 2 and when the minor group change occurs two total taking cycles are performed. The first of these is cycle 1, during which the distributors 2D—1 and 3D—2 are energized (see Table C). This provides for the printing of the minor total of £10. 0. 0. and for its entry into accumulator No. 3. In cycle R the minor accumulator is reset in the manner previously explained.

The second minor group gives a minor total of £45. 10. 0. and completes the intermediate group. An intermediate group change, therefore, occurs and cycles 3, 2, 1 and R are performed in succession. Referring to Table C it will be seen that the distributor 3D—2 is energized in cycle 3, conditioning accumulator No. 3 to receive the minor total from accumulator No. 2 as shown in Figure 21. This gives an intermediate total of £55. 10. 0. In cycle No. 2 the distributor 4D—2 is energized and accumulator No. 4 is conditioned to receive the intermediate total from accumulator No. 3. During the cycle 1 the distributors 2D—1 and 3D—1 are energized so that the minor and intermediate totals are printed on the same line of the report sheet. The distributor 3D—2 is also energized to condition accumulator No. 3 to add the totals from accumulator No. 2. The concurrent energization of the distributor 3D—1, however, breaks the circuits through the accumulator magnets CT as will be clear from Figure 12 so that no entry will be made into the accumulator No. 3. This is because, when an accumulator is adjusted both to print and to receive a total from another accumulator, only the first operation can be performed.

The third minor group of cards provides a minor total of £25. This group is also an intermediate group and completes the major group. A major group change then occurs and cycles 3, 2, 1 and R are performed in succession. Cycles 3 and 2 involve the transfer of the minor total to accumulator No. 3 and the transfer of the intermediate total from accumulator No. 3 to accumulator No. 4 so as to get the major total of £80. 10. 0. in accumulator No. 4. In cycle 1 all three distributors 2D—1, 3D—1 and 4D—1 are energized so that the totals in the three accumulators are printed. These three accumulators are all reset to zero during the following R cycle and the machine then proceeds with the next group of cards.

*Minor and intermediate control*

The machine can be operated under minor and intermediate control only by adjusting the main control switch to the "intermediate total" position (Figure 17). In this position the switches A and B are both closed, so that the relays 31 and 32 are both short-circuited and a maximum of three cycles can occur on an intermediate group change. The switch C is in the MT position so that two cycles occur on the minor group change. The switch 125 is closed to maintain the major control circuit continuously energized.

Figure 22 shows the operations performed, with the same three cards as in Figure 21, to obtain minor and intermediate totals. Accumulator No. 2 is plugged up to receive entries from the cards and its control switch is set to the minor position. Accumulator No. 3 is plugged up to receive entries from accumulator No. 2 and its control switch is set to the intermediate position. Further, the switches F (Figure 15) are set to the "Int" position shown.

The manner in which the distributors are energized in this type of operation is shown in Table D.

TABLE D

*Intermediate and minor*

| | Distributors | |
|---|---|---|
| | Minor accumulator 2 | Intermediate Accumulator 3 |
| *Minor change* | | |
| Cycle 1, C1 | 1 | 2 |
| Cycle R | 2, 3, 4, 5 | |
| *Intermediate change* | | |
| Cycle 2 | | 2 |
| Cycle 1 | 1 | 1, 2 |
| Cycle R | 2, 3, 4, 5 | 2, 3, 4, 5 |

From Table D and Figure 22 it will be seen that the operations on a minor group change are identical with those occurring on a minor group change in the example shown in Figure 22. On an intermediate group change, however, accumulator No. 3 must receive the minor total in cycle 2 instead of in cycle 3 as in the previous example. With the switch F associated with accumulator No. 3 in the position shown in Figure 15, the distributor D—2 for accumulator No. 3 will be energized through the contacts C2e, a line 227, a line 228 and the switch F which is in the position shown. Thus, the minor total will be transferred to accumulator No. 3 during cycle 2, as shown in Figure 22. In other respects the operation on an intermediate group change need not be repeated since it merely involves the printing of the intermediate total and the resetting of the intermediate accumulator No. 3 in the usual manner.

*Minor control*

To operate under minor control only, the main control switch is turned to the "minor total" position. With this setting, the switches 125 and 126 (Figures 9 and 17) are closed so that only the minor control circuit can fail. On a minor group change two cycles will occur, the minor total being printed in cycle 1 and the minor accumulator reset in cycle R. The circuits involved in these operations are the same as those previously described and need not be repeated.

It should be noted that when operating under minor control, another accumulator can be used to give a grand total for all the minor groups within a batch of cards. For this purpose, the accumulator, which may be, say, accumulator No. 3 is plugged up to receive the minor total from accumulator No. 2 and its control switch is set in the intermediate position. With this setting, whenever a minor total is printed it will also be transferred to the accumulator No. 3, exactly in the same manner as occurs on a minor group change when operating under intermediate and minor control. The intermediate control circuit will, however, be maintained by the switch 126 (Figure 9) until the last card has passed the upper brushes. When this occurs the contacts UCLRf (Figure 9) will open and will break the holding circuit for the intermediate control circuit through the switch 126. Thus, as the last card passes the lower brushes, both the intermediate and minor control circuits will fail. The failure of the intermediate control circuit will force the machine to perform cycles 2, 1 and R and the grand total will be printed under intermediate control and accumulator No. 3 reset. It will be seen from this that when operating under minor control the machine operates in the same way as when under intermediate control except that the intermediate control circuit only fails when the last card has passed through the machine.

Accumulating major totals

Provision is made for obtaining in accumulator No. 5 an accumulating major total or a grand total of all the major totals obtained by the machine. When this is required, accumulator No. 5 is plugged up to receive the totals from accumulator No. 4 by plug connections between the sockets R of accumulator No. 5 and the sockets TN of accumulator No. 4. Further, the control switch for accumulator No. 5 is turned to the "Major Acc." position (see Figure 15a). In this position a circuit is prepared through the contacts C—1d (Figure 15), the contacts 15b, a line 229, the control switch for accumulator No. 5 (Figure 15a) and the distributor 5D—2. The contacts 15b are normally held open by their coil 15 (Figure 9) which is in the major control circuit. On a major group change this control circuit fails, and the contacts 15b close so that during the cycle 1 resulting from a major group change the distributor 5D—2 is energized and accumulator No. 5 is conditioned to add the major total while it is being printed from accumulator No. 4.

It will be seen from Figure 15a that when the control switch for accumulator No. 5 is in the "Major Acc." position, no provision is made for printing the accumulating major totals or for resetting accumulator No. 5. These operations are performed after the machine has finally stopped in the following manner.

The machine will come to rest with all its card lever relay contacts, including contact LCLRc (lower right, Figure 9) and LCRg (right Figure 10 open). The last cycle of the machine will be a cycle R in which the relay MAR is energized to reset the major total accumulator. The contacts MARd (right Figure 10) will therefore be open so that, when the cam contacts P—19 open, the relay 35 will be de-energized. Before this occurs the automatic control circuit will have been set up by the cam contacts P—5 upper in the usual manner and will hold themselves through the contacts 58b (Figure 9). After the machine has stopped the control switch for accumulator number 5 is turned to the "major total" position, see Figure 15, and switches 230 and 231 (right centre Figure 9) are shifted to the dotted line position. The reset key is then depressed and by closing its contacts Ra energizes the relays 3, 4 and 5, and the clutch magnet PSC which, as previously explained, brings about a series of total taking cycles. The closure of the contacts Rb by the reset key completes a circuit through relay contacts 59a, which are closed since their coil 59 (top left Figure 9) is de-energized being in parallel with the now de-energized tabulating motor TM, the switches 231 and 230 and a relay coil 58. This coil opens the contacts 58b to break down the major, intermediate and minor control circuits and cause the machine to perform four cycles under major control. The relay 58 also closes the contacts 58a (Figure 10) to re-energize the relay 35 over a circuit including the now closed contacts MARd and the contacts 58a. The machine will then proceed to perform total taking operations appropriate to a major group change and, since the switch for accumulator number 5 is in the major position, the accumulated major totals in that accumulator will be printed and the accumulator reset to zero. The machine then again stops.

Cycle varying

From the foregoing it will be seen that the automatic control circuits serve to initiate a series of total taking cycles and also determines, in accordance with the kind of group change which has occurred, which of a predetermined sequence of total taking cycles shall be performed. By means of the main control switch the number of total taking cycles performed on a particular type of group change can be varied in accordance with the type of operation the machine as a whole is to perform.

The cycle relays C1 to C4 are energized in sequence and each, when energized, determines that the machine shall perform a particular cycle. The distributors 1D—0, etc., determine, in accordance with how they are energized, the particular manner in which the associated accumulator shall operate during a total taking cycle. The accumulator-control switches serve to associate the distributors with the cycle relays in such a manner that each accumulator will operate during a particular total taking cycle in a manner determined by the setting of the control switch. The control switches thus form means for varying the behaviour of an accumulator during a particular total taking cycle in acccordance with the operation which the machine as a whole is to perform. The control switches form a convenient means for adjusting the machine to perform the more usual operations which have been explained above. The machine can, however, be readily adjusted to perform a large number of other operations. This can be effected either by modifying the control switches according to the type of operation required, or, alternatively, by providing a plug board either in substitution for or in addition to the control switches.

The manner in which such a plug board can be used to adjust the machine for performing certain special operations will now be described.

Calculating interest figures

In some cases it is the custom for a bank to allow a customer interest on his account when it is in credit and to charge interest on the account when it contains an overdraft. The two interest rates are usually different, so that there will be two interest amounts. The amount due from the bank is calculated by adding together the totals at the credit of the account for each day in which the account is in credit to give an interest figure which when multiplied by the interest rate per diem gives the actual amount of interest. The amount of interest due from the customer to the bank is calculated in the same manner. The present machine can be adapted to calculate automatically a credit interest figure and a debit interest figure for a given period for each customer.

It will be assumed that it is required to calculate the interest payable for three days, there being no initial balance in the account and there being three transactions on the first day, none on the second and two on the third. The transactions are recorded each on a separate card together with the date of the transaction and a customer identifying number. Further a blank card containing only the customer's number and date is prepared for each day, in the present case the second day, on which there were no transactions. These cards are sorted into date order and passed through the machine which is adjusted to effect a minor control by the dates and an intermediate control by the customer numbers. Each group of cards related to one day will thus form a minor group and there will be at least one card, which may be blank, for each day of the period. The main control switch is turned to the intermediate subtraction position so that four cycles will occur on a minor group change and nine cycles, that is a series of four cycles followed by a series of five cycles, on an intermediate group change.

The accumulators are plugged up as shown in Figure 24. The sockets BR for accumulators numbers 2 and 3 are connected to the sockets 141 and 142 associated with distributing relay DR. This ensures that the debit amounts read by the lower brushes are entered into accumulator number 2 and the credit amounts into accumulator number 3 in the same way as described above under the heading "Credit and debit distribution". Plug connections 242 and 243 are made from the sockets TS of accumulator No. 2 to the sockets R of accumulators Nos. 4 and 5 and plug connections 244 and 245 are made from the sockets TS of accumulator No. 3 to the sockets R of accumulators Nos. 4 and 5. An entry can be made from either accumulator No. 2 or accumulator No. 3 into either accumulator No. 4 or accumulator No. 5. The comparing relays CP1, etc., are plugged up to compare the total of accumulator No. 2, with that of accumulator No. 3 exactly as explained under the heading "Intermediate and minor subtraction".

The control switches of accumulators Nos. 2 to 5 are left in their off position, and plug-connections are made between the distributor coils and the contacts of the cycle relays as shown in Figure 26. As shown in this figure, the distributor coils are connected to sockets 250 which are plug-connected to sockets 251 by plug-connections 252. The sockets 251 are connected to the contacts of the cycle relays, directly or through contacts of the credit and debit selecting relays CS1 and DS1, etc. In practice the sockets 251 would be arranged in groups each corresponding to a particular cycle relay in order to facilitate plugging. They have been otherwise shown in Figure 26 in order to show the circuits as simply as possible.

The circuits shown in Figure 26 result in the distributors being energized in the manner shown in Table E. These circuits can readily be traced and need not be described in detail.

TABLE E

*Interest figures*

|  | Dstributors | | | |
| --- | --- | --- | --- | --- |
|  | Debit Accumulator 2 | Credit Accumulator 3 | Debit Accumulator 4 | Credit Accumulator 5 |
| Cycle 3 |  | 1 | 1 |  |
| Cycle 2 {If dr | 0 |  | 2 |  |
| {Or cr | 0, 4, 5 |  |  | 2 |
| Cycle 1 {If dr |  | 0, 4, 5 | 2 |  |
| {Or cr |  | 0 |  | 2 |
| Cycle R {If minor |  |  |  |  |
| {If inter | 2, 3, 4, 5 | 2, 3, 4, 5 |  |  |
| Cycle 4 |  |  | 1 | 1 |
| Cycle 3 | 1 | 1 |  |  |
| Cycle 2 |  |  |  |  |
| Cycle 1 |  |  |  |  |
| Cycle R | 2, 3, 4, 5 | 2, 3, 4, 5 | 2, 3, 4, 5 | 2, 3, 4, 5 |

It should be noted from Figure 26 that the distributors involved in the resetting accumulators Nos. 2 and 3 are connected to contacts of the relay IR and those involved in the resetting of accumulators Nos. 4 and 5 are connected to the contacts of the relay MAR. Thus accumulators Nos. 2 and 3 will only be reset during the first cycle R in an intermediate group change and will accumulate progressive minor totals while accumulators 4 and 5 will be reset during the second cycle R, when the major control circuit has failed, on an intermediate group change.

Referring now to Figure 23. The three cards for the first day result in a debit total of £108. 10.6, a credit total of £24. A minor group change then occurs with four total taking cycles and during cycle 3, the two totals are printed and compared, since the debit total is the larger, the debit selective relay DS1, etc., will be energized and will remain energized during cycles 2 and 1.

From Table E it will be seen that, when the debit total is the larger, the distributor 4D—2 is energized during cycles 2 and 1 so that entries will be made into the accumulator No. 4 during these two cycles. Further, it will be seen that the distributor 2D4—0 is energized during cycle 2 and the distributor 3D—0 during cycle 1 so that a transfer will be made from accumulator No. 2 to accumulator No. 4 during cycle 2 and from accumulator No. 3 to accumulator No. 4 during cycle 1, as shown in Figure 23. Further, from Table E it will be observed that the distributors 2D4 and 2D5 are not energized during cycle 2 if the debit total is the larger so that the larger debit total will be transferred as such to accumulator No. 4. On the other hand the distributors 3D—4, 3D—5 are energized during cycle 1 so that the complement of the smaller credit total is transferred to accumulator No. 4 which will thus finally contain the balance between the credit and debit totals. This is the amount on which interest is to be paid for the first day.

The cycle R then occurs but since only a minor group change has taken place, none of the accumulators are reset. The machine then proceeds to read the blank card for the second day. The totals in accumulators Nos. 2 and 3 thus remain the same as for the first day. The function of this blank card is to cause the machine to perform the printing, comparing and transferring operations in respect of the second day, by causing a minor group change. Thus, after the card for the second day has been read the machine performs four total taking cycles exactly similar to those just described. This gives a balance in accumulator No. 4 of £169. 1. 0d., this amount being the sum of the debit balance for the first day and of the debit balance for the second day.

The first card for the third day contains a large credit and the second a small debit. The credit total will, thus, be larger than the debit total. Consequently, the credit selecting relay CS1, etc., will be energized. Referring to Table E it will be seen that when the credit total is the larger, the distributors 5D—2 are energized in cycles 1 and 2, the distributors 2D—4 and 2D—5 are energized in cycle 2 and the distributors 3D—4 and 3D—5 are not energized in cycle 1. Thus the complement of the debit total will be transferred to accumulator No. 5 in cycle 2 and the credit total will be transferred to accumulator No. 5 in cycle 1. This will give in accumulator No. 5 the balance between the debit and credit totals in respect of the third day.

Since the third day is the last of the period under consideration an intermediate group change has occurred and the next card will relate to another customer. Therefore, the cycle R which occurs after the credit balance has been obtained will result in accumulators Nos. 2 and 3 being reset to zero. The machine will also go through a second sequence of 5 cycles commencing with a cycle 4 in which the distributors 4D—1 and 5D—1 are energized. This provides for the printing of the debit interest figure and the credit interest figure from accumulators Nos. 4 and 5. The machine will proceed to print and compare the totals in accumulators Nos. 2 and 3 during the following cycles 3 but since both these accumulators are at zero no circuits will actually be completed and no transfers will take place during cycles 2 and 1. Finally, during the second cycle R, all four accumulators will be reset since the major control circuit has now failed for the reasons explained above and the relay MAR is energized. The machine will then proceed to read the group of cards relating to the next customer.

Cycles 3, 2 and 1 in the second series of cycles resulting from an intermediate group change are idle cycles and could be omitted by suitably modifying the machine. Since, however, the calculations normally take place in respect of a long period the number of intermediate group changes is small in comparison with the number of minor group changes and the time wasted by these idle cycles is relatively unimportant. It will also be noted that the interest figures obtained in accumulators Nos. 4 and 5 are the sums of a series of balances. Figure 25 shows the return prepared by the machine when operating in accordance with the example given in Figure 23.

*Cross-addition and cross-subtraction*

The present machine, unlike prior commercial tabulating machines, can sum algebraically two or more amounts recorded on a single card to obtain the total of or balance between the amounts on that card. The machine can also obtain the algebraic sum of the amounts on a group of cards each of which contains two or more amounts.

As an example of the latter type of operation, assume that each card contains a credit and a debit and that the cards are divided into intermediate and minor groups. The machine is adjusted as described under "Intermediate and minor subtraction" except that accumulators Nos. 2 and 3 are plugged directly to the lower brushes so that the debit amounts are entered into accumulator No. 2 and the credit amounts into accumulator No. 3, the credit and debit distributing relay DR (Figures 9, 11 and 14) being rendered inoperative. Thus, for each card a debit amount will be entered into accumulator No. 2 and a credit amount into accumulator No. 3. The machine would then operate exactly as previously explained, obtaining a total of the debit amounts, a total of the credit amounts and the balance between them, for each minor group and also for each intermediate group. The only difference between the previously described method of operation and the present method is that in the present method both a debit entry and a credit entry is made for each card instead of either a debit entry or a credit entry.

An example of the operation of the machine in obtaining the algebraic sum of three amounts which are recorded on a single card is shown in Figures 27 and 28. It will be assumed that it is desired to prepare a statement from cards each of which relates to a particular customer and a particular transaction and contains a gross price, a trade discount, and a cash discount. The two discounts are to be deducted from the gross price to give a net price which is to be printed and the machine has also to add together the net prices of all transactions with a particular customer to give a total charge to that customer. Each card will have a customer number and a transaction number.

The main control switch (Figure 17) is turned to the major total position to allow of major group control and to provide four total taking cycles on either an intermediate or a major group change. The control relays CM (Figure 11) and the automatic control circuits (Figure 9) are plugged up so that the major control circuit fails on a change of customer number and both the minor and intermediate control circuits fail on the change of transaction number. There will thus be major customer groups of cards and intermediate transaction groups of cards. Since, in the present instance the latter groups consist of a single card only, the plug connection 124 (lower left Figure 9) for the intermediate control circuit could be omitted, in which case the intermediate and minor control circuits would fail for each card. Thus, four total taking cycles will occur after each card-feed cycle under intermediate control and four total taking cycles will occur under major control at the end of each group of cards relating to a single customer.

The accumulator control switches are all turned to the "off" position and the distributor coils are specially plugged to the contacts of the cycle relays so that they will be energized in the manner shown in the Table F below. It is believed that the manner in which this plugging is effected will be apparent from the previous description and accordingly the circuits involved have not been shown.

TABLE F

|  | Distributors | | | | |
| --- | --- | --- | --- | --- | --- |
|  | Accumulator 1 | Accumulator 2 | Accumulator 3 | Accumulator 4 | Accumulator 5 |
| Cycle 3 | 2 | 0, 4, 5 | 0, 4, 5 | 2 | 2 |
| Cycle 2 | 0 | | | 2 | 2 |
| Cycle 1 {If inter | | | | 1 | |
| Cycle 1 {If major | | | | 1 | 1 |
| Cycle R {If inter | 2, 3, 4, 5 | 2, 3, 4, 5 | 2, 3, 4, 5 | 2, 3, 4, 5 | |
| Cycle R {If major | 2, 3, 4, 5 | 2, 3, 4, 5 | 2, 3, 4, 5 | 2, 3, 4, 5 | 2, 3, 4, 5 |

In addition, plug connections are made between the sockets TS and the sockets R of the various accumulators (see Figure 12) so that the total in accumulator No. 2 can be transferred to accumulator No. 1, the total in accumulator No. 3 can be transferred to accumulator No. 4, and also to accumulator No. 5, and from accumulator No. 1 to accumulators Nos. 4 and 5. The machine is adjusted to tabulate by setting the switch 109 (left centre Figure 9) to the "TAB" position. With this setting, it will be recalled, the first of each series of card-feeding cycles is a printing cycle. Since in the present example there is only one card in each group, each series of card-feeding cycles will consist of a single cycle which will be a printing cycle. The switches 133 for accumulators Nos. 1, 2 and 3 are closed in order that the amounts entered into these accumulators may be printed.

In the example illustrated by Figure 27, there are two cards which form a customer group.

During the card-feeding cycle with respect to the first card, the gross price, trade discount and cash discount are printed and entered into accumulators Nos. 1, 2 and 3 which are plug-connected directly to the lower brushes reading the amounts from the card. After this card has been read, an intermediate group change occurs and the card-feeding cycle is followed by four total taking cycles.

From Table F it will be seen that accumulators Nos. 2 and 3 are conditioned during the cycle 3 of this series of cycles to transfer the complement of the amounts they contain, while accumulators Nos. 1, 4 and 5 are conditioned to receive amounts. Thus, as shown in Figure 27, the complement of the trade discount in accumulator No. 2 will be transferred to accumulator No. 1 and the complement of the cash discount in accumulator No. 3 will be transferred to both accumulator No. 4 and accumulator No. 5. During cycle 2, accumulator No. 1 is conditioned to transfer the amount it contains while accumulators Nos. 4 and 5 are conditioned to receive amounts. Therefore, as shown in Figure 27, the amount in accumulator No. 1 will be transferred to accumulators Nos. 4 and 5. Both these latter accumulators will, therefore, contain the difference between the gross price and the sum of the two discounts, that is the net price.

During cycle 1, the net price in accumulator No. 4 is printed. Printing of the total in accumulator No. 5 is, however, suppressed since the major control circuit has not failed. For this purpose, this distributor coil 5D—1 is connected to the contacts of the relay C—1 through the contacts 16a (lower left Figure 15) as described under the heading "Major, intermediate and minor totals". This ensures that the total in accumulator No. 5 will only be printed on a major group change. After the net price has been printed, cycle R occurs and accumulators Nos. 1 to 4 are reset. For this purpose, the appropriate distributors are connected to the contacts of the relay IR so as to be energized on an intermediate group change, as shown in Table F.

The second and last card of the group is then read and the amounts it contains are printed. The major group change then occurs and four totalling cycles follow. The first two cycles 3 and 2 are similar to the cycles 3 and 2 just described and at the end of these cycles the net price for the second card is contained in accumulator No. 4 while the total, that is, the sum of the net prices from two cards, is contained in accumulator No. 5. Since a major group change has occurred, both the distributors 4D—1 and 5D—1 will be energized during cycle 1. Consequently, both the net price for the second card and the total for the two cards will be printed in line with the amounts for the second card. During the following cycle R all five counters will be reset to zero.

It will be noted that the net prices are printed in line with the amounts to which they relate. This arises from the fact that the machine is set to tabulate whereby, as previously explained, no paper-spacing operation takes place between the printing effected during a card-feeding cycle and the printing of the next total.

It will be apparent that a fourth amount, such as a charge for delivery, could have been entered from each card into accumulator No. 4 so as to be added into the net price. If this is done the machine must be adjusted to list in order that a paper-spacing operation may take place between the printing of the amounts and the printing of the net price, since both the fourth amount, e. g., the charge for delivery, and the net price are printed in the same column by the same type-bars. With this modified adjustment, the net price will be printed on a separate line and immediately below the charge for delivery. The total would, however, be printed in line with the last net price.

By disconnecting the distributors 2D—4 and 2D—5, 3D—4 and 3D—5 from the cycle relay C—3, the machine could be operated to sum the amounts on the card. This adjustment would be of utility in the case of gas companies, and other public utility corporations, when a charge is made which in the sum of a fixed charge, a charge based on the actual consumption of gas and a charge for hire of appliances. These three charges will be recorded on the card and summed by the machine to obtain the actual charge to the customer.

In the case just suggested each card will relate to a separate customer so that it would not be necessary to use accumulator No. 5 to obtain the total charge to the customer. This accumulator could, however, be used to obtain an accumulating major total of all the actual charges to all the customers by adjusting it in the "Major Acc." position as previously explained.

Modifications of the machine

When the counter circuits are arranged as shown in Figure 12, the items entered into any one accumulator and the total and balances contained in that accumulator can only be printed by one particular printing bank in the printing mechanism. This is because one group of printing magnets PR is permanently associated with the accumulator magnet CT for one accumulator. The modified circuit arrangement shown in Figure 30 allows of any printing bank being associated with any accumulator.

It will be noted that the contacts of 131b of Figure 12 and the distributor contacts D-1A have been omitted from the arrangement shown in Figure 30. The distributor contacts D—1 serve normally to connect the sockets BR of the accumulator to sockets 280 associated with that accumulator. Each print magnet PR is connected to a socket 281 and the sockets 280 relating to any accumulator can be plug-connected to the sockets 281 relating to any one bank of print magnets. Thus any printing bank can be associated with any accumulator by making suitable plug-connections.

With the above arrangement the print magnets associated with a particular accumulator will normally be energized through the closed distributor contacts D—1 and the sockets BR of that accumulator whenever an amount is entered into the accumulator. When it is not desired to print the items entered into an accumulator a switch 133 (Figure 31) associated with that accumulator is closed so that, on each card-feed cycle, a circuit is completed through cam contacts L—35, the switch 133, contacts 283a or 283b and the distributor coil 2D—1, or 3D—1, etc., as the case may be, there being one such circuit for each accumulator. This will energize the distributors D—1 for all the accumulators whose switches 133 are closed and these distributors will open their contacts D—1 (Figure 30) so as to break the circuits from the brushes to the associated print magnets PR and prepare the total printing circuit through the print magnets. The total printing circuits are not, however, completed during card-feeding cycles, since cam contacts T—6 open to break these circuits. The cam contacts T—6 are operated by the shaft 542 (Figure 2) and are opened during the card sensing portion of card-feeding cycles. These contacts are closed during total taking cycles to allow of total printing and total transferring circuits being completed.

The circuits through the cam contacts L—35 are broken during total printing cycles by the opening of the contacts 283a, 283b, etc. These contacts, of which there is one for each accumulator, are normally held closed by a relay coil (not shown) which is included in the minor control circuit. When the minor control circuit fails these contacts open to allow of the distributors D—1 being energized under the control of the cycle relays in the manner previously explained.

It will be seen from Figure 30 that no provision has been made for including the comparing mechanism in the circuit. With this modified machine it is proposed to obtain balances by transferring the complement of the credit total to the accumulator containing the debit total in all cases irrespective of the relative sizes of the totals. The comparing mechanism is therefore omitted together with the credit and debit selecting relays CS1 and DS1, etc. From Figure 31, it will be noted that contacts of the cycle relays C1 and C2 are connected to the distributor coils for accumulators Nos. 2 and 3 in the manner appropriate to the transfer of the complement of the total in the credit accumulator No. 3 to the debit accumulator No. 2 (compare Figure 31 with Figure 16).

When the debit total is the larger, the true balance will be obtained. When the credit total is the larger, the complement of the true balance will be obtained. The machine is, therefore, arranged to print the complement of a complementary balance obtained in accumulator No. 2. The presence of a complementary balance in accumulator No. 2 is indicated by the fact that the highest wheel of this counter will stand at nine. A cam 284 (Figure 31) is driven by the highest accumulator wheel in this accumulator and closes contacts 284a when this highest wheel registers nine. With these contacts closed and with the cycle relay C1 energized, a circuit will be completed through the cam contacts P—11 to P—20, contacts C1e, a plug connection 182, the contacts 284a and the distributors 2D—4 and 2D—5. With these distributors energized and with the distributor 2D—1 energized, the complement of the total will be printed. When the correct balance is obtained, the contacts 284a will be open and the distributors 2D—4, 2D—5 will not be energized during the cycle 1. The actual amount in the accumulator will then be printed.

Thus, when a balance is obtained, either the amount or the nines complement of the amount in the accumulator will be printed. The fugitive unit must be entered into the accumulator when the entry of a complement results in a true number being obtained but not when it results in a complement being obtained. This ensures that the accumulator will either contain the true amount or the nines complement of the true amount. Before a complement is entered into an accumulator, its highest wheel will register zero. The entry of the complement involves this wheel adding nine to register nine. If the result is complementary, no transfers will be made to this wheel which will continue to register nine. If the result is a true amount, a transfer will be made to the highest wheel which will turn to zero and a transfer to an imaginary wheel.

The highest wheel of each accumulator is provided with the usual transfer or carry mechanism including a carry-lever such as the lever 105 of Figure 8 of British patent specification No. 358,105 (United States patent application Serial No. 375,914) which is rocked in one direction in the usual manner wherenever a transfer is to be effected from that wheel and is then rocked in the reverse direction to effect the actual transfer to the next wheel. When this lever rocks in the first direction, it closes a pair of contacts 285 (Figure 30) which are similar to the contacts 107 shown in Figure 8 of the specification just mentioned. When these contacts close, and provided that the highest wheel registers nine and has closed contacts 284b (Figure 30), a circuit will be completed through the fugitive unit magnet FU of the accumulator, normally closed distributor contacts D—3a, the contacts 285 and the contacts 284b. The fugitive unit magnet FU is thus energized and trips the carry mechanism for the units denomination immediately prior to the actual transfer operation so that one unit will be entered into the units denomination. If the amount obtained is a complement, the contacts 285 will not close and this circuit will not be completed.

When resetting an accumulator to zero by the entry of the complement of the total it contains, it is necessary to add the fugitive unit. It will be recalled that the distributor D—3 is only energized when an accumulator is reset to zero. When this distributor is energized, it opens its contacts D—3a and closes its contacts D—3b so as to complete a circuit through the magnet FU, the contacts D—3b, a line 286 and the emitter E2. The magnet FU is thus energized and the fugitive unit is entered.

With the arrangement just described, the balances are always printed by the print magnets associated with the debit accumulator so that debit and credit balances cannot be distinguished from one another by their position on the report sheet. The symbol printing circuits are, therefore, modified as shown in Figure 31.

Referring to the lower half of this figure, two asterisk print magnets, PR* are shown, one plugged for control by the debit accumulator No. 2 and the other for control by the credit accumulator No. 3. These magnets control type-bars having an asterisk in the nine position, the symbol DB in the eight position and the symbols CB in the seven position. It will be appreciated that the type-bars associated with accumulator No. 3 only print totals. When the distributor 3D—1 is energized to condition this accumulator to print, a circuit is established through its magnet PR* (the lower one in Figure 31), plug sockets 281a and 280a, distributor contacts 3D—1b, normally-closed distributor contacts 3D—4a, a plug-socket 287, a plug-socket 288, a line 289 and the nine digital segment of the emitter E2. This asterisk print magnet will, therefore, be energized at the nine time in the cycle and will arrest its type-bar in position to print an asterisk.

Considering now the symbol printing in respect of accumulator No. 2, when this accumulator contains a credit balance that is a complementary balance and is conditioned to print the complement of the complementary balance, both the distributors 2D—1 and 2D—4 will be energized and a circuit will be completed through the magnet PR* associated with this accumulator (that is the upper one in Figure 31), sockets 281a and 280a, the contacts 2D—1b, contacts 2D—4b, a line 290 and the seven segment on the emitter E2. The print magnet will, therefore, arrest its type-bar in position to print the symbol CB.

Printing of either a debit total or a debit balance involves merely the energization of the distributor 2D—1. The printing of a debit total is, however, always accompanied by the printing of the corresponding credit total, while when a debit balance is printed, no printing is effected from the credit accumulator. Accordingly, the machine determines, in accordance with whether or not a total is being printed, from the credit accumulator No. 3, whether the amount printed from accumulator No. 2 is a total or a debit balance. In other words, the printing of an asterisk or the symbol DB against a total printed from accumulator No. 2 is controlled by the condition of the distributor D—1 for accumulator No. 3. When a debit total is printed the distributors 2D—1 and 3D—1 are both energized. A circuit will then extend through the print magnet PR* for accumulator No. 2, the contacts 2D—1b, the contacts 2D—4a, a plug-socket 291, a plug connection 292, a plug-socket 293, the now closed contacts 3D—1c, a line 294 and the nine digital spot of the emitter E2. An asterisk will thus be printed. When printing a minor balance, however, only the distributor 2D—1 is energized, so that the circuit extends through the magnet PR* of accumulator No. 2, the contacts 2D—1b, the contact 2D—4a, the plug connection 292, the normally-closed distributor contacts 3D—1a, a line 295 and the eight digital spot of the emitter E2. The asterisk type-bar will, therefore, be arrested in position to print the symbol DB.

This machine may be provided with an entry control device or clock device. This device is shown at 260 in Figure 1 and fully described in British patent specification No. 359,037. It serves to control the feed of the report sheet so that it may subsequently be divided into a number of sheets of equal length and each containing the totals, balances and, in some cases, items relating to a different group of cards. Where the number of lines of information concerning a particular group is greater than can be accommodated on a single sheet, the entry control device automatically causes the machine to print a progressive total at the foot of the sheet and at the head of the next sheet, and then completes the prining of the information regarding this group of cards on the second sheet.

As this mechanism does not enter directly into the present invention, it will not be described herein. It should, however, be pointed out that some, but not all, of the circuits concerned in the operation of this device have been shown in the drawings. If any relay or circuit which has been shown or referred to without its function being explained, it may be assumed that this relay or circuit is provided in connection with the entry control device.

I claim:

1. A record-card controlled statistical machine comprising the combination with two accumulators, of a card-reading device operatively connected to the two accumulators to enter credit items read from the cards into one accumulator to give credit totals and debit items into the other accumulator to give debit totals, two additional accumulators, reading-out mechanisms by which the total in either of the first two can be read out and transferred additively or subtractively to either of the additional accumulators and comparing mechanism operable automatically to compare the credit and debit totals in the first two accumulators together and to adjust the reading-out mechanisms to transfer, when the credit total is the greater, that total additively, and debit total subtractively, in succession, to one additional accumulator and alternatively, when the debit total is the greater, to transfer the debit total additively and the credit total subtractively to the other additional accumulator.

2. In a record controlled tabulating machine, a pair of accumulators, means for entering items in each, means for transferring the total standing in either accumulator to the other, means controlled by the accumulators jointly for comparing the totals in said accumulators to ascertain which has the lesser true value and means controlled by said comparing means for causing said transferring means to selectively transfer one of the totals to the other accumulator.

3. In a record controlled tabulating machine, a pair of accumulators, means for entering an amount in each, mechanism for causing the amount in either to be subtracted from the amount in the other accumulator, means controlled by the accumulators jointly for comparing the amounts in said accumulators to ascertain which has the lesser true value and means controlled by said comparing means for causing said mechanism to effect the selective subtraction of one of the amounts.

4. In a record controlled tabulating machine, a pair of accumulators, means for entering a true amount in each, subtracting means associated with said accumulators, means controlled by the accumulators jointly for ascertaining which of said two amounts is the lesser and means controlled by said ascertaining means for causing said subtracting means to subtract the lesser amount from the accumulator containing the greater amount.

5. In a record controlled tabulating machine, a pair of accumulators, means for entering a true amount in each, means for transferring the amount in either accumulator to the other accumulator in the form of a complement and means jointly controlled by both said accumulators for causing said transferring means to selectively transfer the amount standing in one of said accumulators.

6. In a record controlled tabulating machine, a pair of accumulators, means for entering a true amount in each, means for transferring the amount in either accumulator to the other accumulator in the form of a complement, means controlled by the accumulators jointly for ascertaining the relative magnitude of said amounts and means controlled thereby for causing said transferring means to transfer the lesser amount to the accumulator containing the greater amount.

7. In a record controlled tabulating machine, a pair of accumulators, means for entering an amount in each, means for transferring the amount in either accumulator to the other accumulator, printing circuit connections for controlling printing of the amounts in said accumulators, means included in said printing circuit connections for determining whether the amount in one accumulator is equal to, greater than, or less than the amount in the other accumulator, and means controlled by said determining means for causing said transferring means to transfer the lesser amount to the accumulator having the greater amount or to suppress the operation of the transferring means if the amounts are equal.

8. In a record controlled tabulating machine, a pair of accumulators, means for entering an amount in each, means for printing said amounts under control of their respective accumulators, means for comparing said amounts while printing, transferring means controlled by said comparing means for causing the lesser amount to be transferred in the form of a complement to the accumulator containing the greater amount, and means for causing printing of the resulting balance under control of the accumulator which initially contained the greater amount.

9. In a record controlled tabulating machine, a pair of accumulators, means for entering items in each of said accumulators whereby the amount in one accumulator may be equal to or different than the amount in the other accumulator, transferring means for transferring the amount in one accumulator to the other, total taking means for reading the totals in said accumulators, comparing means controlled thereby to ascertain which accumulator contains the lesser amount and means controlled by the comparing means for causing the operation of said transferring means to transfer the lesser amount to the accumulator containing the greater amount.

10. In a record controlled tabulating machine, two pairs of accumulators, group control mechanism, means for entering items in each of one of said pairs of accumulators, devices operative in response to said group control mechanism for concurrently printing and comparing the amounts in said pair of accumulators and thereafter simultaneously transferring each amount from the first pair of accumulators to the corresponding accumulators of said second pair of accumulators, and devices controlled by said comparing means for causing the lesser amount in said first pair of accumulators to be transferred in the form of a complement to the accumulator containing the greater amount.

11. In a machine of the class described, two pairs of accumulators, means for entering amounts in one pair, minor and intermediate group control mechanism, means controlled by said minor group control mechanism for causing comparison of the amounts in said pair of accumulators, means controlled by said comparing mechanism to transfer said amounts to the corresponding accumulators of said second pair of accumulators, means controlled by said intermediate control mechanism for effecting one operation of said minor control mechanism and further means controlled thereby for thereafter causing retransfer of the amounts in said second pair of accumulators back to said first pair and operation of said comparison mechanism to compare retransferred amounts and indicating means to indicate the result of the comparison.

12. In a machine of the class described, two pairs of accumulators, means for entering amounts in each accumulator, comparing means and devices for causing said comparing means to successively compare the amounts in each pair of accumulators and means controlled by said comparing means to cause the lesser amount of each pair to be subtracted from the greater amount of the related pair.

13. In a machine of the class described, minor, intermediate and major group control mechanisms separately responsive to changes in minor, intermediate and major group number designations in record cards, four cycle selecting relays each of which initiates a different set of accounting operations selectively settable means for causing said minor group control mechanism to effect energization of one or three of said relays; said intermediate group control mechanism to effect energization of either two or three of said relays and said major group control mechanism to effect energization of either three or four of said relays and means controlled by the relays selected in accordance with said group number changes for controlling the operation of the machine.

14. The invention set forth in claim 46 in which means is provided for causing said intermediate group control mechanism to successively energize its related relays and the relays associated with the major group control mechanism.

15. In a record controlled machine, a pair of accumulators, means for entering amounts in each, transferring mechanisms by which the amount in either accumulator can be read out and transferred to the other accumulator, and comparing mechanism controlled by the accumulators jointly operable automatically to compare the amounts in the two accumulators and to adjust the transferring mechanisms to transfer the lesser amount to the accumulator containing the greater amount.

16. In a record controlled machine, a pair of accumulators, means for entering items in each, means for transferring the total standing in the first accumulator to the second accumulator, means for transferring the total standing in the second accumulator to the first accumulator, means for comparing the totals in said accumulators, and means controlled by said comparing means for selectively causing the operation of one of said transferring means.

17. In a record controlled tabulating machine, a pair of accumulators, means for entering an amount in each, means for causing the amount in the first accumulator to be subtracted from the second accumulator, means for causing the amount in the second accumulator to be subtracted from the amount in the first accumulator, means for comparing the amounts in said accumulators, and means controlled by said comparing means for selectively causing the operation of one of said subtracting means.

18. In a record controlled tabulating machine, a pair of accumulators, means for entering an amount in each, subtracting means associated with the first accumulator and subtracting means associated with the second accumulator, means for determining which accumulator contains the lesser amount and means controlled by said determining means for causing the subtracting means associated with the accumulator containing the lesser amount to subtract the lesser amount from the greater.

19. In a record controlled tabulating machine, a pair of accumulators, means for entering an amount in each, means for transferring the amount standing in the first accumulator to the second accumulator in the form of a complement, means for transferring the amount standing in the second accumulator to the first accumulator in the form of a complement, and means jointly controlled by both said accumulators for selectively causing the operation of one of said transferring means.

20. In a record controlled tabulating machine, a pair of accumulators, means for entering an amount in each, means for transferring the amount in one of the accumulators to the other in the form of a complement, means for transferring the amount in said other accumulator to the first accumulator in the form of a complement, means for determining the relative magnitude of said amounts, and means controlled thereby for selectively causing the operation of one of said transferring means to transfer the lesser amount to the accumulator containing the greater amount.

21. In a record controlled tabulating machine, a pair of accumulators, means for entering an amount in each, means for transferring the amount in the first accumulator to the second, means for transferring the amount in the second accumulator to the first, printing circuit connections for controlling printing of the amounts in said accumulators, means included in and controlled by said printing circuit connections for determining whether the amount in one accumulator is equal to, greater than, or less than the amount in the other accumulator, and devices controlled by said determining means for selectively causing the operation of one of said transferring means to transfer the lesser amount to the accumulator having the greater amount or to suppress operation of the transferring means if the amounts are equal.

22. In a record controlled tabulating machine, a pair of accumulators, means for entering an amount in each, means for printing said amounts under control of their respective accumulators, means for comparing said amounts while printing, transferring means for each accumulator for transferring its amount in the form of a complement to the other accumulator, means controlled by said comparing means for causing the selective operation of one of said transferring means to transfer the lesser amount in the form of a complement to the accumulator containing the greater amount, and means for causing the printing of the resulting balance under control of the accumulator which initially contained the greater amount.

23. In a record controlled tabulating machine, a pair of accumulators, means for entering items in each of said accumulators whereby the amount in one accumulator may be equal to or different than the amount in the other accumulator, means for transferring the amount from the first accumulator to the second, means for transferring the amount in the second accumulator to the first accumulator, total taking means for reading the totals in said accumulators, comparing means controlled thereby to compare the amounts in the two accumulators, and means controlled by the comparing means for selectively causing the operation of one of said transferring means.

24. In a record controlled tabulating machine, two pairs of accumulators, group control mechanism, means for entering items in each of one of said pairs of accumulators, devices operative in response to said group control mechanism for concurrently printing and comparing the amounts in said pair of accumulators, transferring mechanisms controlled by said devices for causing transfer of each amount from the first pair of accumulators to the corresponding accumulators of the second pair of accumulators and further means controlled by said comparing means for causing one of said transferring mechanisms to transfer the lesser amount in said first pair of accumulators to the accumulator containing the greater amount in the form of a complement.

25. In a record controlled tabulating machine, two pairs of accumulators, group control mechanism, means for entering items in each of one of said pairs of accumulators, transferring mechanisms for transferring the amounts in the first pair of accumulators to the second, transferring mechanisms for transferring the amounts in the second pair of accumulators to the first and devices rendered effective by said group control mechanism for causing said transferring mechanisms to operate in succession to transfer the initially entered amounts from the first pair of accumulators to the second and then re-transfer back to the first pair.

26. In a machine of the class described, means for analyzing a pair of record fields for data designations representing two amounts, entry receiving devices controlled by said analyzing means for effecting a setup of said amounts, means controlled by said entry receiving devices for effecting comparison of said amounts, a subtracting means for each entry receiving device, means controlled by said comparing means for causing the subtracting device associated with the entry receiving device containing the lesser amount to subtract the lesser amount from the greater amount, printing means, and means controlled by the entry receiving device initially containing the greater amount for causing said printing means to print the difference between the two amounts.

27. In a machine of the class described, means for analyzing two fields of a record card for data designations representing two amounts, a pair of entry receiving devices controlled by said analyzing means to each receive one of the amounts, means controlled by said devices for determining which amount is greater, subtracting mechanisms, means controlled by said determining means for causing one of said subtracting mechanisms to subtract the lesser amount from the entry receiving device containing the greater amount, printing means and means for causing said printing means to separately print both amounts and the difference between the two.

28. In a machine of the class described, two pairs of accumulators, means for entering amounts therein, comparing devices, transferring devices, printing devices, resetting devices, means for initiating and effecting an uninterrupted sequence of operations of said devices including means for causing said comparing devices to compare the amounts in one of said pairs of accumulators, means for causing the printing devices to print said compared amounts, means for causing said transferring devices to transfer the amounts compared to the corresponding accumulators of the second pair and to cause said transferring devices to transfer the lesser of the amounts compared to the accumulator containing the greater amount in the form of a complement, means for causing said printing devices to print the difference obtained, means for causing the resetting devices to reset the first pair of accumulators, means for causing the transferring devices to transfer the amounts in the second pair of accumulators to the first pair, means for causing the printing means to print the amounts transferred to the first pair of accumulators, means for causing the comparing means to compare said amounts, means for causing the transferring means to transfer the lesser amount to the accumulator containing the greater amount, means for causing the printing means to print the difference, and means for causing the resetting devices to reset both pairs of accumulators.

29. In a machine of the class described, means for analyzing three fields of a record card for data designations representing three amounts, three entry receiving devices controlled by said analyzing means to each receive one of said amounts, transferring mechanisms, comparing means for determining which of two of said entry receiving devices contains the lesser amount, means controlled by said comparing means for causing one of said transferring mechanisms to transfer the lesser amount to the entry receiving device containing the greater amount in the form of a complement, and further means for causing another of said transferring mechanisms to transfer the difference obtained in the entry receiving device initially containing the greater amount to the entry receiving device containing the third amount whereby the difference obtained will be added to said third amount.

30. In a machine of the class described, means for analyzing record cards arranged in minor, intermediate and major groups, an accumulator, entering means therefor controlled by said analyzing means to enter an amount from each card in succession, a second accumulator, a third accumulator, transferring mechanism, printing mechanism, resetting mechanism, group control mechanism responsive to minor, intermediate and major group changes, settable devices including adjusting relays for selectively correlating the accumulators with said mechanism for selected operations, further settable devices including cycle initiating relays for selectively determining the number of operations to be performed, and means controlled by said settable devices for rendering said mechanisms effective upon a minor group change to transfer the amount standing in the first accumulator to the second, print the same and thereafter reset said first accumulator, said devices being effective upon an intermediate group change to render said mechanisms effective to transfer the amount in the first accumulator to the second, then from the second to the third, then print both the amounts in the first and second accumulators and reset the first and second accumulators, said devices being effective upon a major group change to render said mechanisms effective to transfer the amount in the first accumulator to the second, then transfer the amount in the second accumulator to the third, then print the amounts in all three accumulators and reset all the accumulators.

31. In a machine of the class described, minor and major group control mechanisms separately responsive to changes in minor and major group number designations in record cards, a plurality of cycle initiating relays, means for causing successive energization of said relays upon a group change, manually settable means for selecting a different number of relays for successive energization for each type of group change, means jointly controlled by said minor group control mechanism and said settable means for rendering said energizing means effective to energize a selected succession of relays, means jointly controlled by said major group control mechanism and said settable means for rendering said energizing means effective to energize a different selected succession of relays, each of said relays being arranged to initiate an accounting operation, a plurality of adjusting relays, each of which is arranged to effect an adjustment of the machine for the performance of a different type of accounting operation, means controlled by said cycle initiating relays for effecting energization of said adjusting relays, manually settable means for selectively associating said adjusting relays with said cycle initiating relays for selective control thereby, whereby, upon each of said group changes, a selected succession of cycles will be initiated and a selected type of operation will take place during each cycle.

HAROLD HALL KEEN.